US008296516B2

(12) United States Patent
Kawamura et al.

(10) Patent No.: US 8,296,516 B2
(45) Date of Patent: Oct. 23, 2012

(54) STORAGE CONTROLLER FOR MIRRORING DATA WRITTEN TO CACHE MEMORY AREA

(75) Inventors: Atsushi Kawamura, Yokohama (JP); Yusuke Nonaka, Sagamihara (JP); Hideyuki Koseki, Machida (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 12/664,746

(22) PCT Filed: Oct. 20, 2009

(86) PCT No.: PCT/JP2009/005482
§ 371 (c)(1),
(2), (4) Date: Dec. 15, 2009

(87) PCT Pub. No.: WO2011/048626
PCT Pub. Date: Apr. 28, 2011

(65) Prior Publication Data
US 2011/0231369 A1      Sep. 22, 2011

(51) Int. Cl.
*G06F 12/16* (2006.01)
(52) U.S. Cl. ......................... 711/114; 711/120; 714/6.21
(58) Field of Classification Search .................... None
See application file for complete search history.

(56) References Cited

U.S. PATENT DOCUMENTS

| | | | | |
|---|---|---|---|---|
| 5,588,110 A | * | 12/1996 | DeKoning et al. | 714/5.1 |
| 5,761,705 A | * | 6/1998 | DeKoning et al. | 711/113 |
| 5,974,506 A | * | 10/1999 | Sicola et al. | 711/120 |
| 6,412,045 B1 | * | 6/2002 | DeKoning et al. | 711/135 |
| 6,574,709 B1 | * | 6/2003 | Skazinski et al. | 711/119 |
| 7,136,963 B2 | * | 11/2006 | Ogawa et al. | 711/113 |
| 7,293,196 B2 | * | 11/2007 | Hicken et al. | 714/11 |
| 2003/0158999 A1 | | 8/2003 | Hauck et al. | |
| 2004/0103247 A1 | | 5/2004 | Bita et al. | |
| 2005/0182906 A1 | * | 8/2005 | Chatterjee et al. | 711/144 |
| 2009/0193121 A1 | * | 7/2009 | Shin | 709/225 |

FOREIGN PATENT DOCUMENTS

| | | |
|---|---|---|
| EP | 1 662 400 A1 | 5/2006 |
| JP | 2004-171437 A | 6/2004 |
| JP | 3719976 B2 | 9/2005 |
| JP | 2009-53946 A | 3/2009 |

OTHER PUBLICATIONS

O. Nielsen, Written Opinion of the International Searching Authority for International Application No. PCT/JP2009/005482, Oct. 7, 2010, 5 pp., Europe.
O. Nielsen, International Search Report for International Application No. PCT/JP2009/005482, Oct. 7, 2010, 3 pp., Europe.

* cited by examiner

*Primary Examiner* — Kaushikkumar Patel
(74) *Attorney, Agent, or Firm* — Mattingly & Malur, PC

(57) ABSTRACT

A first controller has a first CM area having a plurality of first sub-areas, and a second controller has a second CM area having a plurality of second sub-areas. The first controller stores first data in any of the first sub-areas, and in addition, stores a mirror of the first data (first mirror data) in any of the second sub-areas. The first controller manages a pair (an association relationship) of the storage-destination first sub-area of the first data and the storage-destination second sub-area of the first mirror data. Similarly, the second controller stores second data in any of the second sub-areas, and in addition, stores a mirror of the second data (second mirror data) in any of the first sub-areas. The second controller manages a pair (an association relationship) of the storage-destination second sub-area of the second data and the storage-destination first sub-area of the second mirror data.

12 Claims, 36 Drawing Sheets

CONFIGURATION MANAGEMENT INFORMATION 1142

CACHE TABLE 11422

| OWN-SYSTEM ADDRESS | LDEV | LBA | STATUS | CORRESPONDING OTHER-SYSTEM ADDRESS |
|---|---|---|---|---|
| 0x01 | - | - | FREE | - |
| 0x02 | 0 | 100 | DIRTY | 0x0A |
| 0x03 | 10 | 32 | CLEAN | 0x0C |
| 0x04 | 1 | 23 | MIRROR | 0x0B |
| ..... | ..... | ..... | ..... | ..... |

MIRROR TABLE 11423

| OTHER-SYSTEM ADDRESS | LDEV | LBA | STATUS | CORRESPONDING OWN-SYSTEM ADDRESS |
|---|---|---|---|---|
| 0x0A | 0 | 100 | M-DIRTY | 0x02 |
| 0x0C | 10 | 32 | M-CLEAN | 0x03 |
| 0x0E | 2 | 10 | M-CLEAN | - |
| ..... | ..... | ..... | ..... | ..... |

Fig.8

STORAGE CONTROLLER FOR MIRRORING DATA WRITTEN TO CACHE MEMORY AREA

TECHNICAL FIELD

The present invention generally relates to the mirroring of data written to a cache memory area.

BACKGROUND ART

A storage controller generally controls data I/O (Input/Output). The storage controller manages a LU (Logical Unit) as a logical storage device. The storage controller receives from a host device an I/O command (either a write command or a read command) specifying a logical area (for example, the LU and an area inside the LU), and carries out the I/O of data with respect to this I/O command-specified logical area.

A device having a plurality of controllers (hereinafter, controller will be abbreviated as "CTL"), for example, a dual CTL is known as a storage controller. Each CTL in the dual CTL comprises owner rights of a LU and a cache area (hereinafter, CM area). Upon receiving an I/O command from the host device, in a case where the LU owner specified by this I/O command is itself, the CTL writes data (original data) that conforms to the I/O command to its own CM area, and, in addition, writes mirror data (a replication of the original data) to the CM area of the other CTL. That is, the cache mirroring is performed.

Patent Literature 1 discloses a technique for a cache-mirroring write-confirm method, which uses PCI-Express as the interconnector between the CTLs, and utilizes DMA (Direct Memory Access). Hereinbelow, the storage controller is assumed to be a dual CTL, and in a case where the dual CTL processes a command, the CTL, which processes the command, will be called an "own-system CTL", and the CTL, which does not process the command, will be called an "other-system CTL".

In order to carry out cache mirroring from the own-system CTL to the other-system CTL, it is necessary to access the cache memory of the other-system CTL, which is the mirroring destination. However, because cache memory is managed separately in each CTL, for the own-system CTL to access the cache memory of the other-system CTL, it is necessary to reserve a write-destination area, to lock the resource for this area, and to manage the resource.

In order to simplify this processes, a method for reserving an area for storing mirror data (hereinafter, the mirror area) beforehand inside the cache memory of the other-system CTL, and managing this area in the mirror-source CTL (the own-system CTL) has been proposed (Patent Literature 2). In accordance with this, the lock-free control of the other-system cache becomes possible.

Meanwhile, to avoid the degradation of I/O performance resulting from the cache mirroring process, performing this processing via high-speed dedicated hardware is conceivable, and Patent Literature 3 discloses a technique for carrying out high-speed mirroring in accordance with cache control circuits connected by a dedicated bus.

Generally speaking, in a dual controller, the CTLs are most often symmetrical, and for this reason, the reciprocal CM areas are the same size and a mirroring technique that is premised on this fact is adopted. However, in recent years, there have been a number of cases in which this symmetry has broken down due to both hardware and software reasons. Hardware causes include cases in which the initial CM capacities simply differ, and cases in which the CM area fails during operation. The software causes include cases in which the CM capacity provided from the hypervisor in the host device (for example, the server) virtualization technology differs in the two CTLs.

CITATION LIST

Patent Literature

[PTL 1]
Japanese Patent Laid-open Publication No. 2009-53946
[PTL 2]
Japanese Patent Laid-open Publication No. 2004-171437
[PTL 3]
Japanese Patent Publication No. 3719976

SUMMARY OF INVENTION

Technical Problem

In the case of a method that reserves a mirror area in the CM area, the problem is that when the reciprocal CM area sizes of the CTLs differ, it is difficult to balance the size of the original area (the original data storage area for the own-system CTL) and the size of the mirror area (the storage area for the mirror data that the own-system CTL receives from the other-system CTL).

For example, in the case of a large size mirror area in a small size CM area, the size of the original area in this CM area is small. User data (data that conforms to an I/O command) is input/output to/from the original area each time an I/O command is received from the host device. For this reason, in a case where the total amount of dirty data (element of user data not written to LU) in the original area exceeds a certain threshold, the CTL must restrict I/O entry, that is, the CTL must restrict the number of I/O commands received per unit of time. Therefore, when the original area is small, performance decreases due to the need to frequently write the dirty data inside the original area to the LU (typically the physical storage device that constitutes the basis of the LU) in order to reduce the dirty data in the original area. Hereinafter, this threshold will be called the "entry restriction threshold". Further, in a case where the size of the original area is small, the total amount of clean data (user data that already exists in the LU) capable of being stored in the original area is also limited, thereby causing a drop in the hit ratio (the probability of being able to locate read-targeted user data within the CM area) at the time of a read command.

Further, for example, when the size of the mirror area in the CM area of the one CTL (the one mirror area) is small, there are cases in which I/O entry restriction is carried out in the other CTL even when the size of the original area in the CM area of the other CTL (the other original area) is large. This is because, due to the small size of the one mirror area, it is not possible to store surplus mirror data of the original data stored in the other original area, resulting in the amount of original data to be stored in the other original area being restricted.

Accordingly, an object of the present invention is to make it possible to realize mirroring of data stored in the CM area without reserving a mirror area in the CM area.

Solution to Problem

The storage controller has a first controller, and a second controller, which is connected to the first controller. The first controller has a first CM area having a plurality of first sub-areas, and the second controller has a second CM area having a plurality of second sub-areas. The first controller stores a first data in any of the first sub-areas, and, in addition, stores a mirror of the first data (a first mirror data) in any of the second sub-areas. The first controller manages the pair (association relationship) of the first sub-area, which is the storage destination of the first data, and the second sub-area, which is the storage destination of the first mirror data. Similarly, the second controller stores a second data in any of the second sub-areas, and, in addition, stores a mirror of the second data (a second mirror data) in any of the first sub-areas. The second controller manages the pair (association relationship) of the second sub-area, which is the storage destination of the second data, and the first sub-area, which is the storage destination of the second mirror data.

The CM area may occupy the entire area of one or more memories (for example, a cache memory), and may be an area of a portion of one or more memories.

It is preferable that the storage-destination sub-areas of the data and mirror data be sub-areas other than a dirty sub-area and a mirror sub-area. The dirty sub-area is a sub-area that stores data that is not yet to be stored in a controller-managed storage device (may be either a physical storage device or a logical storage device). The mirror sub-area is a sub-area that stores mirror data.

The storage controller may be a storage system that comprises a physical storage device, or a device that is provided in a storage system, or a relay device (for example, a switching device) that relays communications between a host device and a storage system.

Advantageous Effects of Invention

It is possible to realize the mirroring of data stored in a CM area without reserving a mirror area in the CM area.

BRIEF DESCRIPTION OF DRAWINGS

FIG. 8 shows an example of a table comprising configuration management information 1142.
FIG. 13 shows a flowchart of a setting change from the variable mirror mode to the fixed mirror mode while ON.
FIG. 14 shows a flowchart of a setting change from the fixed mirror mode to the variable mirror mode while ON.

DESCRIPTION OF EMBODIMENTS

Examples 1 through 3 of the present invention will be explained below. Example 1 conforms to a maximum degree of freedom mirror area reservation method that uses DMA, and Example 2 conforms to a restricted mirror area reservation method that uses a SW (switching device) having a data transfer function. Example 3 conforms to a management method for different mirror areas.

Example 1

Figure 1:
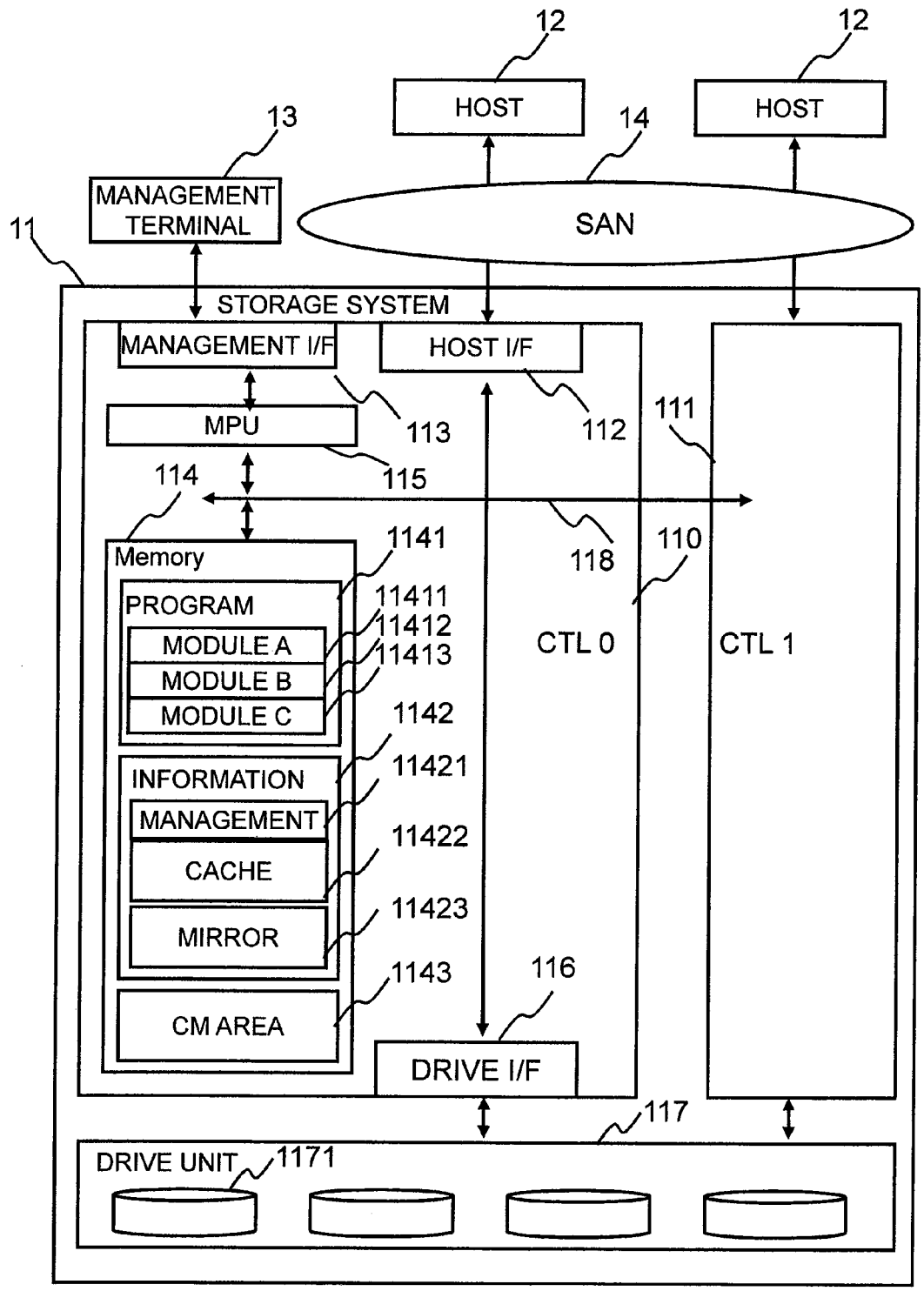
FIG. 1 shows the configuration of a storage system related to a first example of the present invention.

FIG. 1 shows the configuration of a storage system related to a first example of the present invention.

The storage system 11 comprises a drive unit 117. That is, the storage system 11 comprises a plurality of drives 1171 as one example of a plurality of physical storage devices. The drive 1171 is a storage media (for example, either a hard disk or flash memory) drive. A physical area in the drive unit 117, for example, may be specified in accordance with a combination of a drive 1171 identifier and a drive 1171 internal address. For example, a CTL0 and CTL1, which will be explained further below, issue an I/O request that specifies a physical area (a drive identifier and a drive internal address) to the drive unit 117.

The storage system 11 receives an I/O (Input/Output) command from a host 12 by way of a SAN (Storage Area Network) 14, and in response to this I/O command, executes the I/O (write/read) of data (user data). The connection mode between the storage system 11 and the host 12 may be a mode in which the storage system 11 is connected to the host 12, or may be mode in which the storage system 11 is built into the host 12. Another type of communication network may be used instead of the SAN 14.

Further, the storage system 11, in response to a command from a management terminal 13, is able to change the configuration inside a storage area and a parameter of a cache control system, and is able to change a mirror area reservation method.

The storage system 11 comprises a dual controller (dual CTL) as a storage controller, which is connected to the drive unit 117, and which controls the I/O of data with respect to the drive unit 117. That is, the storage controller is configured from a CTL 110 and a CTL 111. Hereinafter, CTL 110 will be called "CTL 0" and CTL 111 will be called "CTL 1". Further, of CTL 0 and CTL 1, the CTL, which constitutes the side that processes a command, will be called the "own-system CTL", and the CTL, which is not the own-system CTL, will be called the "other-system CTL". Further, when expressing an element inside a certain CTL, a part of the name of this CTL will be used. For example, there will be cases in which a table that serves as one element of CTL 0 will be called "table 0", and a table that serves as one element of CTL 1 will be called "table 1". There will also be cases in which a table that serves as one element of the own-system CTL will be called "own-system table", and a table that serves as one element of the other-system CTL will be called "other-system table". In accordance with this, when distinguishing between same type elements, it will be immediately clear which CTL element is being expressed.

There may be cases in which the CTL 0 is the own-system CTL, and there may also be cases in which the CTL 1 is the own-system CTL. CTL 0 will be given as an example below to explain the configuration and functions of CTL 0 and 1.

The CTL 0 manages a LU (Logical Unit) and a drive 1171 that constitutes the basis of the LU. The LU is a logical storage device. The CTL 0 receives an I/O command from the host 12, and carries out the I/O of the data in accordance with this I/O command with respect to the drive 1171 that is the basis of the LU specified in the received I/O command.

The CTL 0 comprises a host I/F 112, a management terminal I/F 113, a memory 114, a MPU (Micro Processor Unit) 115, and a drive I/F 116.

The host I/F 112 is an interface device for communicating with the host 12. Incidentally, the host 12, for example, is a computer (or another storage system), and is the source of an I/O command. The computer may be a physical computer or a virtual computer.

The management terminal I/F 113 is an interface device for communicating with the management terminal 13. Incidentally, the management terminal 13, for example, is a computer.

The CTL 0 is controlled by the MPU 115, is connected to the SAN 14 by way of the host I/F 112, is connected to the drive unit 117 by way of the drive I/F 116, and is connected to the management terminal 13 by way of the management terminal I/F.

The MPU 115 is an example of a processor, and comprises a microprocessor. The MPU 115 is able to perform the below-described processing by executing a control program 1141 inside the memory 114.

The memory 114 comprises a control program 1141 that is executed by the MPU 115, configuration management information 1142 that includes the various parameters of the storage system 11, and a cache memory area (CM area) 1143 for temporarily storing user data. The CTL 0 is connected to the CTL 1 by an internal bus 118, and the CTL 0 and 1 exchange information with one another by way of the internal bus 118.

The respective program modules configuring the control program 1141 will be explained below.

The control program 1141 comprises a configuration manager (module A) 11411, an input/output processor (module B) 11412, and a cache controller (module C) 11413.

The configuration manager 11411 references and updates the configuration management information 1142 in accordance with a command from the management terminal 13 or an instruction from another program module.

The input/output processor 11412 carries out the processing of an I/O command (I/O processing). For example, the input/output processor 11412 interprets an I/O command, specifies the physical area (a drive 1171 and an area in the drive 1171) associated with the logical area (LU and area inside the LU) specified by the I/O command, and sends an I/O request specifying the specified physical area to the drive 1171 related to this physical area. The input/output processor 11412 executes a data transfer between the drive unit 117 and the CM area 1143 and a data transfer between the CM area 1143 and the host 12.

The cache controller 11413 carries out the management and various types of operations with respect to the CM area 1143, and also carries out processing to reserve a mirroring destination for user data when a write command is received.

Next, the configuration management information 1142 will be explained. Furthermore, in the following explanation, the memory in the CTL 0 will be called "memory 0", and the CM area in the memory 0 will be called the "CM 0". Similarly, the memory in the CTL 1 will be called "memory 1", and the CM area in the memory 1 will be called the "CM 1".

The configuration management information 1142 comprises cache management information 11421, a cache table 11422, and a mirror table 11423. The information respectively managed in the cache table 11422 and the mirror table 11423 may also be managed in a format other than the table format.

The cache management information 11421 comprises a parameter that is referenced from the cache controller 1143. The CM area 0 (and CM area 1) is divided into small size areas called "segments", and the control program 1141 manages and operates a segment as one unit. The cache management information 11421 comprises information (segment management information) related to the segment. Generally speaking, the segment is most often managed as a queue structure, and the management information here corresponds to the respective queue tables.

The cache table 11422 comprises information related to the respective segments of the CM area 0, and information denoting the association relationship between the respective segments in the CM area 0 and a segment in the CM area 1.

The mirror table 11423 comprises information related to the respective segments of the CM area 1, and information denoting the association relationship between a segment in the CM area 1 and a segment in the CM area 0.

Figure 2:
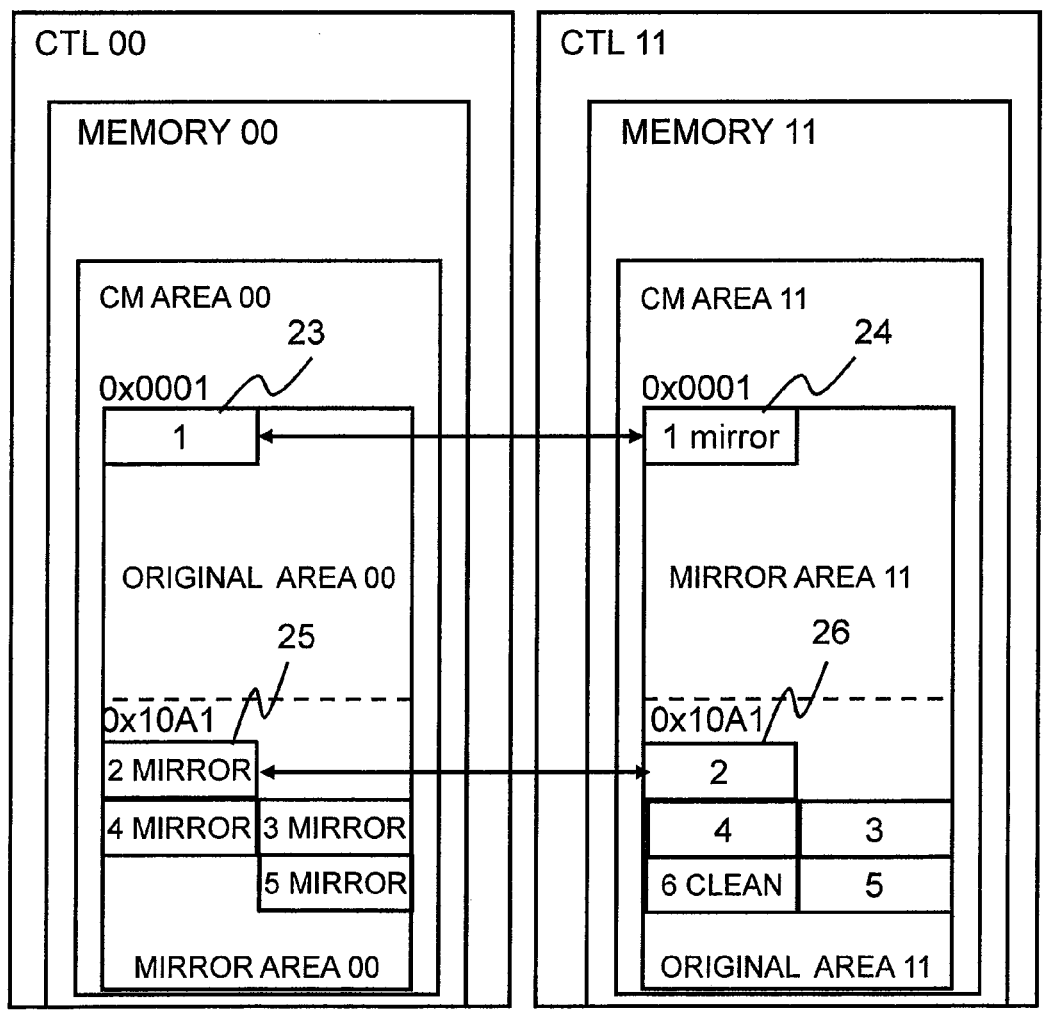
FIG. 2 is a schematic diagram of ordinary cache mirroring.

FIG. 2 is a schematic diagram of ordinary cache mirroring. Furthermore, hereinbelow, in order to distinguish between a CTL in an ordinary dual CTL and a CTL in the dual CTL related to this example, the one CTL configuring the ordinary dual CTL will be called "CTL 00", and the other CTL configuring the ordinary dual CTL will be called "CTL 11". Similarly, the memory and cache areas configuring the ordinary dual CTL will also be referred to by attaching "00" and "11".

An original area 00 and a mirror area 00 are reserved beforehand inside the CTL 00. Similarly, an original area 11 and a mirror area 11 are reserved beforehand inside the CTL 11. Only mirror data is stored in the mirror areas 00 and 11; other types of data are not stored therein.

The original area 00 and the mirror area 11 are associated, the sizes of these areas are the same, and, in addition, are fixed. The respective addresses (segments) in the original area 00 are associated on a one-to-one basis with the respective addresses (segments) in the mirror area 11. For example, mirror data 24 of original data 23 stored in the first segment of the original area 00 is stored in the first segment of the mirror area 11.

Similarly, the original area 11 and the mirror area 00 are associated, the sizes of these areas are the same, and, in addition, are fixed. The respective addresses (segments) in the original area 11 are associated on a one-to-one basis with the respective addresses (segments) in the mirror area 00. For example, mirror data 25 of original data 26 stored in the Nth segment (N is a natural number greater than 1) of the original area 11 is stored in the Nth segment of the mirror area 00.

In a case where a write command, which specifies a CTL 00-owned LU, is issued and this write command is received by the CTL 00, the CTL 00 stores the data in accordance with this write command (the original data) in the original area 00, and, in addition, stores mirror data of this original data in the mirror area 11.

In a method in which mirror areas 00 and 11 are fixedly reserved, as shown in FIG. 2, even in a case where the original area 11 usage is large, the utilization efficiency is reduced due to the fact that the mirror area 11 is fixed.

Further, in a method in which the mirror areas 00 and 11 are fixedly reserved, unlike the example of FIG. 2, in a case where the size of the CM area 00 differs from the size of the CM area 11, for example, there are cases in which the mirror area 11 is considerably smaller than the original area 00. In accordance with this, even when the original area 00 has a large number of free segments (unused segments), there are case where the CTL 00 must restrict I/O entry. This is because mirror data of the original data inside the original area 00 is not able to be stored in the mirror area 11, thereby preventing new original data from being stored in the original area 00.

This example makes it possible to solve a problem like this. Furthermore, the data denoted as "x mirror" in FIG. 2 is mirror data of the original data denoted as "x" (where x is an integer). This is the same in FIG. 3 below as well.

Figure 3:
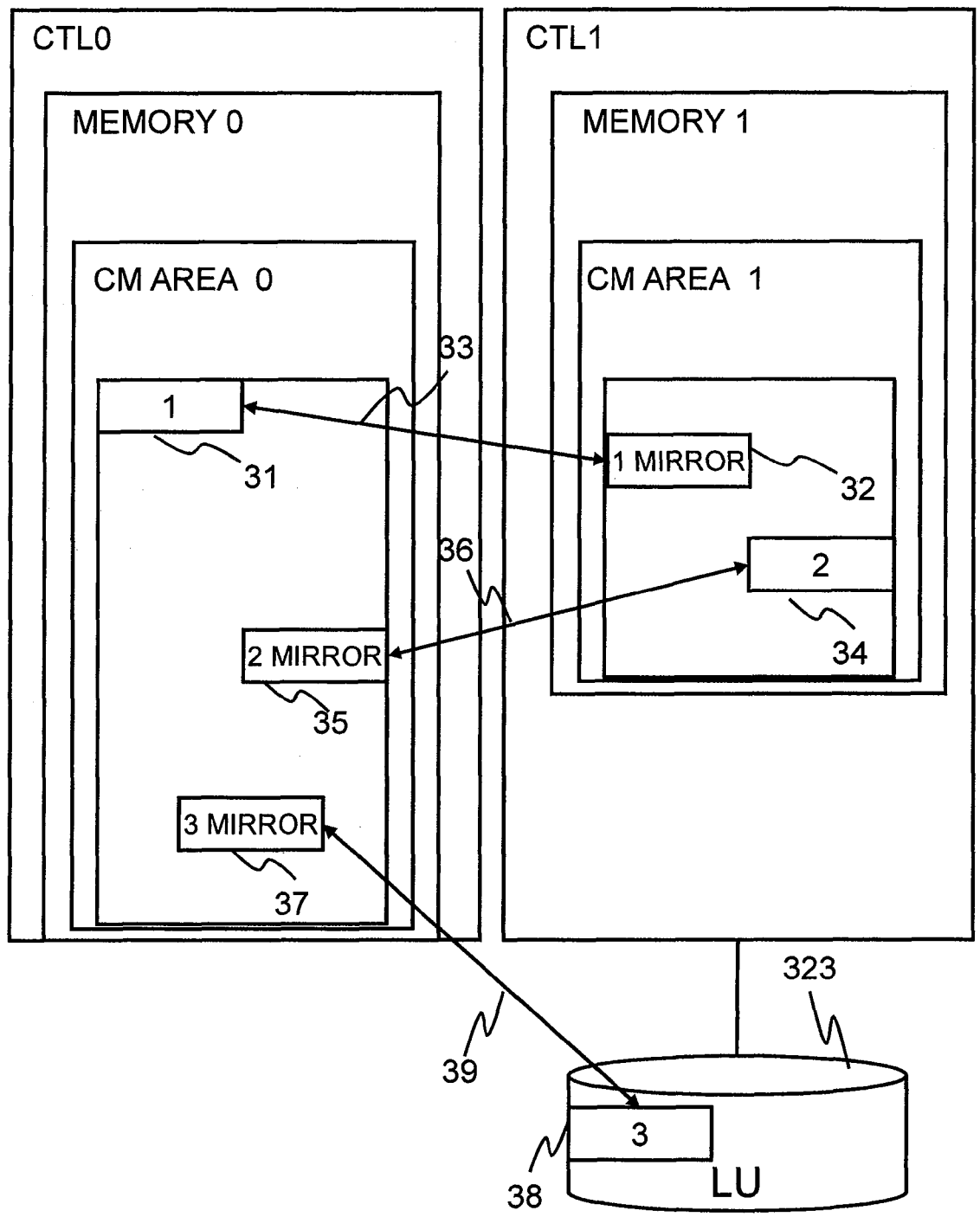
FIG. 3 is a schematic diagram of cache mirroring related to the first example.

FIG. 3 is a schematic diagram of cache mirroring related to Example 1.

According to the example shown in FIG. 3, the size of CM area 0 is larger than the size of CM area 1. In this example, the own-system CTL (CTL of the side that processes the command) is able to store mirror data in an arbitrary address (segment) of the CM area of the other-system CTL. For this reason, the size of the mirror area is not fixed, and is dynamically changeable. Therefore, unlike a mirroring method having a fixed area, there is no need to distinguish between the original area and the mirror area.

In the following explanation, in order to distinguish between a fixed mirror area and an area in which mirror data is stored in this example, the mirror-data-storage area of this example will be called the "mirror segment".

The address relationship 33 between the original data of the CTL 0 (the user data stored in a CTL 0-owned LU) 31 and the mirror data 32 thereof is managed by a table inside the memory 0. Similarly, the address relationship 36 between the original data of the CTL 1 (the user data stored in a CTL 1-owned LU) 34 and the mirror data 35 thereof is managed by a table inside the memory 1.

The original data 38 corresponding to the mirror data 37 inside the CM area 0 is not inside the CM area 1, but rather exists inside the CTL 1-owned LU 323. In a case where the data 38 inside the LU 323 is the read target of a read command from the host 12, the mirror data 37 may be provided to the host 12 instead of the data 38 inside the LU 323. For this reason, it is possible to expect that the clean data (the original data already stored in the LU) 38 will not be stored in the CM area 1, and that as much as possible dirty data and mirror data will be stored in CM area 1.

Further, in a case where a failure of some sort has occurred in the one CTL area and the data inside the one CTL area has been lost, in order to restore this data, information as to the kind of mirror data being stored and the original data to which it corresponds is necessary. For this reason, in this example, information for specifying the above association relationship is held in both CTL 0 and 1. The method for doing so could be one in which the control information therefor is mirrored the same as the user data, or one that instructs the updating of the control information in the mirror-destination CTL at the time the user data is being mirrored.

Figure 4:
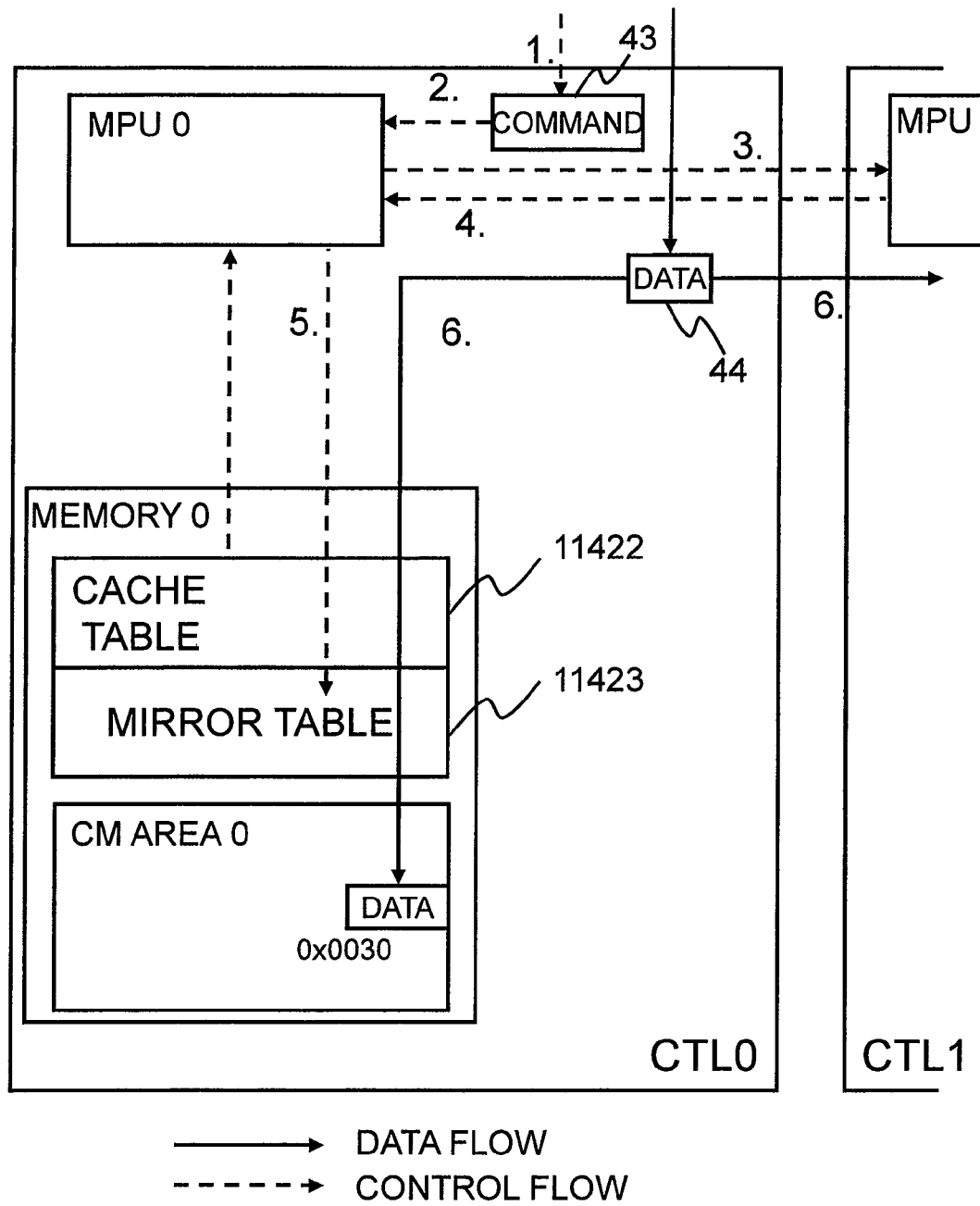
FIG. 4 shows an overview of the flow of cache mirroring carried out in the first example when a write command is received from a host 12.

FIG. 4 shows an overview of the flow of cache mirroring carried out in Example 1 when a write command has been received from the host 12. The broken lines denote the control flow, and the solid line denotes the flow of data. The numerals near the lines indicate the execution order. Further, in the following explanation, the MPU of the CTL 0 will be called the "MPU 0", and the MPU of the CTL 1 will be called the "MPU 1".

The CTL 0 receives a write command 43 from the host 12 (control flow 1, passes the write command along to the MPU 0 (control flow 2), and the MPU 0 analyzes this I/O command. As a result of analysis, the MPU 0 acquires the command type, the logical area (for example, the target LUN (Logical Unit Number) and LBA (Logical Block Address)), and the data length.

Next, an area is reserved for storing the original data (the write-targeted user data) and the mirror data thereof. In control flow 3, the MPU 0 requests the MPU 1 to reserve a mirror segment.

The MPU 1 acquires the address of the mirror segment (for example, 0x010A) in accordance with the below-described segment reservation process, and notifies the acquired address to the MPU 0, which is the source of the request (control flow 4).

The MPU 0 reserves a segment for storing the original data from the CM area 0 before or after control flow 3 or 4. The MPU 0 manages the pair formed from the address of this segment (for example, 0x0030, hereinafter referred to as the original segment address) and the mirror segment address notified from the MPU 1 (control flow 5). At this point, the write data 44 from the host 12 is transferred to the segment denoted by the original segment address and the segment denoted by the mirror segment address (control flow 6). This data is stored in the cache table 11422 and the mirror table 11423 for the acquired segment addresses. These tables will be explained in detail below.

Figure 5:
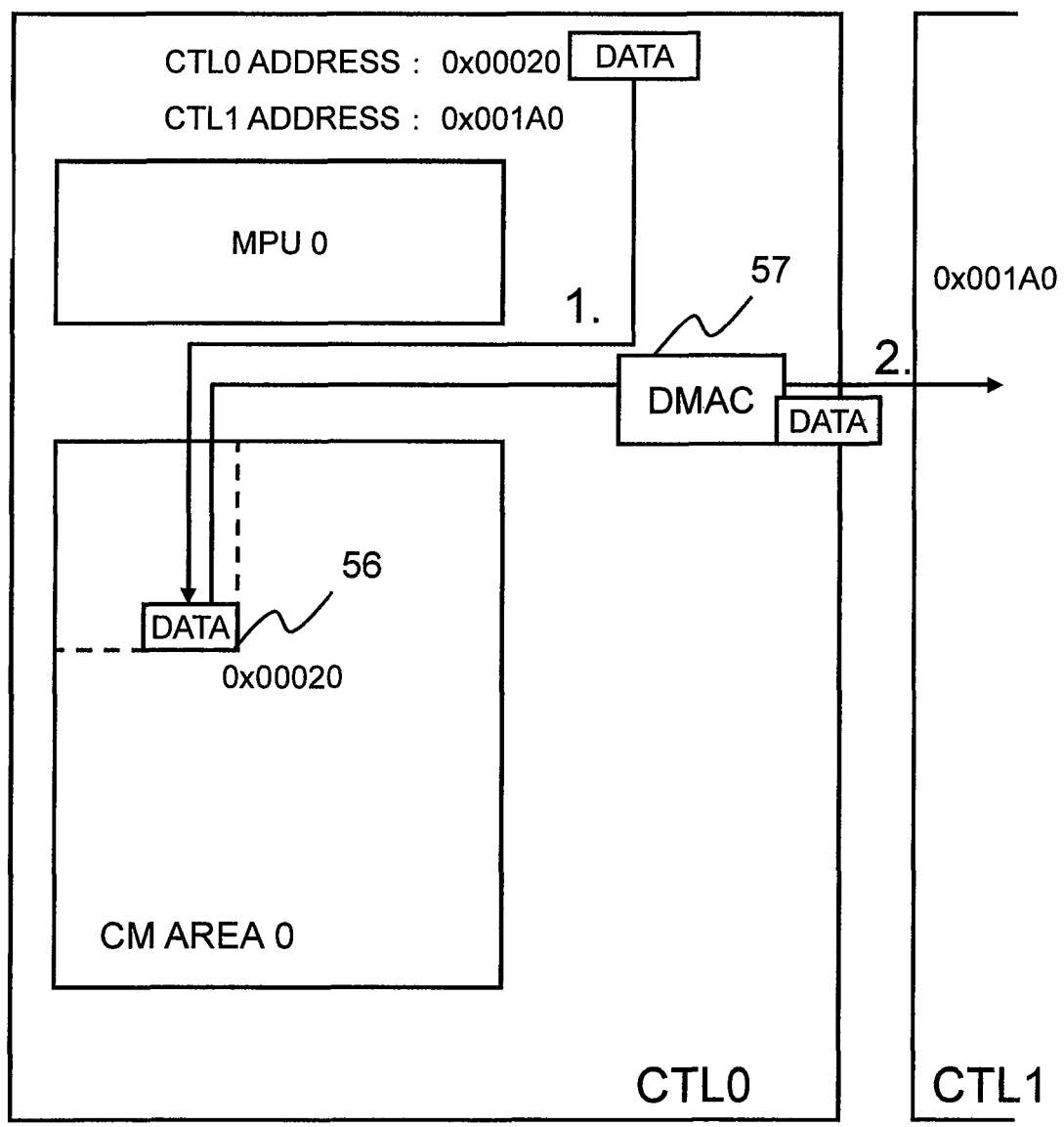
FIG. 5 shows an example of a host data transfer method.

FIG. 5 shows an example of a host data transfer method.

The CTL 0 receives a write command and acquires the address of the original segment 56 and the address of the mirror segment. The MPU 0 transfers the write data to the original segment 56. This transfer, for example, is realized in accordance with a DMAC (Direct Memory Access Controller) 57. The DMAC 57, for example, is in either the MPU 0 or the host I/F. The MPU 0 sets the transfer-destination address (the mirror segment address) and the transfer-source address (the original segment 56 address) in the DMAC 57 in order to realize mirroring of the write data to the CM area 1, and boots up the DMAC 57. The DMAC 57 transfers the data from the segment of the specified transfer-source address to the segment of the specified transfer-destination address.

The DMAC 57 is able to transfer the data to an arbitrary address of the CM area of the other-system. Further, the DMAC 57 may exist as a single piece of hardware, or may be included inside the MPU.

Figure 6:
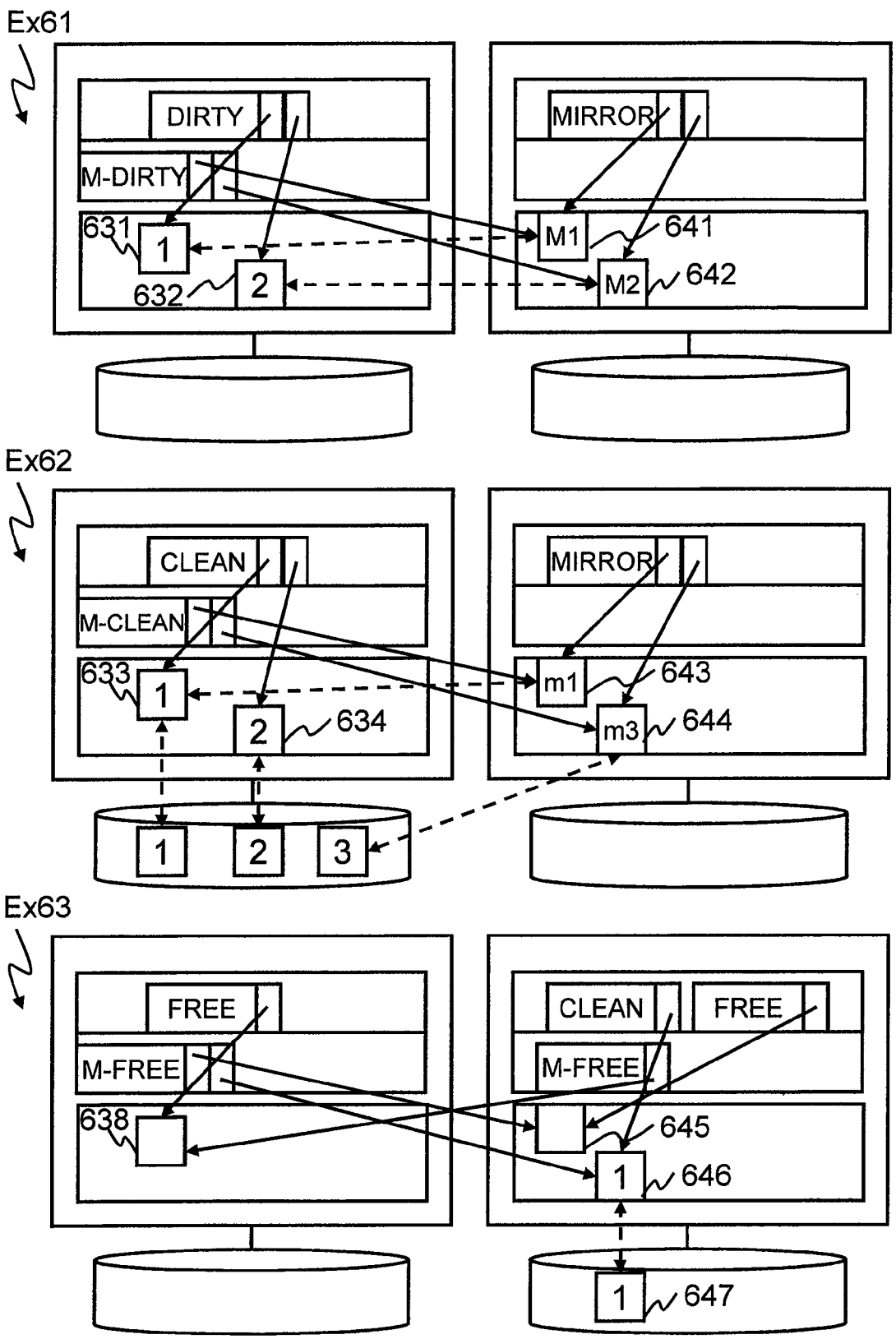
FIG. 6 shows the statuses of segments configuring CM areas, and examples of tables for managing the statuses of the segments.

FIG. 6 shows examples of the statuses of the segments that configure the CM areas and of tables for managing the statuses of the segments.

There are CM areas 0 and 1, there are a cache table 0 and a mirror table 0 for the CM area 0, and there are a cache table 1 and a mirror table 1 for the CM area 1 (However these are not described in FIG. 6 clearly). These tables are used to manage the statuses of the segments.

The example (Ex 61) illustrates the segment statuses "dirty", "m-dirty" and "mirror".

A segment that has a status of "dirty" is the segment that stores data (dirty data) that does not match the data inside the LU. For example, a segment, which stores data that has not been destaged to the LU subsequent to write data being stored, and a segment, which stores data that was overwritten by a hit at the time of a write from the host, constitute the "dirty" status. Hereinbelow, a segment having a status of "K" will be called a "K" segment.

It is not possible to overwrite the data of another address in the "dirty" segment. The data inside dirty segments 631 and 632, which is managed by the cache table 0, is in the CM area 0, but has not been written to the LU. The original data inside these "dirty" segments 631 and 632 are mirrored in the CM area 1. The mirror data of the original data inside the "dirty" segments 631 and 632 is the data inside the segments 641 and 642 in the CM area 1.

The statuses of the "mirror" segments 641 and 642 are managed as "mirror" in the cache table 1. It is not possible to overwrite the data of another address in the "mirror" segments 641 and 642.

The mirror data of the dirty data of the CTL 0 is registered as "m-dirty" in the mirror table 0 for the "mirror" segments 641 and 642 that are storing this mirror data. The status "m-dirty" signifies the other-system segment in which is stored the mirror data of the original data inside the "dirty" own-system segment.

The example (Ex 62) illustrates the segment statuses "clean" and "m-clean".

The statuses of the segments 633 and 634 are managed as "clean" in the cache table 0. A segment having the status of "clean" stores the same user data as the user data inside the LU. For this reason, the data inside the "clean" segment may be either deleted from the CM area or overwritten with the data of another address. According to example (Ex 62), the mirror data of the original data, inside the "clean" segment 634 has been deleted and no longer exists.

The mirror data of the original data inside the segments 633 and 634 are stored in the "mirror" segments 643 and 644 in the CM area 1. The fact that the status of the segments 643 and 644 is "mirror" is managed by the cache table 1.

The mirror data of the clean data of the CTL 0 is registered as "m-clean" in the mirror table 0 for the "mirror" segments 643 and 644 that are storing this mirror data The status "m-clean" signifies that original data of the stored data exists in the LU. For this reason, the mirror data inside the "m-clean" segment may be overwritten with the data of another address. Further, only the mirror data of the clean data is held in the CM area as in the case of the "mirror" segment 644; the clean data of this original data does not need to be stored in the CM area.

The example (Ex 63) is a diagram for illustrating the segment statuses "free" and "m-free".

A segment having the status "free" stores data that is either not being used inside the CM area or is invalid. The "free" segment 638 is a candidate for a reservation process.

Segments having a status of "m-free" are the segments 645 and 646, which are managed as either "free" or "clean" in the cache table of the other-system CTL. That is, of the segments configuring the other-system CM area, the "m-free" segment is the one in which other address data may be stored, and the one that is not managed as "mirror" in the other-system CTL cache table.

In the cache table 1, the status of segment 645 is "free" and the status of segment 646 is "clean". For example, when the CTL 1 receives a read command and data from the LU is staged to the segment 646, the status of segment 646 becomes "clean".

Figure 7:
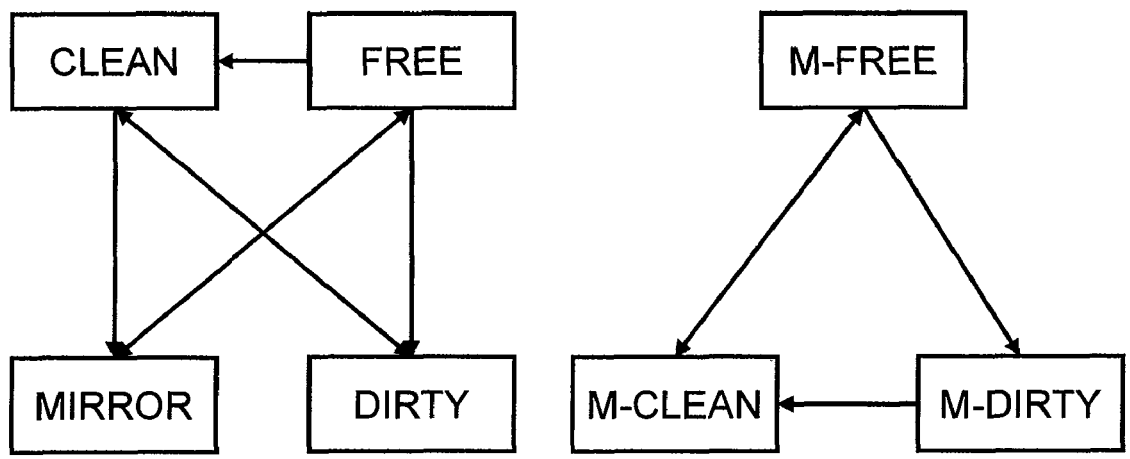
FIG. 7 shows the transitions in segment status.

FIG. 7 shows the transitions of segment status.

In a case where read-targeted user data is staged to a "free" own-system segment, the status of this own-system segment transitions from "free" to "clean".

In a case where write-targeted user data is stored in a "free" own-system segment, the status of this own-system segment transitions from "free" to "dirty". Similarly, in a case where write-targeted user data is stored in a "clean" own-system segment, the status of this own-system segment transitions from "clean" to "dirty".

In a case where the user data inside a "dirty" own-system segment is destaged to the LU, the status of this own-system segment transitions from "dirty" to "clean".

In a case where either a "free" or "clean" own-system segment is reserved, and mirror data is stored in this own-system segment from the other-system CTL, the status of this own-system segment transitions from either "free" or "clean" to "mirror".

In a case where the own-system CTL requests the other-system CTL to make the storage destination of the mirror data of the original data of the own-system CTL a "m-free" other-system segment (or a case where the mirror data from the own-system CTL is stored in this "m-free" other-system segment), the status of this other-system segment transitions from "m-free" to "m-dirty".

In a case where the own-system CTL requests the other-system CTL to stage the original data of the own-system CTL from the LU to a "m-free" other-system segment (or a case where the original data has been staged from the LU by the own-system CTL to this "m-free" other-system segment), the status of this other-system segment transitions from "m-free" to "m-clean".

In a case where the dirty data inside the "dirty" own-system segment associated with the "m-dirty" other-system segment has been destaged to the LU and the status of the own-system segment has transitioned from "dirty" to "clean", the status of this other-system segment transitions from "m-dirty" to "m-clean".

In a case where the "m-clean" other-system segment is the target of a free mirror instruction from the own-system CTL to the other-system CTL, the status of this other-system segment transitions from "m-clean" to "m-free". Furthermore, the steps for freeing a mirror will be described below.

FIG. 8 shows an example of a table comprising configuration management information 1142.

The configuration management information 1142 comprises a cache table 11422 and a mirror table 11423 as described below.

The cache table 11422, for example, comprises for each own-system segment an own-system segment address, information denoting the logical area that stores the data inside the own-system segment (for example, the LEDV number, which is the identification number of the LU, and the LBA, which is the address of the area inside the LU), the status of the own-system segment, and the address of the other-system segment associated with the own-system segment. As used here, "the other-system segment associated with the own-system segment" is either the other-system segment that stores the mirror data of the original data inside the own-system segment, or the other-system segment the stores the original data of the mirror data stored by the own-system segment. Furthermore, information denoting the logical area of the original data is also stored in the mirror table 11423, and since the logical area information in the cache table 11422 and the logical area information in the mirror table 11423 are a match, the address of the other-system segment need not be included in the table 11422 because the association relationship between the original data and the mirror data thereof is understood.

The mirror table 11423 comprises information related to the other-system segment that stores the mirror data of the own-system original data. The table 11423, for example, comprises an other-system segment address, information denoting the logical area in which is stored the original data of the mirror data stored in the other-system segment (the LDEV number and LBA), the status of the other-system segment, and the address of the own-system segment associated with the other-system segment for each mirror segment in the other-system CM area. For the reason described above, the address of the own-system segment associated with the other-system segment need not be included in the table 11423. Furthermore, "the address of the own-system segment associated with the other-system segment" is the address of the own-system segment that stores the original data of the mirror data stored in the other-system segment.

The own-system CTL receives a write command, and subsequent to reserving an other-system segment for storing the mirror data, adds the record related to this reserved other-system segment to the mirror table 11423. According to the mirror table 11423 of FIG. 8, it is clear that the original data inside the own-system segment of address 0x02 has been mirrored to the other-system segment of address 0x0A, and that the status of this other-system segment is "m-dirty". It is also clear that the original data inside the own-system segment of address 0x03 has been mirrored to the other-system segment of address 0x0C, and that the status of this other-system segment is "m-clean".

When the status of the own-system segment associated with the "m-dirty" other-system segment transitions to "clean", the status of this other-system segment transitions from "m-dirty" to "m-clean". Even in a case where the data of another address is written over the "clean" own-system segment and the original data inside the "clean" own-system segment disappears, the status of the other-system segment associated with this own-system segment stays "m-clean" as-is, and, in addition, the data remains in this other-system segment as-is.

The flow of processing for initializing the settings will be explained by referring to FIGS. 9 through 14. Furthermore, in the flowcharts, a step is abbreviated as "S". Further, the processing carried out by the control program 1141 is actually performed by the MPU executing the control program 1141.

In this example, it is possible to select which of two operating modes will be used, a variable mirror mode, which dynamically reserves a mirror area, or a fixed mirror mode, which uses a fixed area inside the CM area as the mirror area. At initialization time, initialization is executed in accordance with which mode is to be set.

Figure 9:
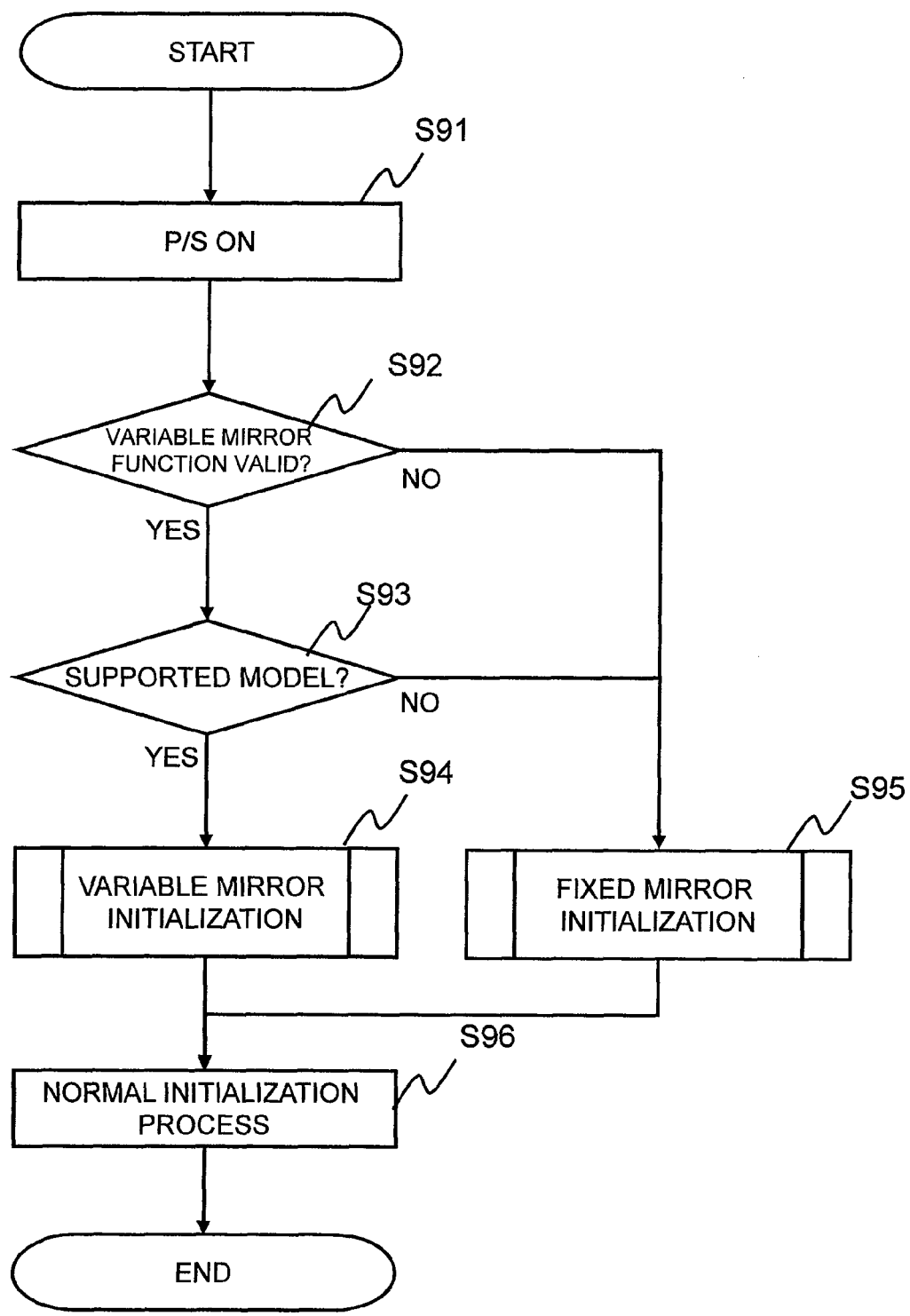
FIG. 9 shows a flowchart of initialization steps at initial startup.

FIG. 9 shows a flowchart of the initialization steps at initial startup.

First, the power to the storage system 11 is turned ON in Step 91.

Next, in Step 92, the control program 1141 checks whether or not the variable mirror function is valid. This, for example, is able to be determined based on the version of the control program 1141. Furthermore, using a method such as updating the control program, the user is able to change the setting as to whether or not the variable mirror function is valid from the management terminal 13.

In Step 93, the control program 1141 checks whether or not the storage system 11 model is a model that is able to use the variable mirror function (for example, whether or not it is a dual CTL-mounted system). Hypothetically, in a case where there is no mechanism for exchanging the required data between the interconnected CTL, this function will not operate effectively and will become invalid.

In a case where the determination in Step 93 is that the storage system 11 is a model that is capable of using the variable mirror function (Step 93: YES), the control program 1141 initializes the variable mirror function in Step 94. At this point, the information required to execute this function is exchanged between the CTL 0 and the CTL 1, and the parameters related to the variable mirror function are set.

In a case where either the variable mirror function is invalid (Step 92: NO) or the storage system 11 model is not able to use this function (Step 93: NO), the control program 1141 executes the initialization of fixed mirror operation in Step 95.

The processing performed in Steps 94 and 95 will be explained in detail below. After these processes have ended, in Step 96, a normal initialization process is carried out and initialization is complete. Furthermore, the order in which this processing is performed may be reversed provided that one process does not depend on the other.

Figure 10:
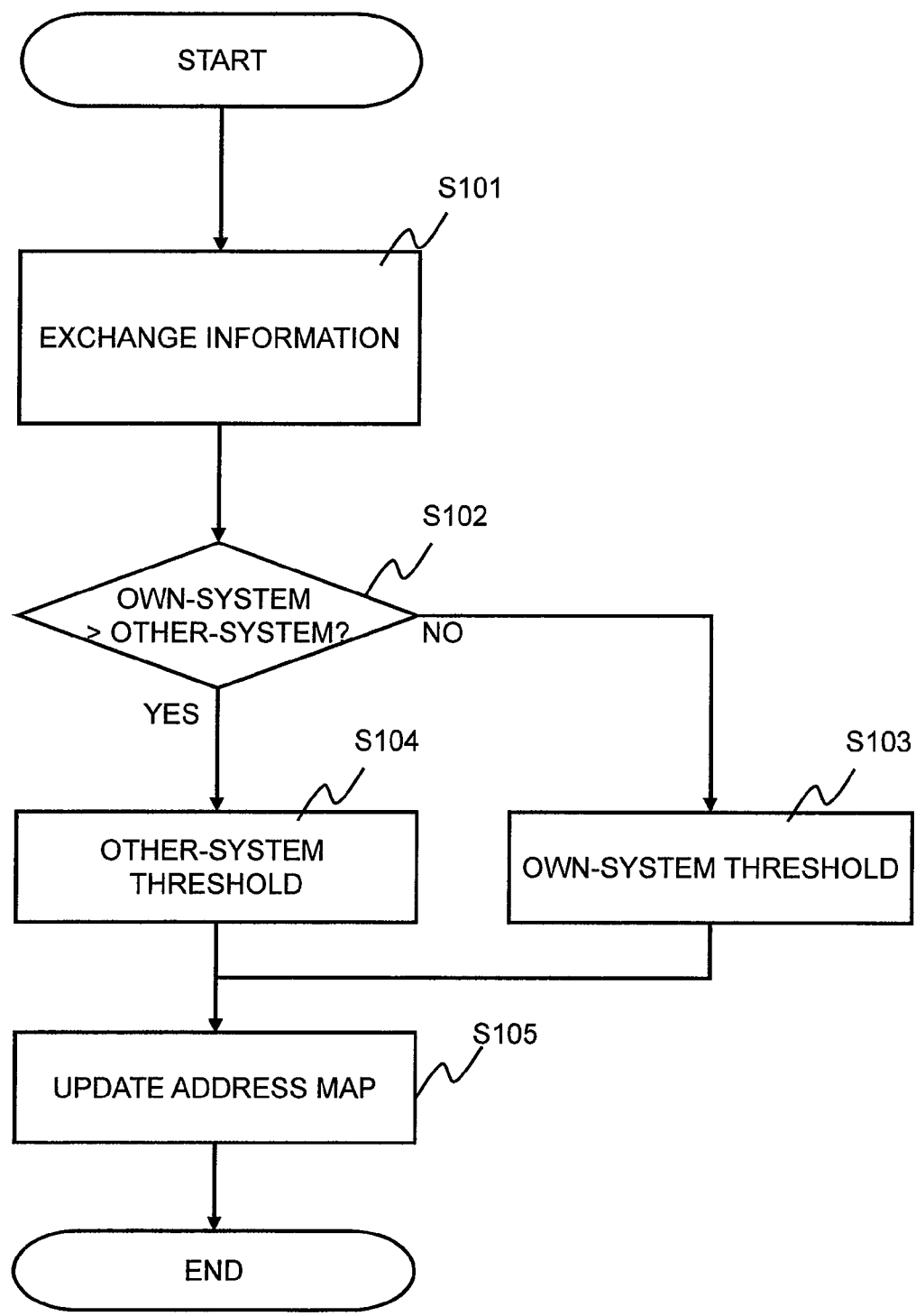
FIG. 10 shows a flowchart of the initialization of a fixed mirror mode.

FIG. 10 shows a flowchart of the initialization of the fixed mirror mode.

Information is exchanged between the two CTL for initialization. This information exchange is carried out in accordance with the control program being respectively executed by the CTL 0 and the CTL 1.

First, in Step 101, the reciprocal cache sizes and the entry restriction threshold are exchanged. The entry restriction threshold is the limit amount (maximum amount) of dirty data to be held inside the CM area. The initial value of this value is determined beforehand by the control program, and this value is set as a CM area size expression such as x % (where x>0). This value may be changed in accordance with the user issuing a command from the management terminal 13. For example, in a case where it is determined that the I/O pattern from the host 12 is one in which reads are numerous and the rewrite frequency for dirty data is low, this makes it possible to set the entry restriction threshold low to facilitate the reservation of clean data. By contrast, in a case where the write frequency is high, it is possible to set the entry restriction threshold high to reduce the frequency at which destaging is carried out. That is, it is possible to strive for enhanced destaging efficiency each time. For example, the control program 1141 may monitor the I/O pattern and change the entry restriction threshold in accordance with the detected I/O pattern.

Subsequent to the exchange of information in Step 101, in Step 102, the control program 1141 compares the own-system entry restriction threshold against a received other-system entry restriction threshold. In a case where the own-system entry restriction threshold is larger than the other-system entry restriction threshold, the other-system entry restriction threshold is set as the entry restriction threshold (Step 104). By contrast, in a case where the own-system entry restriction threshold is smaller than the other-system entry restriction threshold, the own-system entry restriction threshold is set (Step 103).

In Step 105, the control program 1141 references the exchanged reciprocal cache sizes and the entry restriction threshold to determine the mirror area. Since the mirror area is fixedly reserved in the fixed mirror mode, the size of the area capable of storing dirty data constitutes a volume arrived at by subtracting the size of the mirror area from the entry restriction threshold. For this reason, the mirror area must be determined so as to be able to reserve enough dirty area. However, in a case where the CM area rewrite frequency differs between the two CTL, it is also possible to adjust this value to coincide with this difference. A selection, such that the mirror area and the dirty area are set to the same size in the initial state, and in a case where it is later learned that writes are biased to the one CTL, the mirror area of the other CTL is made larger, is conceivable.

Finally, in Step 105, the control program 1141 updates the address map. As used here, the "address map" stores information as to which other-system address is to be used as the mirror area.

Figure 11:
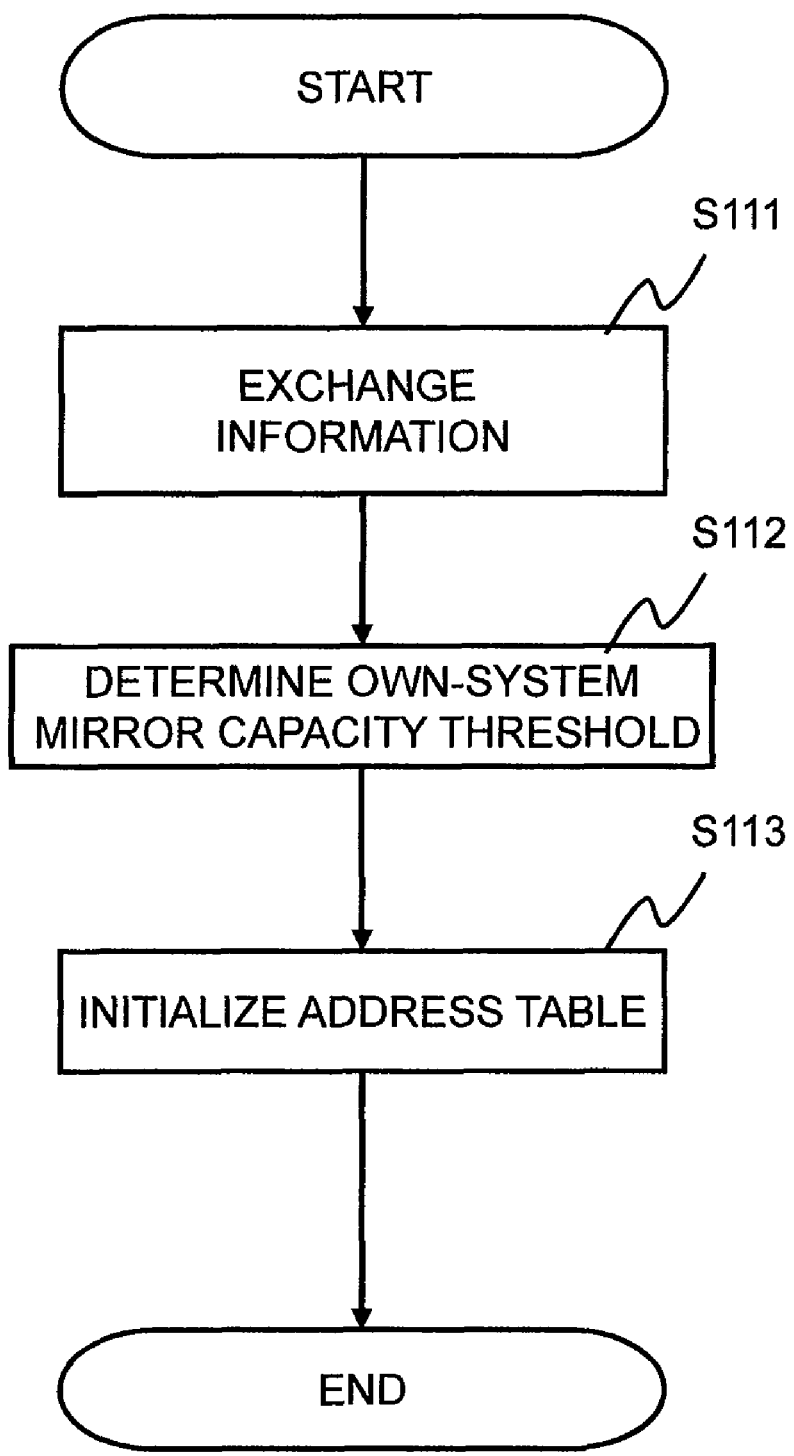
FIG. 11 shows a flowchart of the initialization of a variable mirror mode.

FIG. 11 shows a flowchart of the initialization of the variable mirror mode.

In Step 111, the entry restriction thresholds and cache sizes respectively set for the two CTL are exchanged.

Next, in Step 112, the control program 1141 determines the mirror capacity threshold, which is the maximum percentage of the mirror capacity that the own-system receives. This threshold, for example, is determined on the basis of the entry restriction threshold and cache size (size of other-system CM area) obtained in the exchange. This will be described further below, but in a case where the sum of the mirror capacity (the total amount of mirror data from the other-system) and the dirty capacity (the total amount of the own-system dirty data) has exceeded the entry restriction threshold, the mirror capacity threshold is used to determine whether the mirror data or the dirty data should be reduced. The user may set the mirror capacity threshold to an arbitrary value from the management terminal 13 the same as the entry restriction threshold.

Lastly, in Step 113, the control program 1141 initializes the cache table 11422 and the mirror table 11423.

Figure 12:
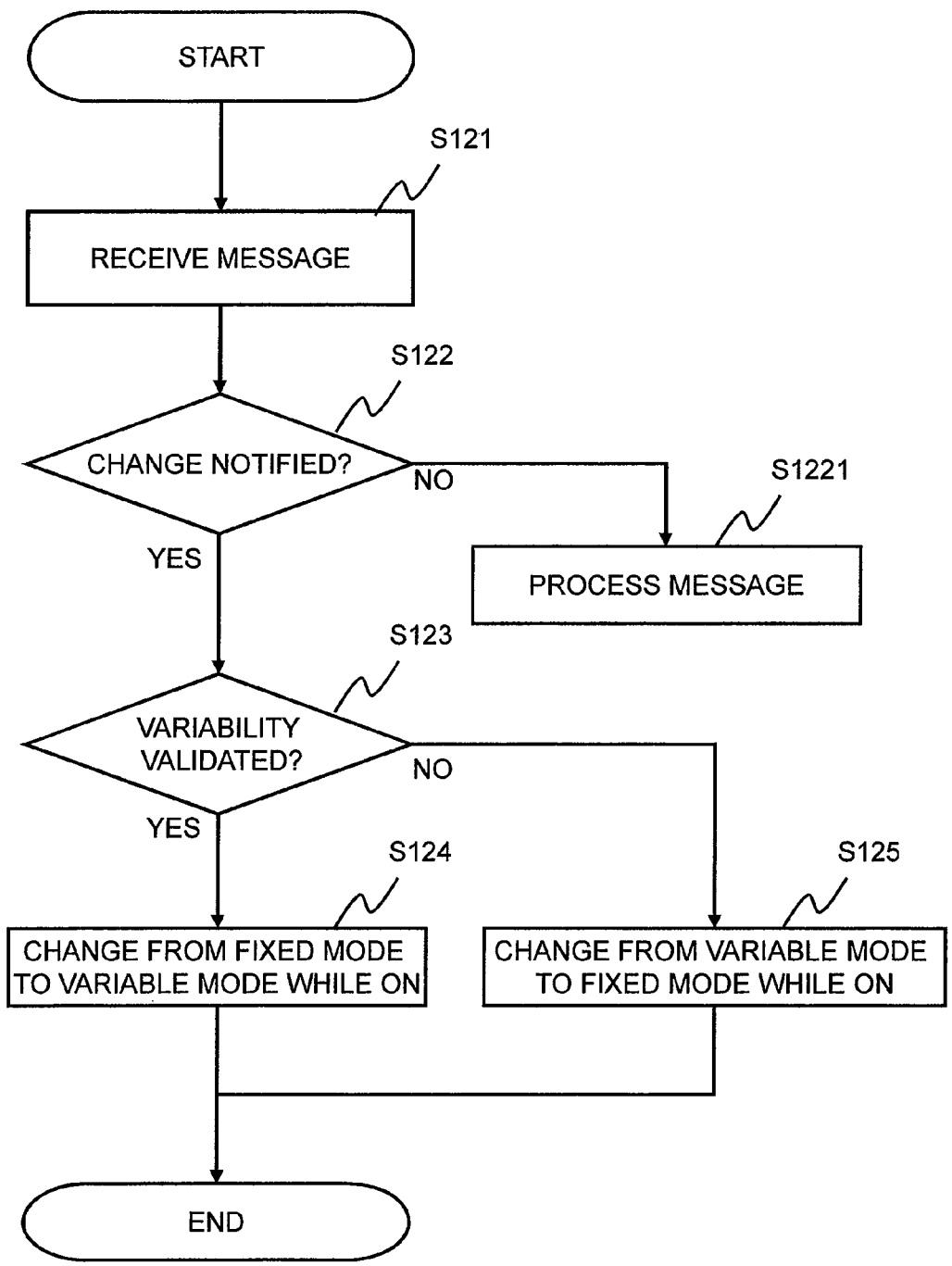
FIG. 12 shows a flowchart of a setting change during system operation (while ON).

FIG. 12 shows a flowchart of a setting change performed during system operation (while ON).

During system operation (while the storage system 11 is operating), the control program 1141 monitors for a message (a command type) from the management terminal 13, and in Step 121, receives a message. Furthermore, "during system operation" refers to a state during which the CTLs 0 and 1 are able to receive an I/O command from the host 12.

Next, in Step 122, the control program 1141 analyzes the type of this message, and in a case where the message relates to a setting change for the relevant function (Step 122: YES), proceeds to Step 123.

In Step 123, the control program 1141 determines whether the function has become valid or invalid in accordance with this message, and in a case where the function has been made valid (Step 123: YES), carries out the validation process in Step 124, and in a case where the function has been made invalid (Step 123: NO), carries out the invalidation process in Step 125. These respective setting change processes will be explained below.

Figure 13:
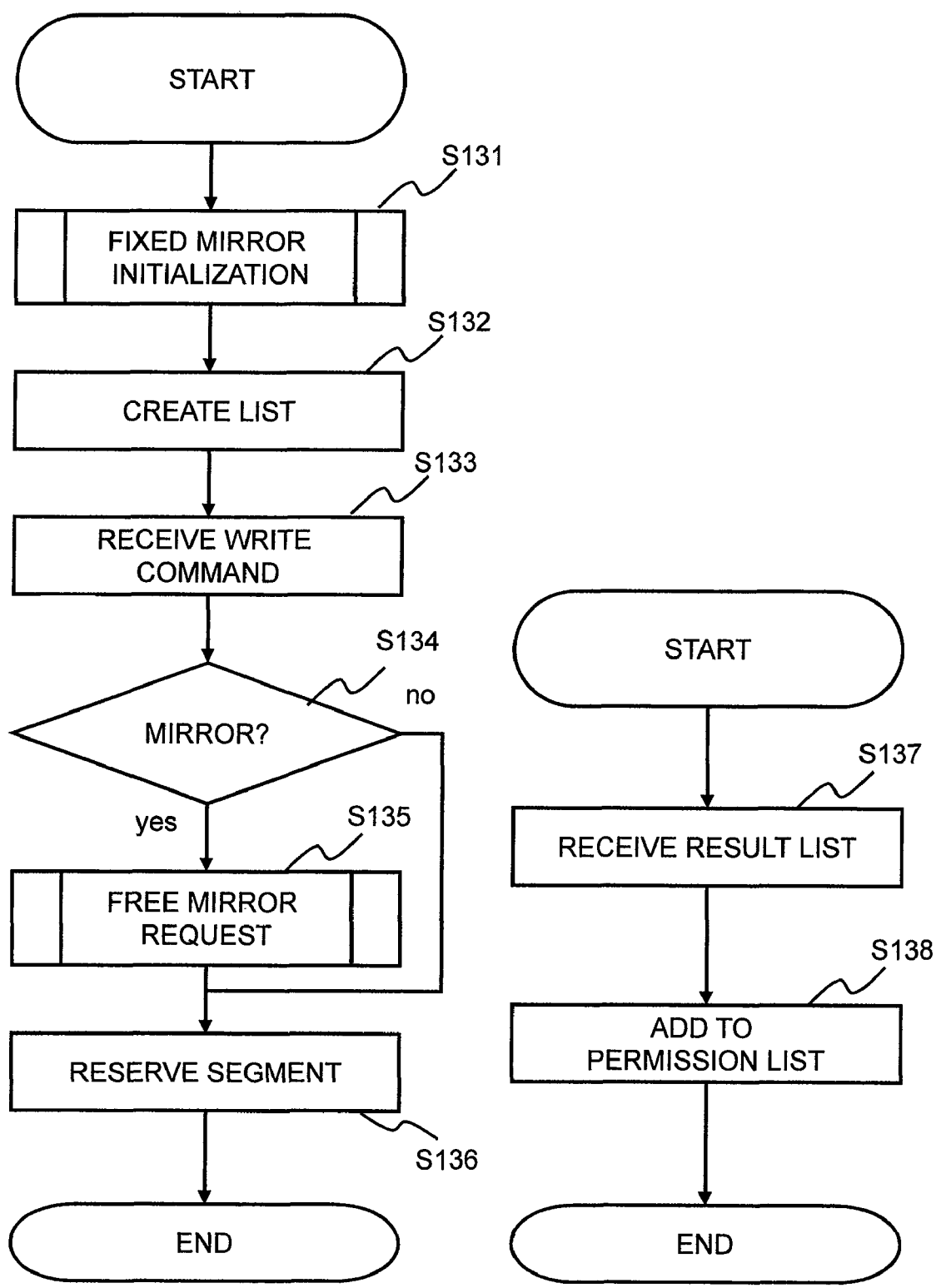

FIG. 13 shows a flowchart of a while-ON setting change from the variable mirror mode to the fixed mirror mode.

First, in Step 131, fixed mirror initialization is carried out. In a case where the information of the other-system controller has already been acquired at this time, there is no need to perform an information exchange again. As described above, initialization is carried out, and a parameter is updated. At this point in time, the CM area is fixedly partitioned into an original area for holding user data and a mirror area for holding mirror data, but mirror data stored in the variable mirror mode remains in the respective CM areas.

Subsequent to the setting change, a delete of the registration of the mirror data stored when the variable mirror mode was valid is gradually carried out. The rest of the flowchart shows write command processing while switching to the fixed mirror mode.

In a case were a write command is received from the host 12 at a time when the mirror data stored in the variable mirror mode still remains in the CM area, the control program 1141 searches for a segment that meets all of the following conditions (1) through (4) as a reserbable segment:

(1) An own-system segment inside the original area;
(2) Either a "free" or a "clean" own-system segment;
(3) An own-system segment that is not the own-system segment associated with the "m-dirty" other-system segment; and
(4) An own-system segment that is not an own-system segment storing the original data of the mirror data inside the other-system segment.

Furthermore, the "mirror" own-system segment in this processing flow is the segment that stores the mirror data created in the variable mirror mode.

The control program 1141 creates a reserbable segment list (reservation permission list) immediately after the setting change in Step 132.

Thereafter, in Step 133, upon receiving a write command, the control program 1141 first checks for the presence of a "mirror" own-system segment. In a case where a "mirror" own-system segment exists, the control program 1141 requests that the other-system CTL free the mirror. The own-system segment to be reserved for the user data to be written is specified from the list created in Step 132.

In accordance with conditions (3) and (4) above, the status of the other-system segment associated with the segment in this list is guaranteed not to be "dirty" or "mirror", thereby making it possible to overwrite mirror data to the other-system segment associated with this own-system segment.

After these own-system segment and other-system segment have been reserved, a normal write command process is carried out thereafter.

Left as created in Step 132, the reservation permission list eventually becomes insufficient, and so each time a mirror is freed, the control program 1141 adds the freed own-system segment to this list. This processing is carried out in Steps 137 and 138.

Since freeing all the areas at one time would have a significant impact on I/O performance, the mirror-freeing process is executed for each of the fixed areas. In turn, the other-system CTL also carries out processing for freeing the mirror area. In accordance with this, the freeing of the "mirror" own-system segment and the "m-dirty" and "m-clean" other-system segments (for example, the deletion of the registration of the "m-dirty" and "m-clean" other-system segments from the own-system mirror table) is pushed forward.

At the point in time when the "mirror" own-system segment and the "m-dirty" and "m-clean" other-system segments are ultimately done away with, the switch to the fixed mirror mode comes to an end in both CTLs.

The reservation permission list described above constitutes a list of "free" and "clean" own-system segments at this time, and this list is used as a free segment management list thereafter, enabling operation to continue.

Figure 14:
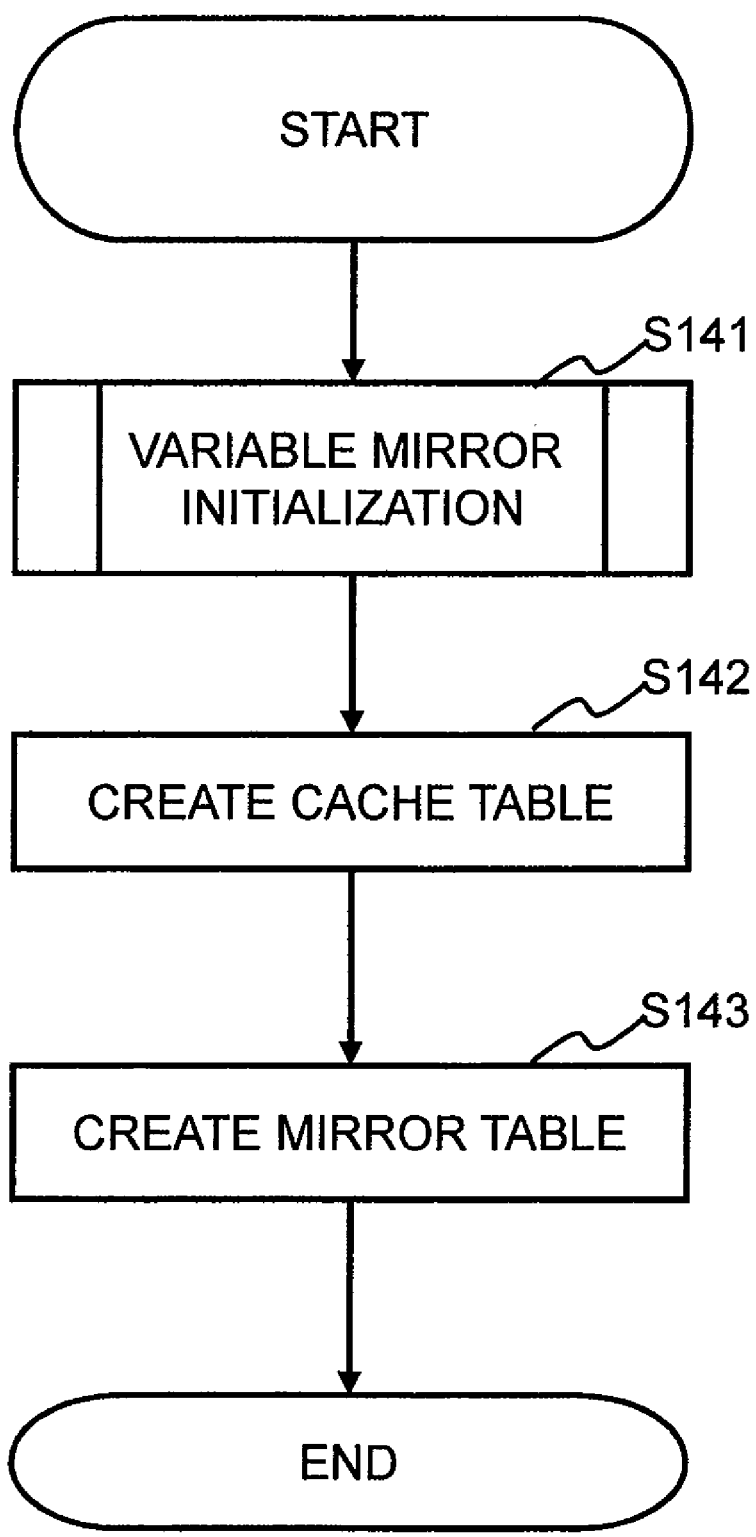

FIG. 14 shows a flowchart of a while-ON setting change from the fixed mirror mode to the variable mirror mode.

In Step 141, the initialization of the variable mirror mode is carried out. In a case where the information of the other-system CTL has already been acquired at this time, there is no need to carry out the exchange of information once again.

The control program 1141, subsequent to setting the parameter as described above, initializes and creates the cache table 11422 in Step 142. Information related to the "clean" and "dirty" own-system segments is registered in the cache table 11422 at this point. Further, information (for example, the "mirror" status) related to the own-system segment, which is used as the mirror area during the fixed mirror mode and in which mirror data from the other-system is stored, is registered in the cache table 11422.

Next, in Step 143, the control program 1141 initializes and creates the mirror table 11423. Information (for example, the status "m-dirty") related to the other-system segment of the mirror destination of the "dirty" own-system segment, is added to the mirror table 11423. In this case, since the table may simply be updated without having to re-reserve the data inside the CM area and between the CM areas, it is possible to carry out a setting change without halting the reception of an I/O command from the host 12.

Figure 15:
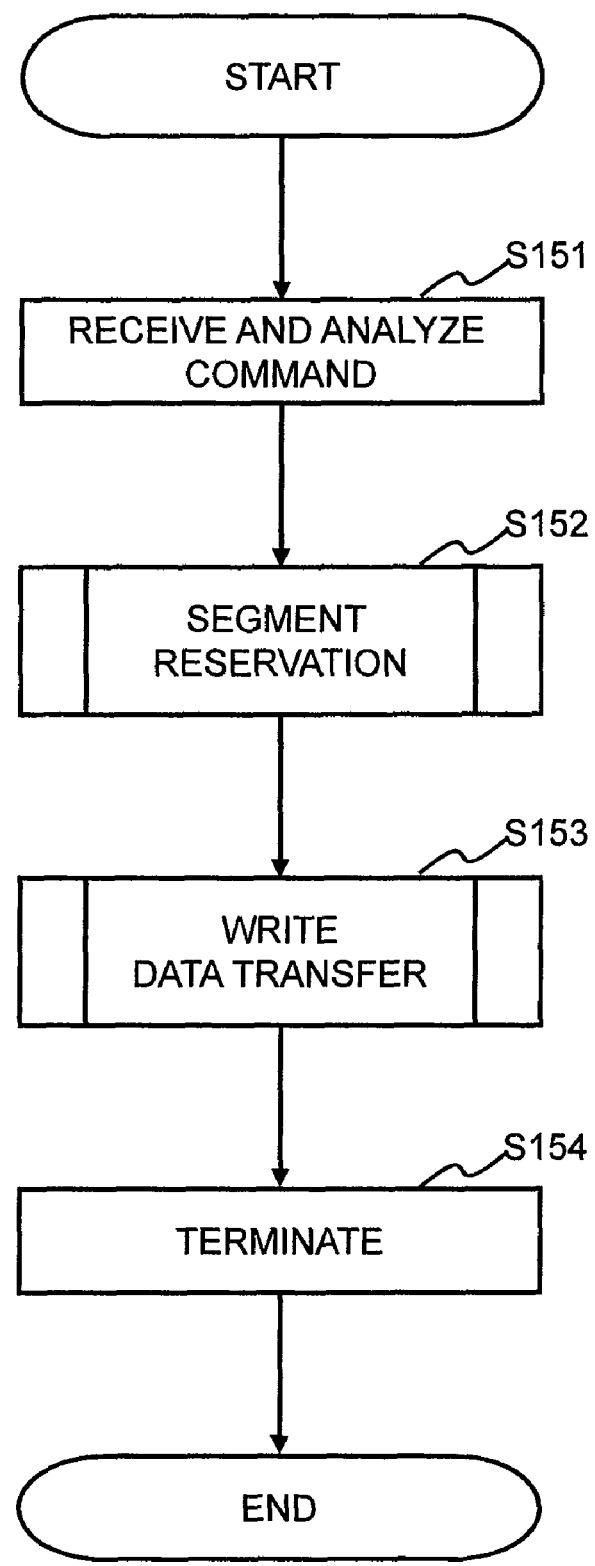
FIG. 15 shows a flowchart of write command processing.

FIG. 15 shows a flowchart of write command processing. Furthermore, the following explanation is premised on the fact that the variable mirror mode is valid.

In Step 151, the control program 1141 of the own-system CTL receives and analyzes a write command. The target LUN and LBA, the data length, and the fact that the command is a write command are specified at this point.

Next, in Step 152, the control program 1141 reserves the own-system segment that will be used as the storage destination for the write data, and the other-system segment (the mirror segment) that will be used as the storage destination for the mirror data of the write data. The process for reserving a segment will be explained in detail below.

In Step 153, the control program 1141 transfers the write data received from the host to the address of the segment reserved in Step 152. The status of the respective segments in which the data is stored will transition. That is, the status of the own-system segment in which the write data is stored will be updated to "dirty" in the own-system cache table. Furthermore, the address of the other-system segment of the write data (mirror data) storage destination is registered in the own-system mirror table, and, in addition, "m-dirty" is registered as the status of this other-system segment in the own-system mirror table. Conversely, the other-system CTL, which does not own the target LU, updates the status corresponding to the mirror data storage-destination segment to "mirror" in the other-system cache table.

Lastly, in Step 154, the control program 1141 of the own-system CTL notifies the host 12 that data transfer has been completed, and ends the processing.

Figure 16:
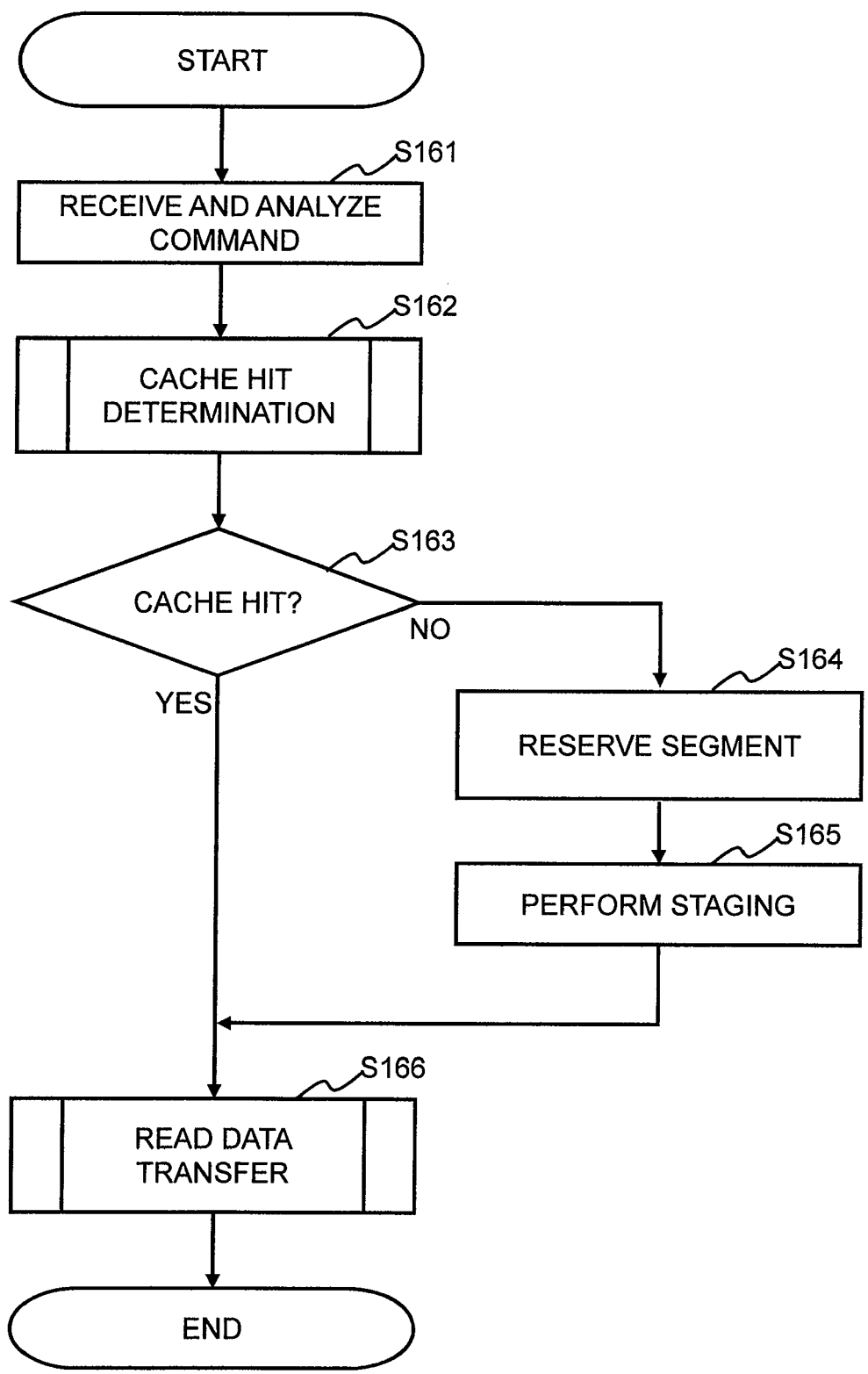
FIG. 16 shows a flowchart of read command processing.

FIG. 16 shows a flowchart of read command processing.

In Step 161, the control program 1141 of the own-system CTL receives and analyzes a read command. The target LUN and LBA and the fact that the command is a read command are specified at this point.

Next, in Step 162, the control program 1141 determines whether or not the read-targeted data (the data corresponding to the target LUN and LBA) exists inside the own-system CM area. The processing of this cache hit determination will be explained in detail below. The control program 1141 references the result of the cache hit determination, and branches processing in Step 163 in accordance with whether there was a cache hit or not.

In a case where there was no cache hit, in Step 164, the control program 1141 reserves a cache segment for storing the data written in from the LU (the drive 1171 that is the basis of the LU) to the CM area. Since mirroring is not performed when the data is read out from the drive, only an own-system segment is reserved. When the reservation process is complete, in Step 165, the control program 1141 stages the read-targeted data from the drive unit 117 to the own-system segment (the reserved segment). At this time, the control program 1141 updates the status associated with the storage-destination segment of the read-targeted data to "clean".

Lastly, in Step 166, the control program 1141 transfers the read-targeted data in the CM area (either the data for which a hit occurred, or the data read out via Steps 164 and 165) to the host 12, and ends processing.

Figure 17:
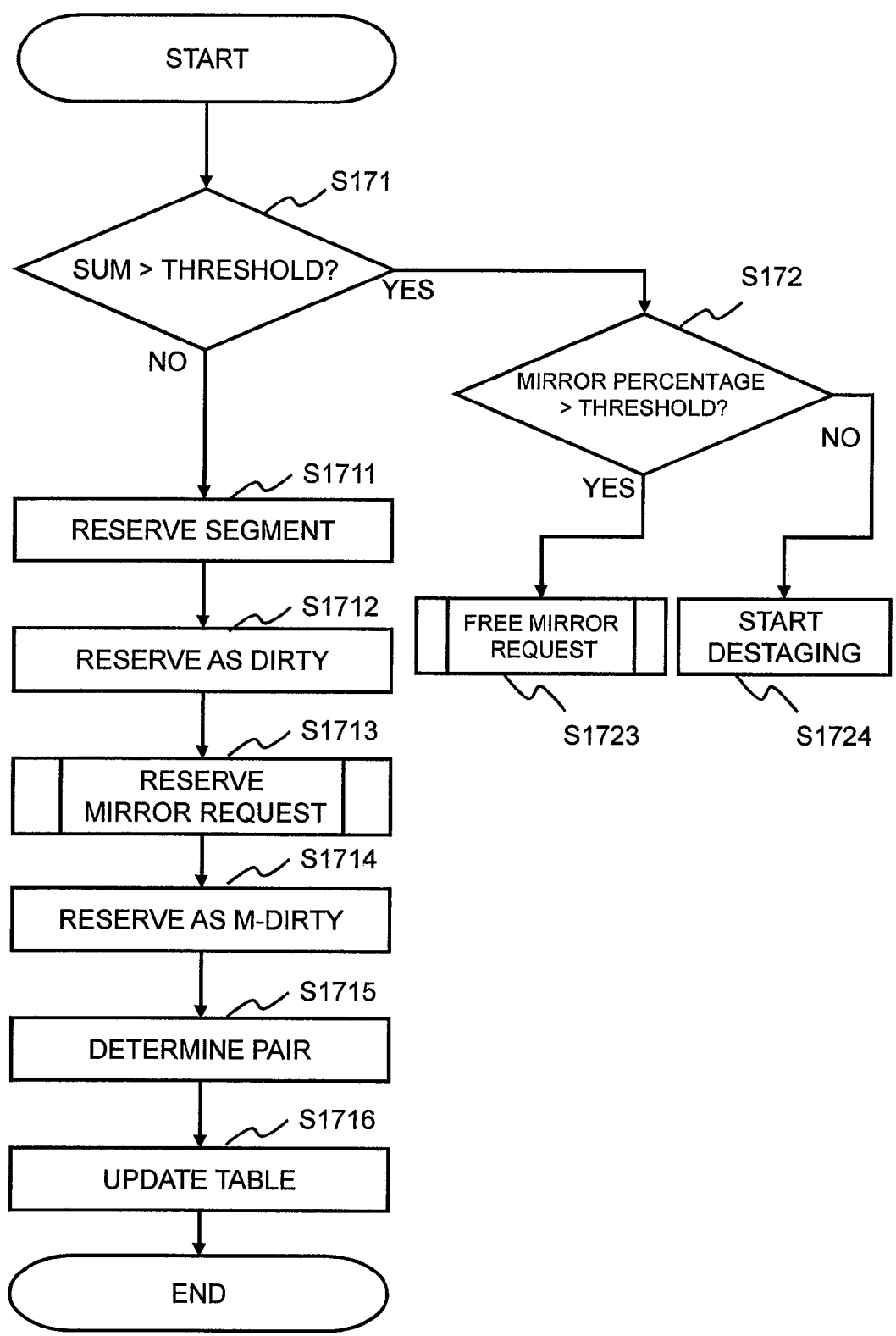
FIG. 17 shows a flowchart of the details of the processing of Step 152 of FIG. 15, which is processing performed in the own-system CTL.

FIG. 17 shows a flowchart of the details of the processing of Step 152 of FIG. 15, which is processing performed by the own-system CTL.

In Step 171, the control program 1141 of the own-system CTL checks to make sure that the current CM area usage does not exceed the entry restriction threshold. The total capacity of the "dirty" own-system segment will be called the "dirty capacity", and the total capacity of the "mirror" own-system segment will be called the "mirror capacity". Since these segments could be storing data that has not been destaged, it is not possible to reserve these segments for storing new data. Accordingly, the control program 1141 determines whether or not the sum of the dirty capacity and the mirror capacity exceeds the preset entry restriction threshold.

In a case where the sum of the dirty capacity and the mirror capacity exceeds the entry restriction threshold (Step 171: YES), the control program 1141 (for example, the own-system CTL and the other-system CTL) restricts the entry of an I/O (for example, restricts the entry of a write). In accordance with this, the number of I/O commands (for example, write commands) received per unit of time decreases, and therefore, the numbers of "dirty" and "mirror" own-system segments decrease. In Step 172, the control program 1141 determines whether or not the percentage of the mirror capacity with respect to the dirty capacity exceeds a predetermined setting value (the mirror capacity threshold).

In a case where the percentage of the mirror capacity exceeds the mirror capacity threshold (Step 172: YES), the control program 1141 requests the other-system CTL to free a mirror (Step 1723). The mirror freeing process will be described in detail below. In a case where the mirror is freed normally and the own-system CTL has received a list of freed other-system segments from the other-system CTL, the control program 1141 of the own-system CTL updates the status of the own-system segment associated with the other-system segment cited in the list (the segment status in the own-system cache table) to "free". According to Step 1723, the segments capable of being reserved in the own-system CM area in accordance with the mirror that was freed in the other-system CM area increase, that is, there is an indirect increase of reservable own-system segments.

In a case where the percentage of mirror capacity is less than the mirror capacity threshold in Step 172 (Step 172: NO) (for example, a case in which the dirty capacity is greater than a fixed amount compared to the mirror capacity), in Step 1724, the control program 1141 destages the dirty data inside the "dirty" own-system segment, updates the status of this own-system segment (segment status in the own-system cache table) from "dirty" to "clean", and, in addition, updates the status of the other-system segment storing the mirror data of the destaged data (the segment status in the own-system mirror table) from "m-dirty" to "m-clean". In accordance with Step 1724, the segments capable of being reserved in the own-system CM area are increased by the destaging of the dirty data, that is, there is an indirect increase in reservable own-system segments.

Furthermore, a determination is made in accordance with the ratio between the mirror capacity and the dirty capacity at this point as to which of the Steps, i.e. Step 1723 or Step 1724, should be used to increase the reservable own-system segments. Step 1723 may be selected in a case where the mirror capacity is larger than the dirty capacity, and Step 1724 may be selected in a case where the dirty capacity is larger than the mirror capacity. Furthermore, for example, in a case where the mirror capacity and the dirty capacity are the same, the number of reservable own-system segments increased in accordance with Step 1723 may be the same as the number of reservable own-system segments increased in accordance with Step 1724. Also, in a specific case, for example, in a case where I/O are concentrating on the CTL 0, the CTL 0 may cause the CTL 1 to perform a mirror freeing process by temporarily changing the CTL 0 mirror capacity threshold.

Now then, in a case where the sum of the dirty capacity and the mirror capacity is less than the entry restriction threshold in Step 171 (Step 171: NO), in Step 1711, the control program 1141 reserves an own-system segment as a write data storage destination. The status of the reserved segment is either "free" or "clean", but there is no need to limit the reservation of a segment to this type of segment.

The reserved segment is reserved as "dirty" in Step 1712.

Next, in Step 1713, the control program 1141 issues a request (mirror reservation request) to the other-system CTL to reserve an other-system segment to serve as the storage destination for the mirror data. The MPU of the other-system CTL receives the mirror reservation request, reserves an other-system segment, and returns the result. The reservation process will be explained in detail below. The segment obtained at this point is reserved as "m-dirty" in Step 1714.

Since a pair comprising a "dirty" own-system segment and a "m-dirty" other-system segment was obtained via the above processing (Step 1715), the control program 1141 updates the own-system cache table and the own-system mirror table in Step 1716. Specifically, the status of the own-system segment reserved in Step 1712 (the segment status in the own-system cache table) is updated to "dirty", and the status of the other-system segment reserved in Step 1714 (the segment status in the own-system mirror table) is updated to "m-dirty".

Lastly, the result is returned to the CTL of the source of the segment reservation request, and the processing of FIG. 17 is ended. The status transition of the reserved segment may be executed when the data is actually stored.

Figure 18:
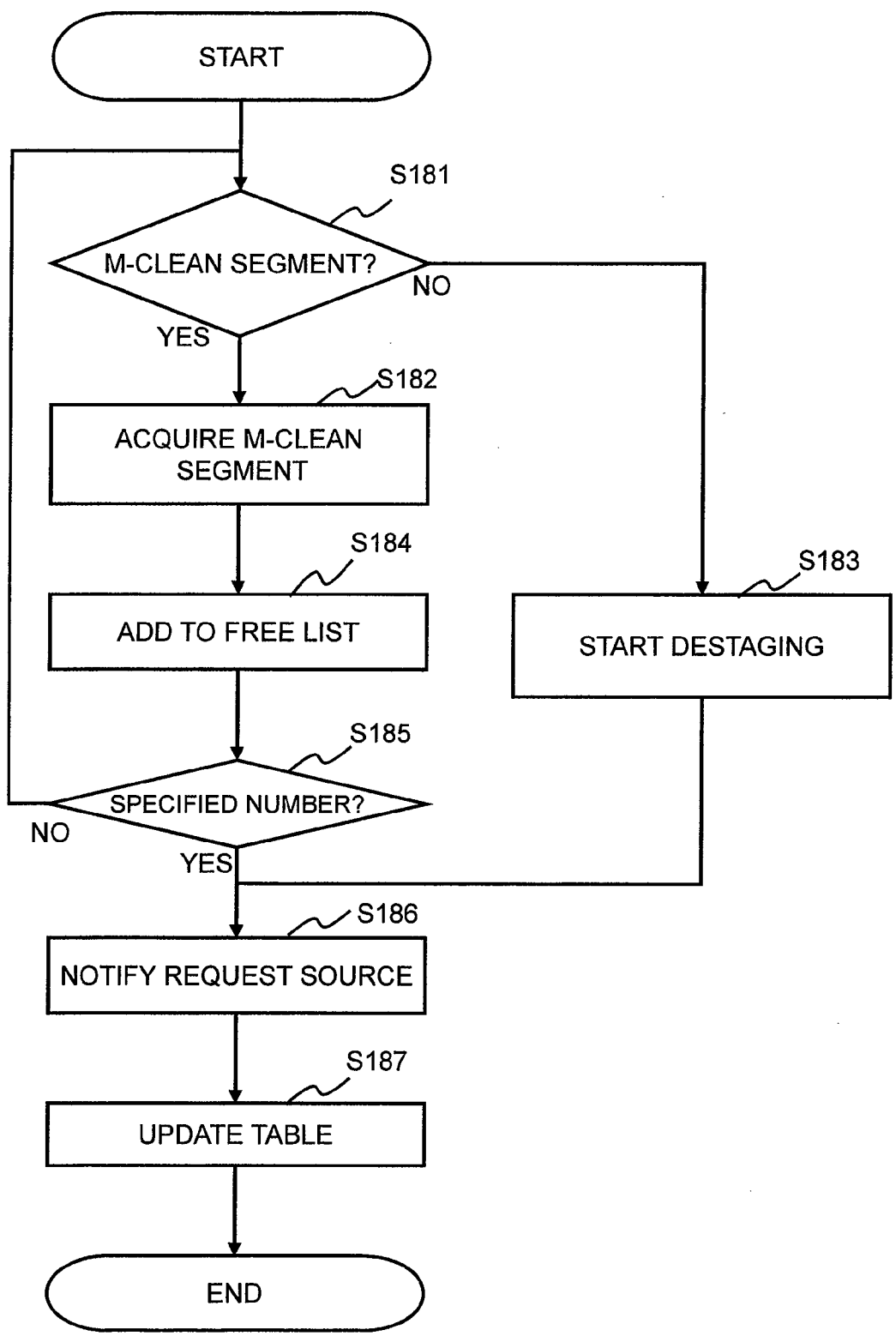
FIG. 18 shows a flowchart of a mirror freeing process carried out by the other-system CTL that received the free-mirror request in Step 1723 of FIG. 17.

FIG. 18 shows a flowchart of a mirror freeing process carried out by the other-system CTL that received the free-mirror request in Step 1723 of FIG. 17.

In the mirror freeing process, the registrations of the "m-dirty" and "m-clean" own-system segments are deleted from the other-system mirror table in the other-system CTL. In accordance with this, the own-system cache table statuses of "mirror" which are pointed as "m-dirty" or "m-clean" in other-system mirror table are updated to "free'. As a result of this, there is an increase in reservable own-system segments. Mirror freeing is executed when the other-system CTL receives the free-mirror request from the own-system CTL.

In Step 181, the control program of the other-system CTL (the other-system control program) references the other-system mirror table and checks whether or not there is a "m-clean" own-system segment.

In a case where a "m-clean" own-system segment exists (Step 181: YES), in Step 182, the other-system control program acquires the address of the "m-clean" own-system segment, and in Step 184, adds the acquired address to the free list.

In a case where the number of addresses listed in the free list has not reached a fixed number (Step 185: NO), Step 181 is carried out once again.

In a case where the number of addresses listed in the free list has reached a fixed number (Step 185: YES), in Step 186, the other-system control program sends the free list to the own-system CTL. In accordance with this, the own-system control program is able to update the status of the own-system segment whose address appears on the free list (the segment status in the own-system cache table) from "mirror" to "free".

Lastly, in Step 187, the other-system control program updates the status of the freed own-system segment from "m-clean" to "m-free". Furthermore, the number of freed own-system segments may be specified by the source of the request (the own-system CTL), or may be a fixed value.

In a case where an "m-clean" own-system segment does not exist, or in a case where it was not possible to add the fixed number of addresses to the free list, there will be numerous "m-dirty" own-system segments. For this reason, destaging is carried out in Step 183. That is, the other-system control program destages the dirty data inside the "dirty" other-system segment, updates the status of this other-system segment (the segment status in the other-system cache table) from "dirty" to "clean", and, in addition, updates the status of the own-system segment associated with this "dirty" other-system segment (the segment status in the other-system mirror table) from "m-dirty" to "m-clean". Thereafter, processing proceeds to Step 186, and the free list of addresses of currently reservable own-system segments is notified to the own-system CTL (the source of the request). A method may be employed by which either a free-mirror request is received once again after that, or the mirror freeing process is rebooted when destaging is complete.

Figure 19:
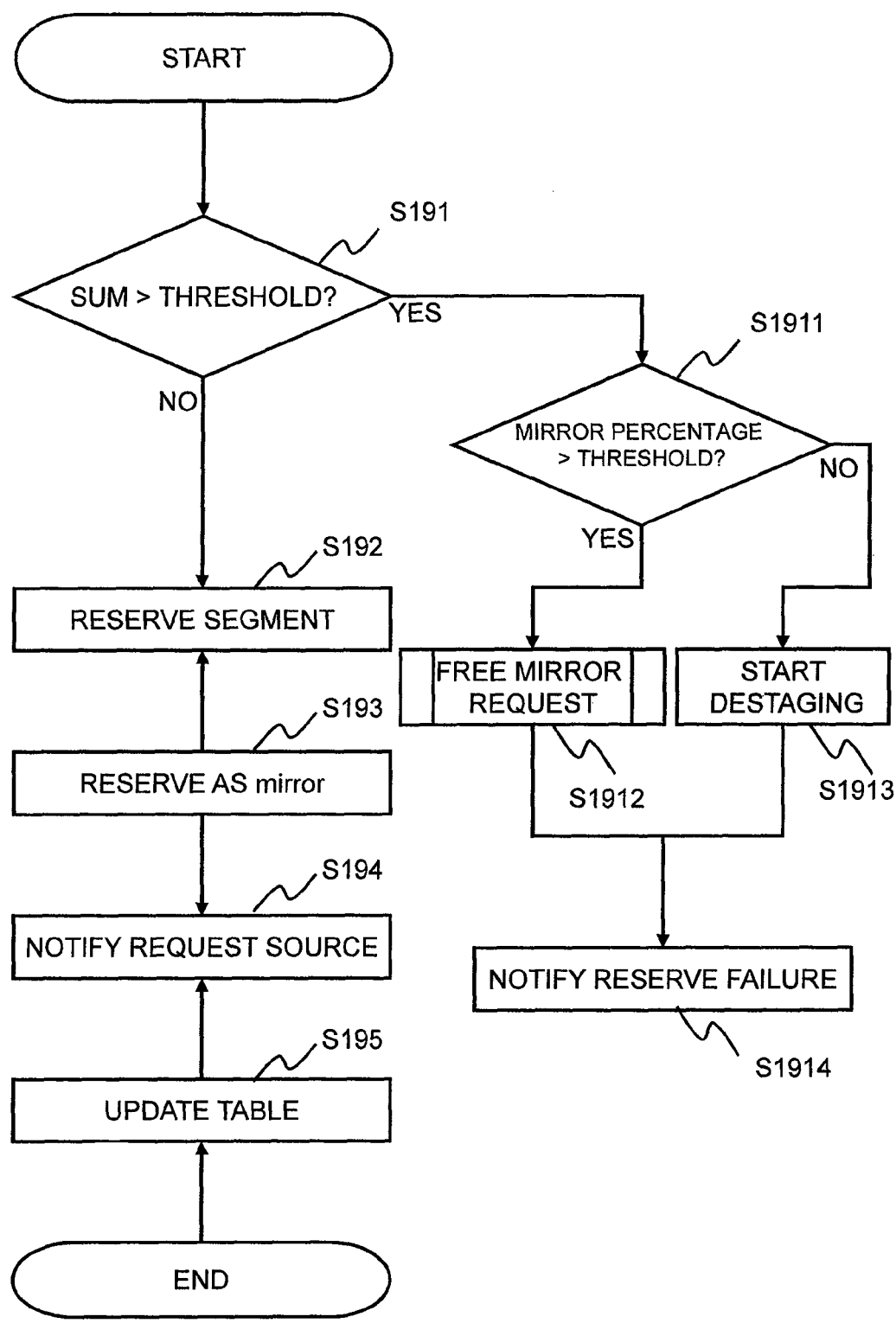
FIG. 19 shows a flowchart of processing carried out by the other-system CTL that received the mirror reserve request in Step 1713 of FIG. 17.

FIG. 19 shows a flowchart of processing carried out by the other-system CTL that received the mirror reservation request in Step 1713 of FIG. 17.

In Step 191, the other-system control program references the other-system cache table, and checks whether or not the sum of the dirty capacity and the mirror capacity in the other-system CM area exceeds the entry restriction threshold of the other-system CTL.

In a case where the sum of the dirty capacity and the mirror capacity exceeds the entry restriction threshold (Step 191: YES), in Step 1911, the other-system control program checks whether or not the percentage of the mirror capacity with respect to the dirty capacity exceeds the mirror capacity threshold of the other-system CTL.

In a case where the percentage of the mirror capacity exceeds the mirror capacity threshold (Step 1911: YES), the other-system control program issues a request to the own-system CTL to free the mirror. In this case, the processing of FIG. 18 is carried out by the own-system CTL. In accordance with this, the segment status in the other-system cache table for the "m-clean" other-system segment is updated from "mirror" to "free". That is, there is an increase in reserbable other-system segments.

In a case where the percentage of the mirror capacity is less than the mirror capacity threshold (Step 1911: NO), the other-system control program destages the dirty data inside the "dirty" other-system segment.

In Step 1914, the other-system control program notifies the source of the request (the own-system CTL) that the segment reservation process failed and the reason therefor without waiting for the completion of mirror freeing in Step 1912 and the completion of destaging in Step 1913. The source of the request (the own-system CTL) once again sends a request to the other-system CTL to reserve a mirror segment at a time when the cause of the failure should have been eliminated (for example, when a fixed period of time has elapsed since receiving the notification).

In a case where the sum of the dirty capacity and the mirror capacity is less than the entry restriction threshold (Step 191: NO), the other-system control program references the other-system cache table and reserves the required number of "free" and/or a "clean" other-system segments. In Step 193, the reserved other-system segment is reserved as "mirror", and in Step 194, a list of the addresses of these other-system segments reserved as "mirror" is notified to the own-system CTL, the source of the request. Lastly, in Step 195, the other-system control program updates the segment status in the other-system cache table of the other-system segments reserved in Step 193 to "mirror".

Figure 20:
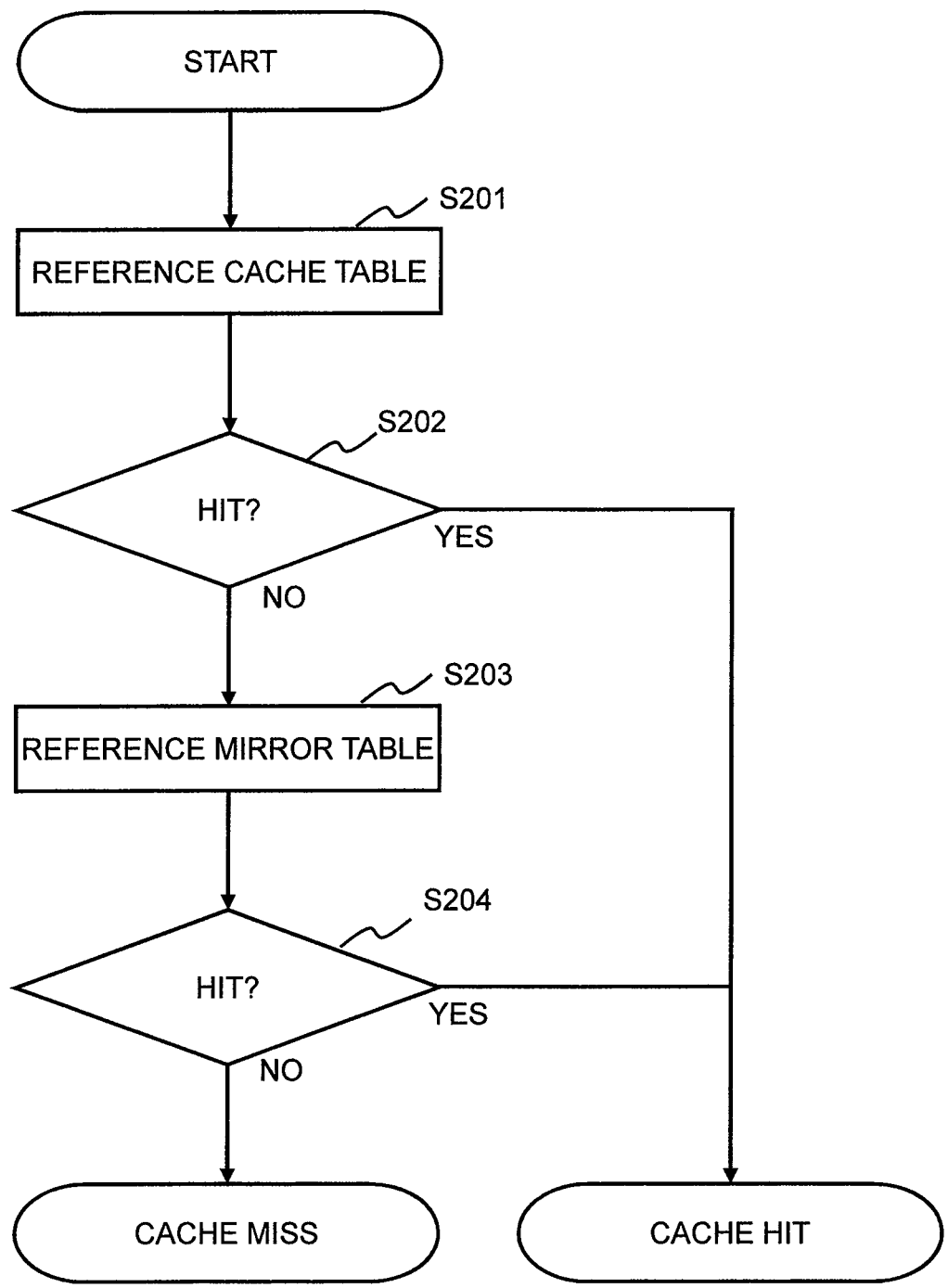
FIG. 20 shows a flowchart of the cache hit determination processing of Step 162 of FIG. 16.

FIG. 20 shows a flowchart of the cache hit determination processing of Step 162 in FIG. 16. This determination processing may also be executed for a write command process.

First, in Step 201, the own-system control program references the own-system cache table and checks to make sure data conforming to the command exists inside the own-system CM area. Specifically, the own-system control program searches for the "dirty" and "clean" own-system segments corresponding to the LDEV number and LBA that correspond to the target address (LUN and LBA) specified in the command. In a case where the relevant segments are found at this time, a cache hit occurs, and in a case where the relevant segments are not found, Step 203 is carried out.

Even when the data conforming to the command has been deleted from the own-system CM area, there is the likelihood that the mirror data of this data still exists in the other-system CM area, and for this reason, in Step 203, the own-system control program references the own-system mirror table. A case in which the data does not exist in the own-system CM area is one in which the data has been overwritten with other data subsequent to being written to the LU, and in a case where the mirror data still exists, the "m-clean" other-system segment storing this mirror data is managed by the own-system mirror table. In a case where the relevant "m-clean" other-system segment (the other-system segment corresponding to the LDEV number and LBA that correspond to the target address (LUN and LBA)) are found in the own-system mirror table, a cache hit occurs. However, since the mirror data exists in the other-system CM area, the mirror data is transferred from the other-system CM area to the own-system CTL area.

Figure 21:
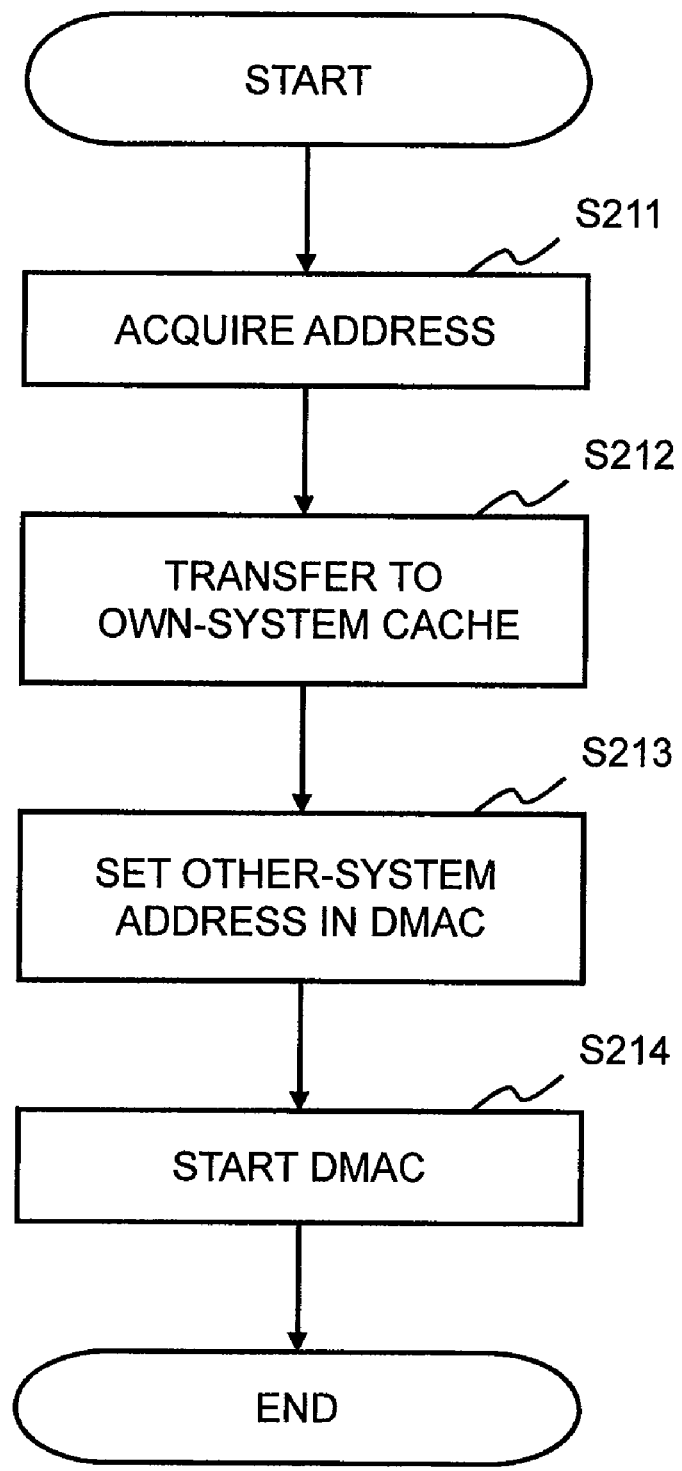
FIG. 21 shows a flowchart of the processing of Step 153 of FIG. 15.

FIG. 21 shows a flowchart of the processing of Step 153 of FIG. 15.

In Step 211, a transfer-destination address is acquired. This is the address of the other-system segment that was reserved in the cache segment reservation process (the processing of Step 152 of FIG. 15 and the processing of FIG. 17).

Next, in Step 212, the own-system control program first transfers the write data from the host 12 to the own-system CM area (the reserved own-system segment).

Thereafter, in Step 213, the own-system control program sets the transfer-source address (address of the own-system segment that is the write-data storage destination of Step 212) and the transfer-destination address acquired in Step 211 in the own-system DMAC. Then, in Step 214, the own-system control program boots up the DMAC and ends the processing.

Figure 22:
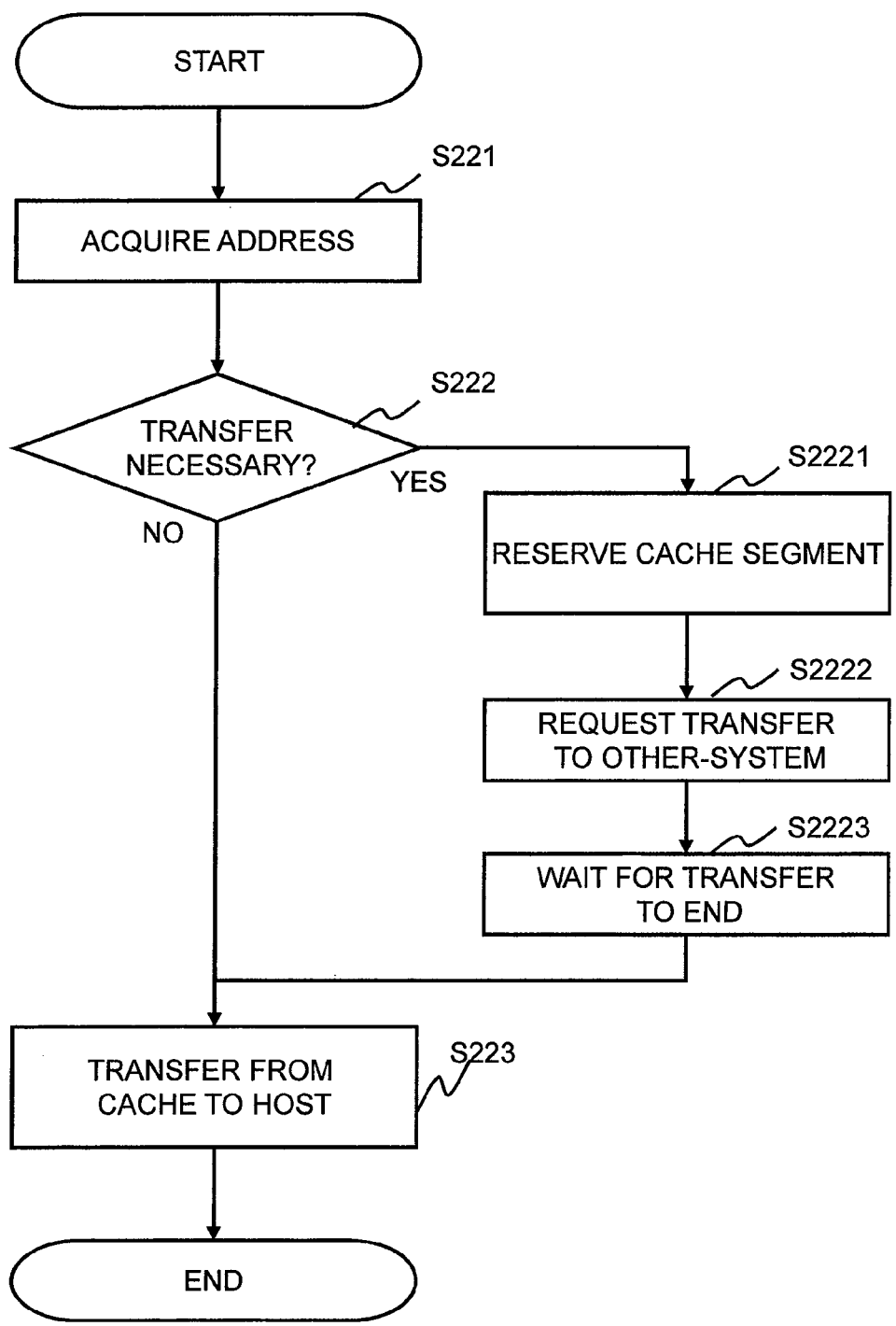
FIG. 22 shows a flowchart of the processing of Step 166 of FIG. 16.

FIG. 22 shows a flowchart of the processing of Step 166 of FIG. 16.

In Step 221, the transfer-source address is acquired. This is either the address of the segment for which the cache hit occurred in the cache hit determination (processing of FIG. 20) of Step 162 of FIG. 16, or the address of the segment reserved in the cache segment reservation process of Step 164 of FIG. 16.

In Step 222, the own-system control program determines whether or not the transfer source is an other-system segment. This determination may also be carried out by referencing the entry (either the own-system cache table of the own-system mirror table) of the segment for which the cache hit occurred.

In a case where the transfer source here is an other-system segment (Step 222: YES), the own-system control program reserves an own-system segment (Step 2221), sends the address of the reserved own-system segment and a data transfer request to the other-system CTL (Step 2222), and waits for the transfer (Step 2223). After the data has been stored in the own-system segment (the segment reserved in Step 2221) from the other-system segment (transfer source), the own-system control program transfers the data inside this own-system segment to the host 12.

Furthermore, in the case of Step 222: YES, instead of the processing of Step 2221 and beyond, the read-targeted data inside the other-system segment may be transferred to the host 12 from the other-system segment by way of the other-system host I/F.

Figure 23:
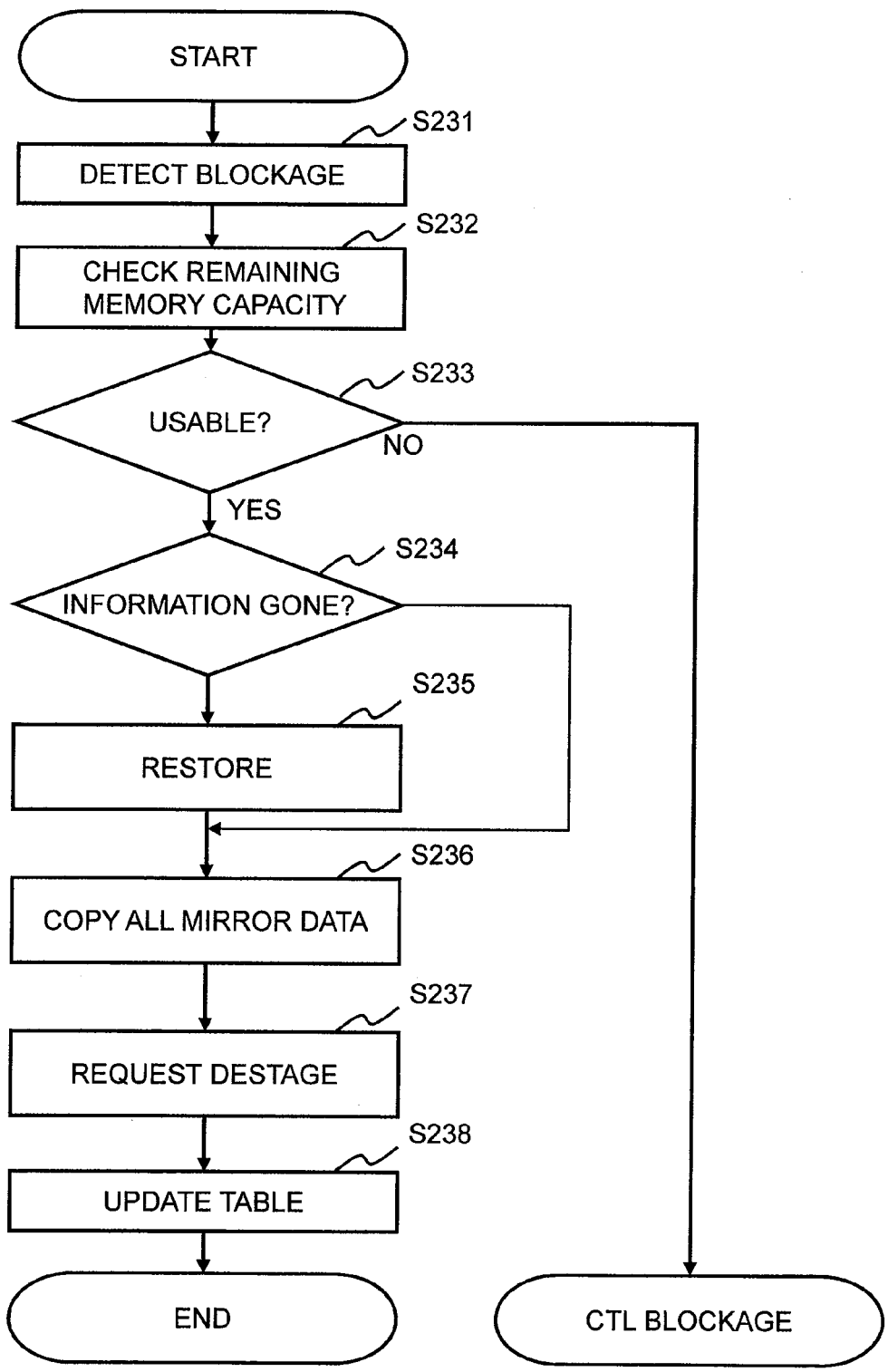
FIG. 23 shows the flow of processing for coping with a case in which a blockage occurs in a CM area due to a failure of some sort during system operation.

FIG. 23 shows the flow of processing in a case where a blockage of the CM area has occurred as a result of some sort of failure during system operation. In the following explanation, it is supposed that a failure has occurred in the own-system CTL, and that the own-system CM area is blocked.

First, in Step 231, the own-system control program detects a blockage of the own-system CM area.

Next, in Step 232, the own-system control program checks the total amount of own-system CM area currently capable of being used, and in Step 233, checks whether or not continued operation is possible using the remaining capacity thereof. That is, the own-system control program determines whether or not there is an area of a size that will make it possible to store user data including the mirror data (for example, mirror data sent from other-system CTL and stored in the own-system CM area). In a case where the determination is that continued operation is not possible (Step 223: NO), the own-system CTL is blocked, and operation of the other-system CTL (a single CTL) commences. Furthermore, as used here, "control information" is information other than user data that is required for the operation of the storage system 11, for example, configuration management information (will be explained below), setting information, and information used in cache control (tables, bitmaps, and so forth).

By contrast, in a case where the determination is that continued operation is possible (Step 223: YES), repair work is carried out to continue operation. First, in Step 234, the own-system control program checks whether or not the own-system configuration management information was lost in the failure. As used here, configuration management information is information comprising the own-system cache table and so forth. In a case where the configuration management information has been lost (Step 234: NO), in Step 235, configuration management information is acquired from the other-system, and based on this information, the own-system configuration management information is restored.

In Step 236, since there is the possibility that the data inside the "mirror" other-system segment is the mirror of the data inside the "dirty" own-system segment, the data inside all the "mirror" other-system segments is copied to the own-system CM area.

Next, in Step 237, since there is a possibility that the mirror of the data inside the "dirty" other-system segment was lost from the own-system CM area, the own-system control program issues a request to the other-system CTL to destage the dirty data inside the "dirty" other-system segment.

Lastly, in Step 238, the own-system cache table is updated on the basis of Step 236, and, in addition, the other-system cache table is updated on the basis of Step 237.

According to Example 1 described above, it is possible to store the mirror data of the original data in the own-system CTL in any segment inside the other-system CM area. That is, it is possible to realize the dynamic reservation of mirror segments without fixedly reserving an area for cache mirroring inside the CM area. Further, it is possible to vary the total capacity of the mirror segment in accordance with the utilization status of the CM area. In accordance with this, an unused mirror segment may be omitted, making it possible to count on the highly efficient use of the CM area.

It is also possible to create a combination of original data and mirror data between arbitrary addresses, to delete clean data from the CM area of the CTL that owns the LU storing this clean data, and to leave the mirror data of this clean data in the CM area of the other CTL. In accordance with this, it is possible for a cache hit to occur even without the clean data because the mirror data of this clean data exists. For example, in a case where the sizes of the CM areas differ, a method for leaving most of the mirror data in the largest CM area is conceivable.

Further, even when a failure occurs in the memory during system operation, it is possible to correct the setting so as to carry out cache mirroring using one or more remaining segments excluding the one or more segments belonging to the failure location. In accordance with this, even when a failure occurs in the memory during system operation, it is possible for the storage system to continue operating.

Further, due to the fact that the mirror area setting is flexible, it is possible to adopt procedures for making a setting that is tailored to a specific I/O pattern, for example, to set a smallish mirror area for a CTL with a lot of read commands.

Example 2

A second example will be explained below. In so doing, mainly the differences with the first example will be explained, and explanations of the points in common with first example will either be omitted or simplified.

In the second example, a mirror area (mirror segment) is dynamically reserved in cache mirroring that makes use of hardware to transfer data. In a case in which data transfer hardware is used, a fixed transfer rule must be followed in order to realize the performance of this hardware.

Figure 24:
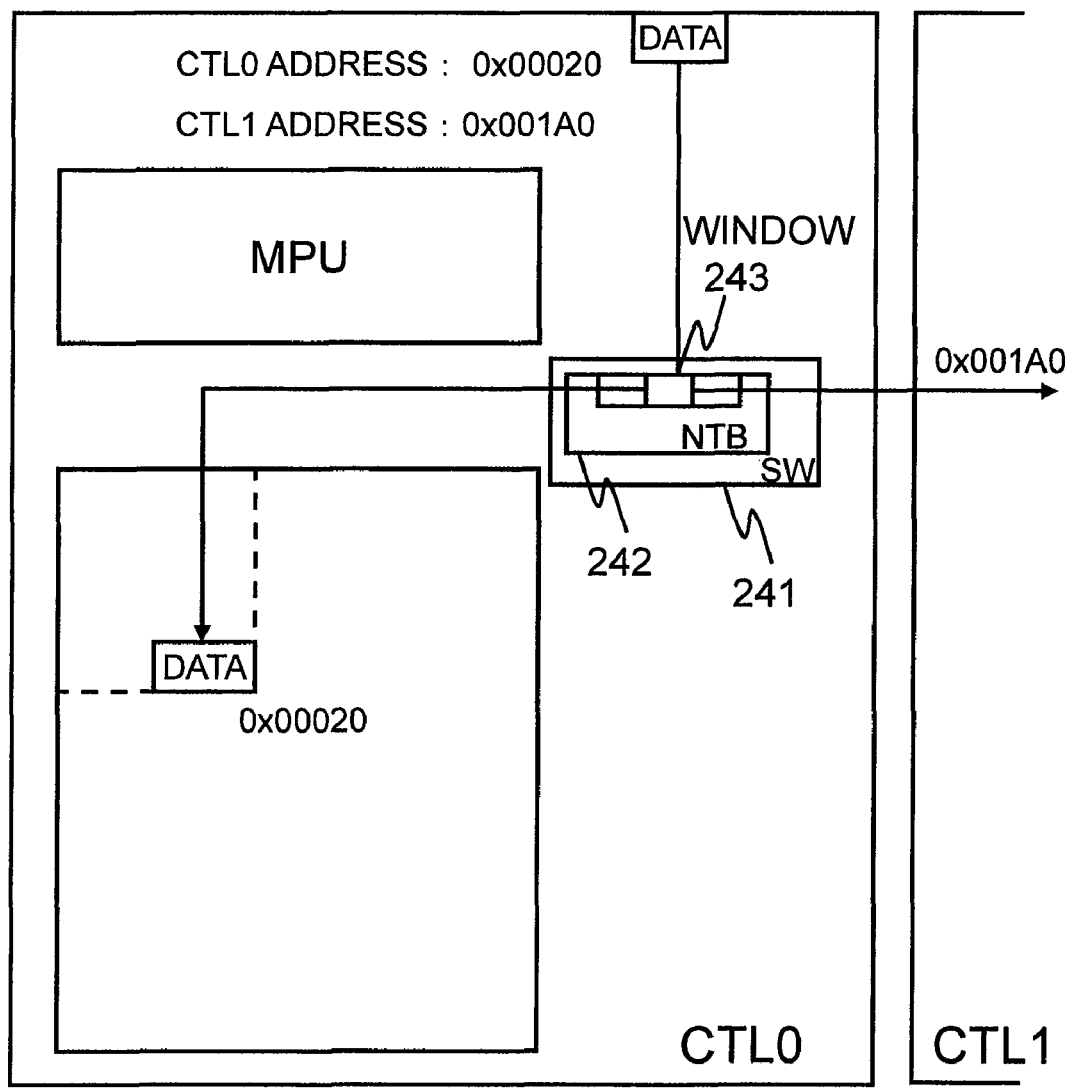
FIG. 24 is a schematic diagram of the transfer of data in a cache mirroring process of a second example.

FIG. 24 is a schematic diagram of the transfer of data in a cache mirroring process of the second example.

A switching device (hereinafter, SW) 241 is used as the device for transferring write data from the host to both the own-system CM area and the other-system CM area. That is, the respective CTLs comprise SW 241.

The SW 241, for example, is a hardware circuit, and possesses a NTB (Non Transparent Bridge) 242. The NTB 242 is a bridge having an address conversion function for connecting domains having different address spaces in the PCI-Express bus. The NTB 242 comprises a window 243 corresponding to the address space of the CM area. The window 243, for example, is a hardware circuit, and is a member, which has a function for carrying out reservation between two different addresses, and which carries out the address conversion of the NTB 242. Going through this window 243 makes it possible to write the same data to a plurality of addresses in order to associate access to a certain address with the associated addresses of a plurality of domains. Because cache mirroring performed using the SW 241 makes it possible to write to two cache addresses at the same time, there is no need to store the write data in the own-system CM area one time as when implementing DMA, thereby reducing MPU processing time and cutting back on bandwidth usage, which in turn can be expected to enhance cache mirroring performance.

Figure 25:
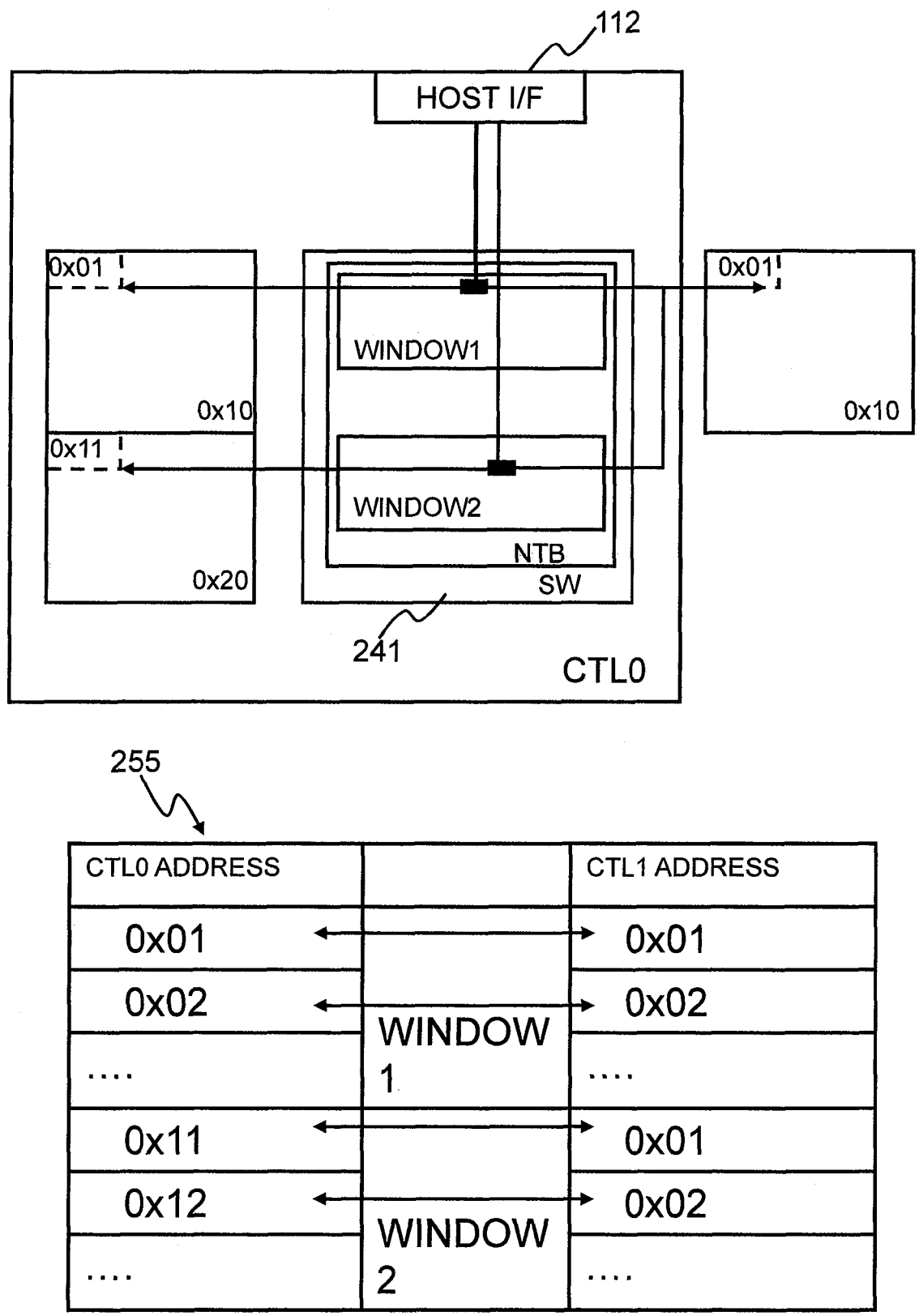
FIG. 25 shows a rough sketch of when there are two windows 243 in a NTB 242.

FIG. 25 shows a rough sketch of when there are two windows 243 in the NTB 242.

It is supposed that the address relationship 255 shown in the drawing is defined beforehand. The MPU, for example is aware of this relationship 255. The MPU, at the time of a data transfer, specifies the address of the reserved own-system segment and the window associated with this address to the host I/F 112. In accordance with this, the write data transfer-destination window is controlled from the host I/F 112.

It is supposed that the CTL 0 received the write data from the host, and reserved the own-system segment "0x01". At this time, the host I/F 112 of the CTL 0 transfers the write data and the target address "0x01" to window 1 of the windows 1 and 2 in accordance with the specification from the own-system MPU. The window 1, in accordance with the address relationship 255, transfers the write data to both the own-system segment "0x01" (the segment that conforms to the specified target address) and the other-system segment "0x01" (the address "0x01" in the CTL1 that is associated with the address "0x01" in the CTL 0).

Similarly, in a case where the own-system segment "0x11" was reserved, the host I/F 112 sends the write data and the target address "0x11" to the window 2. The window 2 transfers the write data to the own-system address "0x11" and to the other-system segment "0x01 associated thereto.

The address relationship 255 denotes the settings of the respective windows. That is, the window 1 transfers the data to the own-system segment and the other-system segment having the same address. The window 2 transfers the data to the own-system segment of the target address in CTL 0 and transfers the data to the other-system segment of the address obtained by subtracting 0x10 from the target address in CTL 1.

Alternately, the SW of CTL 1 (not shown in the drawing), when transferring data from the CTL 1 to the CTL 0, is able to simultaneous transfer the data using the same combination in a case where the SW comprises a window that carries out address conversion opposite that of the CTL 0 window. The window associates successive addresses of a plurality of address spaces as in this example. In this example, there are two windows, and it is possible to increase the association combinations in accordance with the number of windows. In the explanation that follows, the number of windows is set at two, but more windows may be implemented. It is preferable that the window setting be carried out beforehand. This is because it is either impossible to dynamically change the window setting while the system is operating, or the time required for the process is considered too long.

Figure 26:
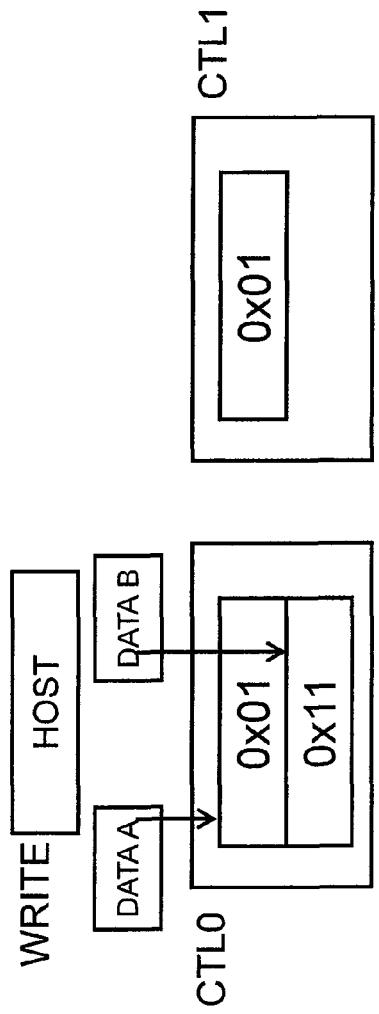
FIG. 26 shows a first example of the transitions of a cache table and a mirror table.

FIG. 26 shows a first example of the transitions of a cache table and a mirror table.

In this example, the ratio of the size of the own-system CM area 0 to the size of the other-system CM area 1 is 2:1. For this reason, the other-system segment "0x01" is associated with both own-system segments "0x01" and "0x11". In other words, in the window 1, the own-system segment "0x01" is associated with the other-system segment "0x01", and in the window 2, the own-system segment "0x11" is associates with the other-system segment "0x01".

Further, in this example, a write data A is stored in the own-system segment "0x01", and thereafter, a write data B is stored in the own-system segment "0x11". Furthermore, the "(A)" appended after the segment status name signifies the status of the segment in which the write data A is stored, and, similarly, the "(B)" appended after the segment status name signifies the status of the segment in which the write data B is stored. In the following explanation, the segment status managed by the cache table will be called the "cache status", and the segment status managed by the mirror table will be called the "mirror status".

(Time 0) All of the segments are "free" (or "clean").

(Time 1) The write command for write data A is received. The "free" own-system segment "0x01" is reserved, and, in addition, the associated "free" other-system segment "0x01" is reserved. The write data A is stored in the reserved own-system segment "0x01" and other-system segment "0x01". In accordance with this, the cache status of the own-system segment "0x01" transitions from "free" to "dirty" in the own-system CTL 0. Further, the cache status of the other-system segment "0x01" transitions from "free" to "mirror" in the other-system CTL 1, and the mirror status "m-dirty" of the other-system segment "0x01" is newly managed in the own-system CTL 0.

(Time 2) The write data A is destaged from the own-system segment "0x01". In accordance with this, the cache status of the own-system segment "0x01" transitions from "dirty" to "clean" in the own-system CTL 0. Further, the mirror status of the other-system segment "0x01" transitions from "m-dirty" to "m-clean" in the own-system CTL 0.

(Time 3) The write command for write data B is received. The "free" own-system segment "0x11" is reserved, and, in addition, the associated "free" other-system segment "0x01" is reserved. The write data B is stored in the reserved own-system segment "0x11" and other-system segment "0x01". In accordance with this, the cache status of the own-system segment "0x11" transitions from "free" to "dirty" in the own-system CTL 0. Further, the cache status of the other-system segment "0x01" transitions from "free" to "mirror" in the other-system CTL 1, and the mirror status of the other-system segment "0x01" transitions from "m-clean" to "m-dirty" in the own-system CTL 0.

(Time 4) The write data B is destaged from the own-system segment "0x11". In accordance with this, the cache status of the own-system segment "0x11" transitions from "dirty" to "clean" in the own-system CTL 0. Further, the mirror status of the other-system segment "0x01" transitions from "m-dirty" to "m-clean" in the own-system CTL 0.

Figure 27:
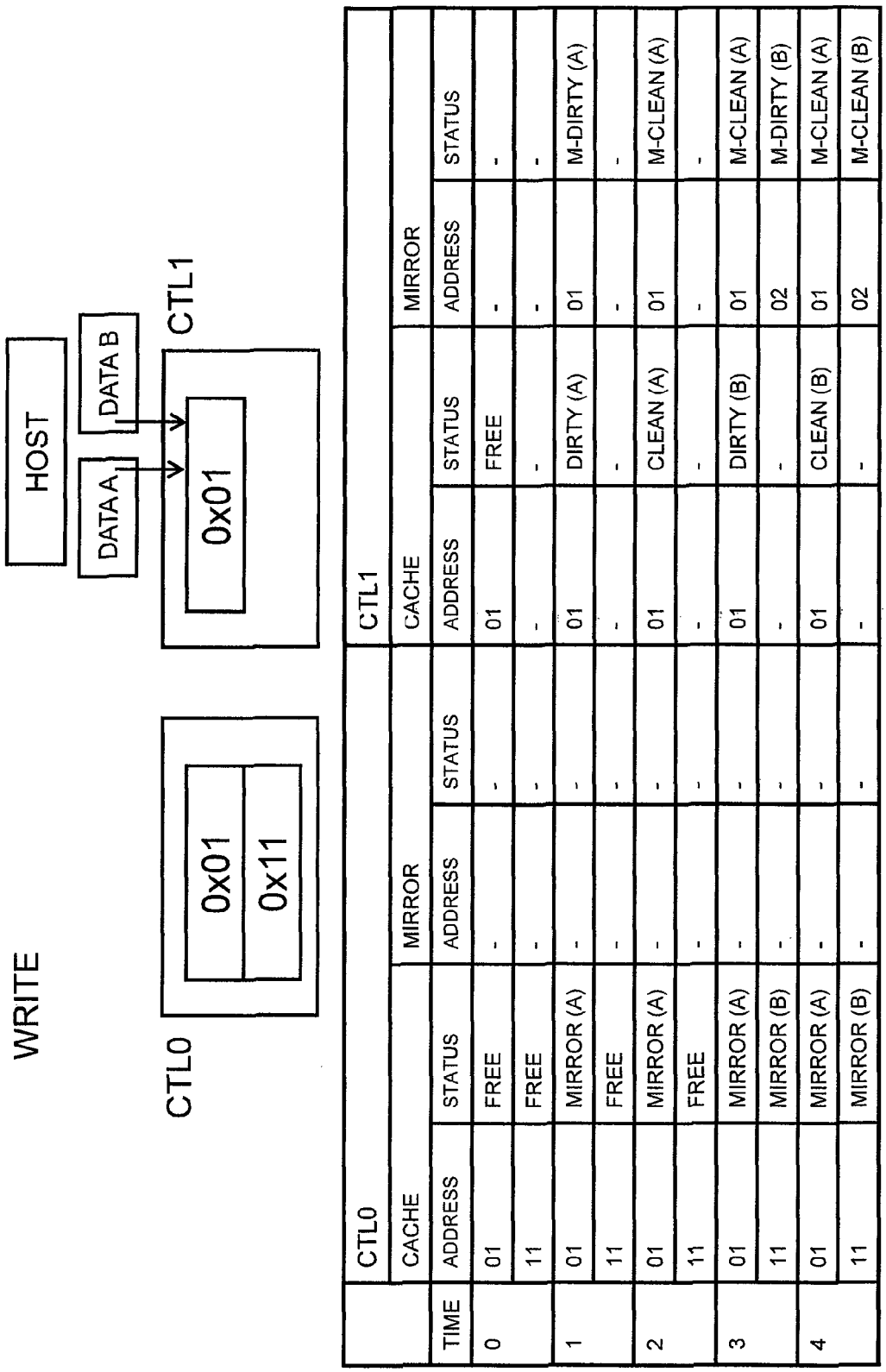
FIG. 27 a second example of the transitions of a cache table and a mirror table.

FIG. 27 shows a second example of the transitions in the cache table and the mirror table.

In this example, the own-system and the other-system in the first example of FIG. 26 are reversed. That is, in this example, the ratio between the size of the own-system CM area 1 and the size of the other-system CM area 0 is 1:2. For this reason, the own-system segment "0x01" is associated with both the other-system segments "0x01" and "0x11".

Further, in this example, the write data A is stored in the own-system segment "0x01", and thereafter, the write data B is stored in the own-system segment "0x11".

(Time 0) All the segments are "free" (or "clean").

(Time 1) The write command for write data A is received. The "free" own-system segment "0x01" is reserved, and, in addition, the associated "free" other-system segment "0x01" is reserved from among the other-system segments "0x01" and "0x11". The write data A is stored in the reserved own-system segment "0x01" and other-system segment "0x01". In accordance with this, the cache status of the own-system segment "0x01" transitions from "free" to "dirty" in the own-system CTL 1. Further, the cache status of the other-system segment "0x01" transitions from "free" to "mirror" in the other-system CTL 0, and the mirror status "m-dirty" of the other-system segment "0x01" is newly managed in the own-system CTL 1.

(Time 2) The write data A is destaged from the own-system segment "0x01". In accordance with this, the cache status of the own-system segment "0x01" transitions from "dirty" to "clean" in the own-system CTL 1. Further, the mirror status of the other-system segment "0x01" transitions from "m-dirty" to "m-clean" in the own-system CTL 1.

(Time 3) The write command for write data B is received. The "clean" own-system segment "0x01" is reserved, and, in addition, the associated "free" other-system segment "0x11" is reserved. The write data B is stored in the reserved own-system segment "0x01" and other-system segment "0x11". In accordance with this, the cache status of the own-system segment "0x01" transitions from "clean" to "dirty" in the own-system CTL 1. Further, the cache status of the other-system segment "0x11" transitions from "free" to "mirror" in the other-system CTL 0, and the mirror status "m-dirty" of the other-system segment "0x11" is newly managed in the own-system CTL 1.

(Time 4) The write data B is destaged from the own-system segment "0x01". In accordance with this, the cache status of the own-system segment "0x01" transitions from "dirty" to "clean" in the own-system CTL 1. Further, the mirror status of the other-system segment "0x11" transitions from "m-dirty" to "m-clean" in the own-system CTL 1.

Figure 28:
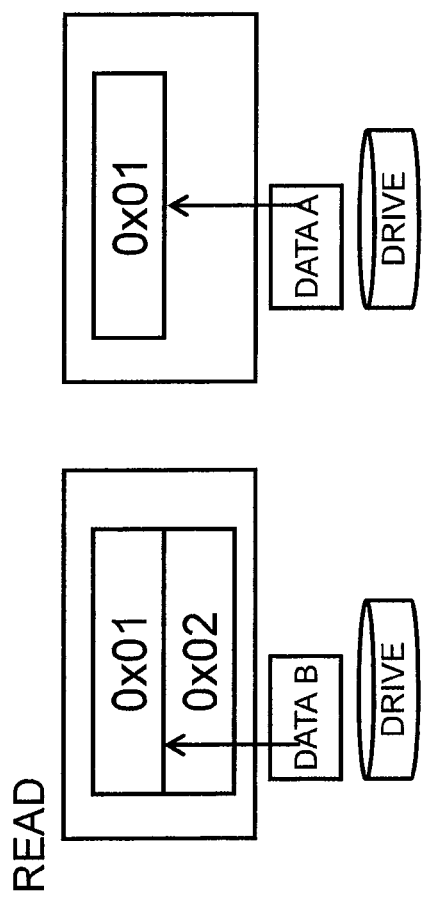
FIG. 28 a third example of the transitions of a cache table and a mirror table.

FIG. 28 shows a third example of the transitions of the cache table and the mirror table.

In this example, the ratio of the size of the CM area 0 to the size of the CM area 1 is 2:1. For this reason, the other-system segment "0x01" is associated with both own-system segments "0x01" and "0x11".

Further, in this example, the CTL 1 receives a read command for data A, and thereafter, the CTL 0 receives a read command for data B.

(Time 0) All of the segments are "free" (or "clean").

(Time 1) The read command for data A is received by the CTL 1. The "free" segment "0x01" is reserved from CM area 1. The data A is staged from the LU to the reserved segment "0x01". In accordance with this, the cache status of the segment "0x01" transitions from "free" to "clean" in the CTL 1.

(Time 2) The read command for data B is received by the CTL 0. The "free" segment "0x01" is reserved from CM area 0. The data B is staged from the LU to the reserved segment "0x01". In accordance with this, the cache status of the segment "0x01" transitions from "free" to "clean" in the CTL 0.

According to this example, the consistency between the cache table and the mirror table of the CTL 0 and the cache table and the mirror table of the CTL 1 breaks down. For this reason, the own-system CTL must issue a request to the other-system CTL to reserve a segment when carrying out the reservation of an other-system segment.

Figure 29:
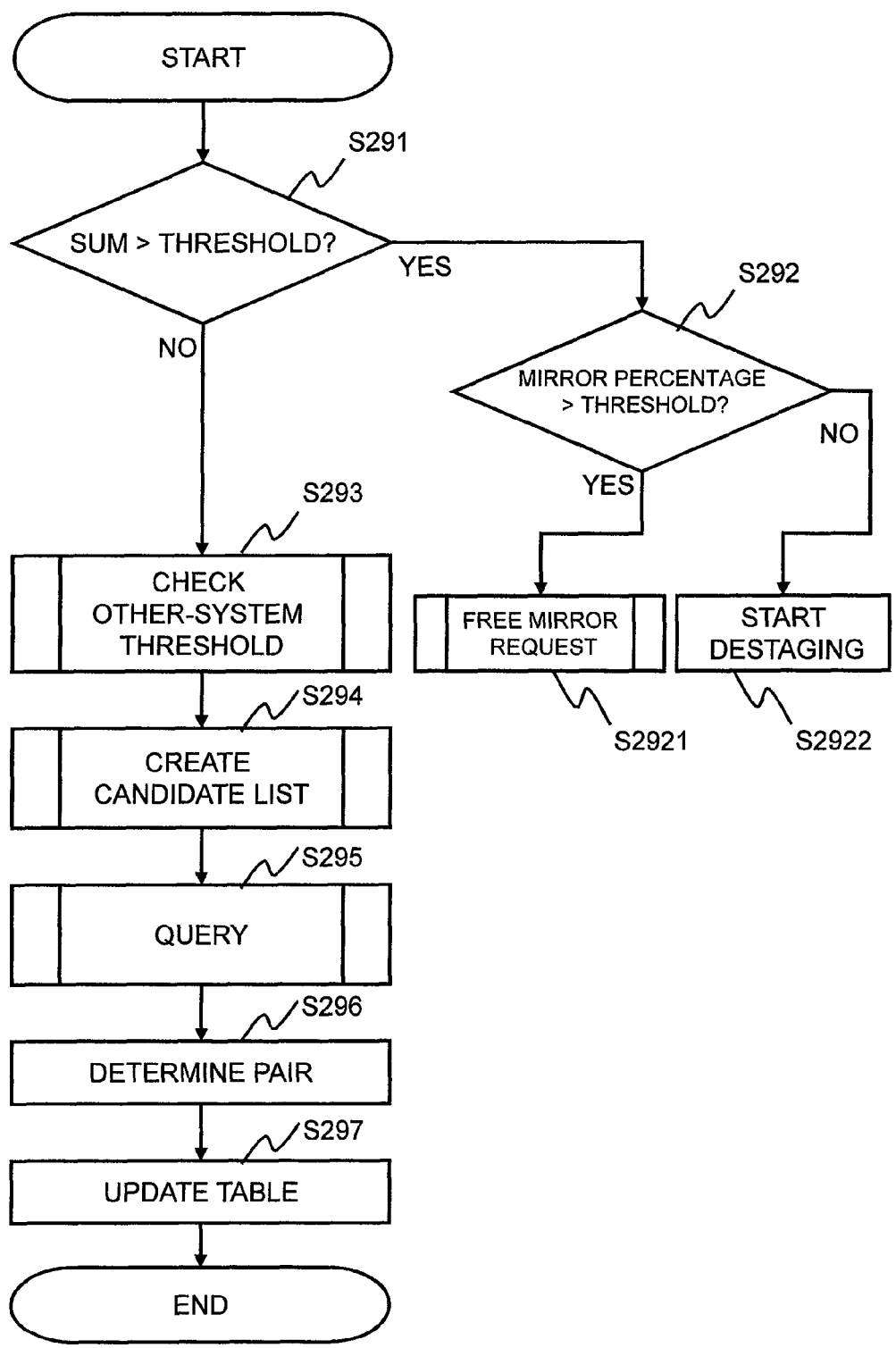
FIG. 29 shows the flow of segment reservation processing in the second example.

FIG. 29 shows the processing flow of a segment reservation process of the second example.

Steps 291, 292, 2921 and 2922 are the same as Steps 171, 172, 1723 and 1724 of FIG. 17, and as such, explanations of these Steps will be omitted.

In Step 294, the own-system control program (the own-system CTL) creates a list of segment reservation candidates (a candidate list). This is because, in segment reservation in the own-system CTL and the other-system CTL, in a case where a "free" or a "clean" segment exists on the one side but a "free" nor a "clean" segment associated with this segment does not exists on the other side, destaging must be performed to create a "clean" segment. It is preferable to carry out destaging at this point in a way that does not cause a reduction of the cache hit ratio. Accordingly, sending a list of segments that may be reserved to the one side beforehand makes it possible to achieve this. This process will be explained in detail below.

Next, in Step 295, the own-system control program requests the other-system CTL to query the candidate list that has been created. The other-system control program (the other-system CTL) selects the address of the appropriate other-system segment from among the other-system segment addresses registered in the created candidate list, and returns this other-system segment address to the own-system CTL.

The subsequent Steps 296 and 297 are the same as Steps 1715 and 1716 of FIG. 17.

Figure 30:
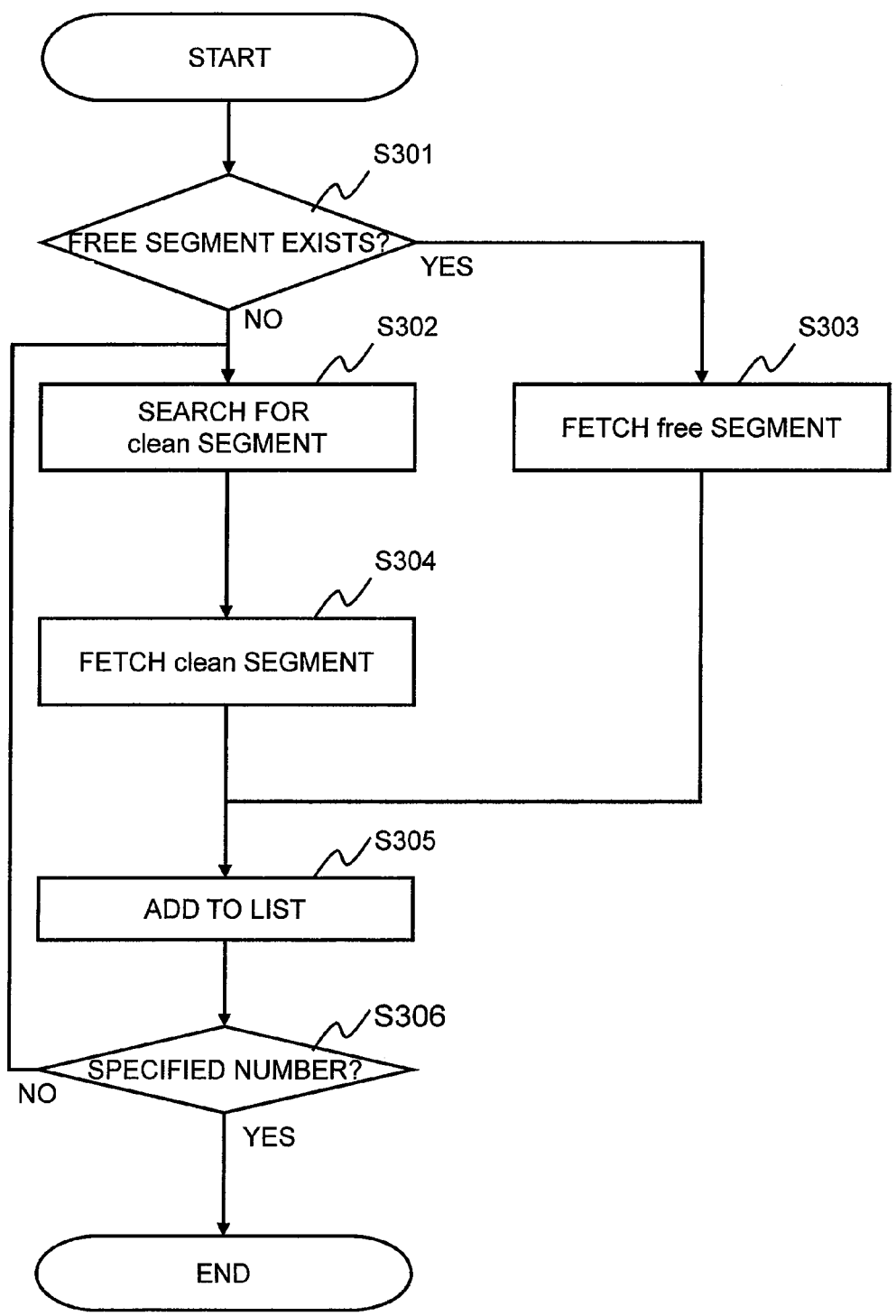
FIG. 30 shows a flowchart of the processing of Step 294 of FIG. 29.

FIG. 30 shows a flowchart of the processing of Step 294 of FIG. 29.

The own-system control program references the own-system cache table, and, in Step 301, determines whether or not a "free" own-system segment exists.

In a case where a "free" own-system segment exists (Step 301: YES), in Step 303, for example, the own-system control program specifies the address of the other-system segment that is associated with the "free" own-system segment based on the address relationship 255 of FIG. 25, and in Step 305, adds this address to the candidate list.

In a case where a "free" own-system segment does not exist (Step 301: NO), in Step 302, the own-system control program searches for a "clean" own-system segment, and in Step 304, for example, specifies on the basis of the address relationship 255 of FIG. 25 the address of the other-system segment corresponding to the address of "clean" own-system segment that was found, and in Step 305, adds this address to the candidate list.

In the above processing, in a case where it is possible to add a fixed constant number of other-segment addresses to the candidate list, the processing ends. Specifically, for example, a reliably reservable address of the other-system segment addresses added up to this point is the address of a segment (a segment that is registered as mirror in the other-system cache table) that is registered as m-clean. In a case where the number of segments required for reservation exists, this results in the communications between the two CTL being completely in one exchange. In general, segments are reserved from a group of clean segments in order from the LRU (Least Recently Used). Processing ends either when the clean segments, of the reserved clean segments, for which the associated other-system segments are m-clean, have reached the number required for reservation, or when these clean segments include segments associated with previously reserved "free" own-system segments, and have reached the maximum number of a predetermined list. Furthermore, the maximum list number can always be reserved by retrieving and adding "clean" own-system segments. The reason for this is because the threshold check explained hereinabove using FIG. 29 is carried out, thereby confirming the fact that enough "free" and "clean" segments exist. As a result, the number of other-system segment addresses is determined to have reached the "specified number" in a case where the list comprises the addresses of other-system segments associated (in LRU order) with free own-system segments and clean own-system segments, and either the number of "m-clean" segments is the above-mentioned number required for reservation, or the list size is the predetermined maximum number.

Figure 31:
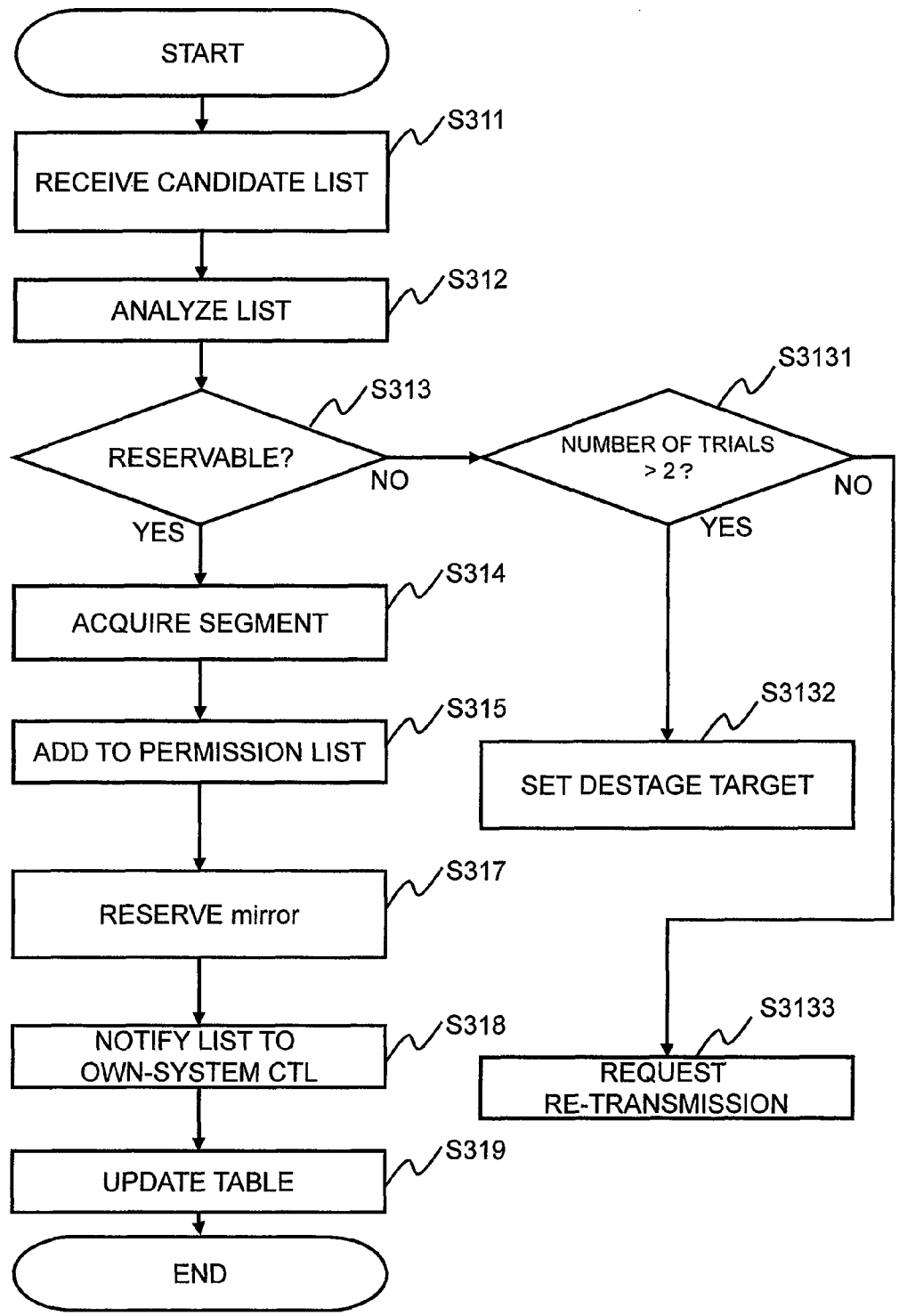
FIG. 31 shows a flowchart of the processing of Step 295 of FIG. 29.

FIG. 31 shows a flowchart of the processing of Step 295 of FIG. 29.

In Step 311, the other-system CTL receives the candidate list from the own-system CTL, and in Step 312, the other-system CTL analyzes this candidate list.

In a case where the result of this analysis is that the total of the "free", "clean" and "mirror" other-system segments of the other-system segments in the candidate list does not satisfy a prescribed number (Step 313: NO), the other-system control program carries out destaging in Step 3131 when the number of trials (the number of candidate list resend requests) does not exceed two (the threshold value may be more than or less than two) (Step 3131: NO) or when the own-system CTL is requested to resend the candidate list (Step 3133), and the number of trials exceeds two (Step 3131: YES). That is, there is an increase in "clean" other-system segments, in other words, reservable other-system segments in accordance with this. Furthermore, as used here, "prescribed number" is the number of segments to be reserved (number of segments required for reservation), and this prescribed number is received from the own-system CTL together with the candidate list in Step 295 of FIG. 29.

In a case where the total of "free", "clean", and "mirror" other-system segments is greater than the prescribed number (Step 313: YES), in Step 314 and Step 315, the other-system control program acquires and preferentially adds the "free" other-system segment to a permission list, or acquires and adds from the LRU (Least Recently Used) queue "clean" other-system segments in order from the segment having the oldest access time stamp. That is, the I/O log for the other-system CM area is referenced. Furthermore, information denoting the I/O history relative to the I/O log for the other-system CM area is not limited to the time stamps in the LRU queue, and another type of information may also be used.

In Step 316, the other-system control program makes a determination as to whether the number of other-system segments that are able to be reserved (the number of other-system segments whose addresses are registered in the permission list) has reached a specified number. In a case where this specified number has not been reached (Step 316: NO), the other-system control program requests the own-system CTL to resend the candidate list. In a case where the specified number has been reached (Step 316: YES), in Step 317, the other-system control program reserves the status of the other-system segment whose address is registered in the permission list as "mirror", and in Step 318, sends the permission list to the own-system CTL. Then, in Step 319, the other-system control program updates the other-system cache table (updates the status of the other-system segment reserved as "mirror" status to "mirror".).

Dynamic mirror area reservation in a case where data transfer hardware is used has been explained above as the second example of the present invention. The load resulting from the MPU executing cache mirroring is likely to be large, and it is conceivable that using hardware to carry out data transfer is advantageous. In a data transfer, this hardware uses a window to linearly associate two different memory spaces. The window is set beforehand, and dynamically changing the setting during system operation is either impossible, or would take a long time to process and would significantly impact performance. With respect to this restriction, this example uses a plurality of preset windows and switches these windows dynamically, thereby making it possible to simultaneously pursue both performance and flexibility.

Example 3

In the first and second examples, the reservation of a segment for storing mirror data is carried out by issuing a request to the other-system CTL. This technique leaves the referencing and reserving of a segment entirely up to the CTL that manages this CM area, and is thereby advantageous in that exclusive control is not necessary and processing consistency is maintained.

In the third example, cache management for reducing the overhead resulting from a reservation request at mirror segment reservation will be explained.

Figure 32:
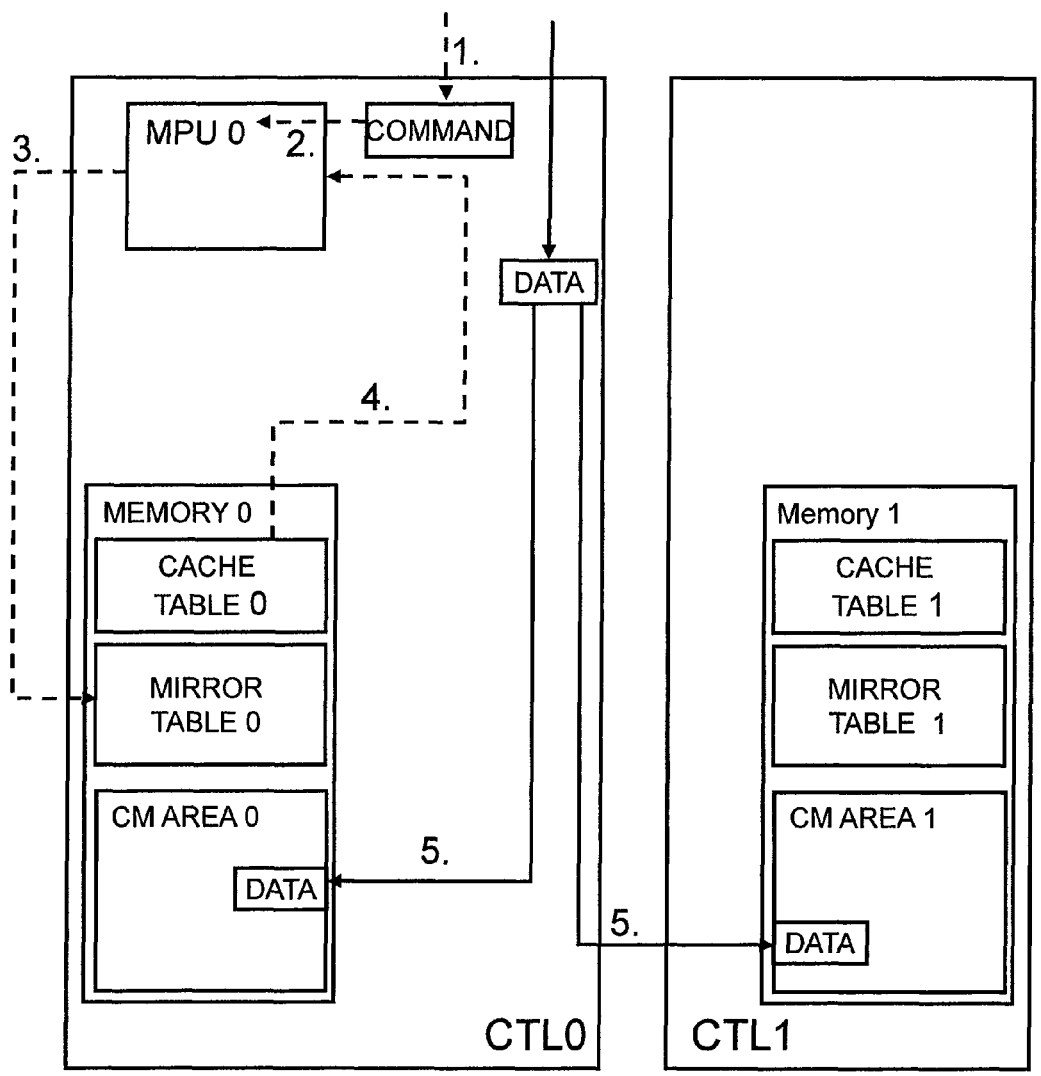
FIG. 32 shows an overview of cache management in a third example.

FIG. 32 shows an overview of the cache management of the third example.

An MPU 0 receives and analyzes a command from a host. In a case where the command is a write command, the MPU 0 has to reserve a segment for storing the write data. In the first and second examples, a request for the reservation of a segment for storing the mirror data is sent from the own-system MPU to the other-system MPU. In this third example, the own-system MPU reserves the mirror segment.

A memory (for example, cache memory) 0 comprises a cache table 0 and a mirror table 0. The mirror table 0 comprises addresses for segments in the CM area 1. Since these segments are reserved for storing mirror data, the CTL 0 is able to occupy and use the addresses on this table. Therefore, it is possible to reserve a segment for storing the write data without issuing a request to the other-system. The MPU 0 references the mirror table 0 and acquires the address of a segment of the CM area 1 for storing the mirror data, and transfers the mirror data to the segment at this address.

Similarly, a mirror table 1 also exists in the CTL 1. the mirror table 1 comprises an address of a segment of a CM area that is used as the mirror.

Figure 33:
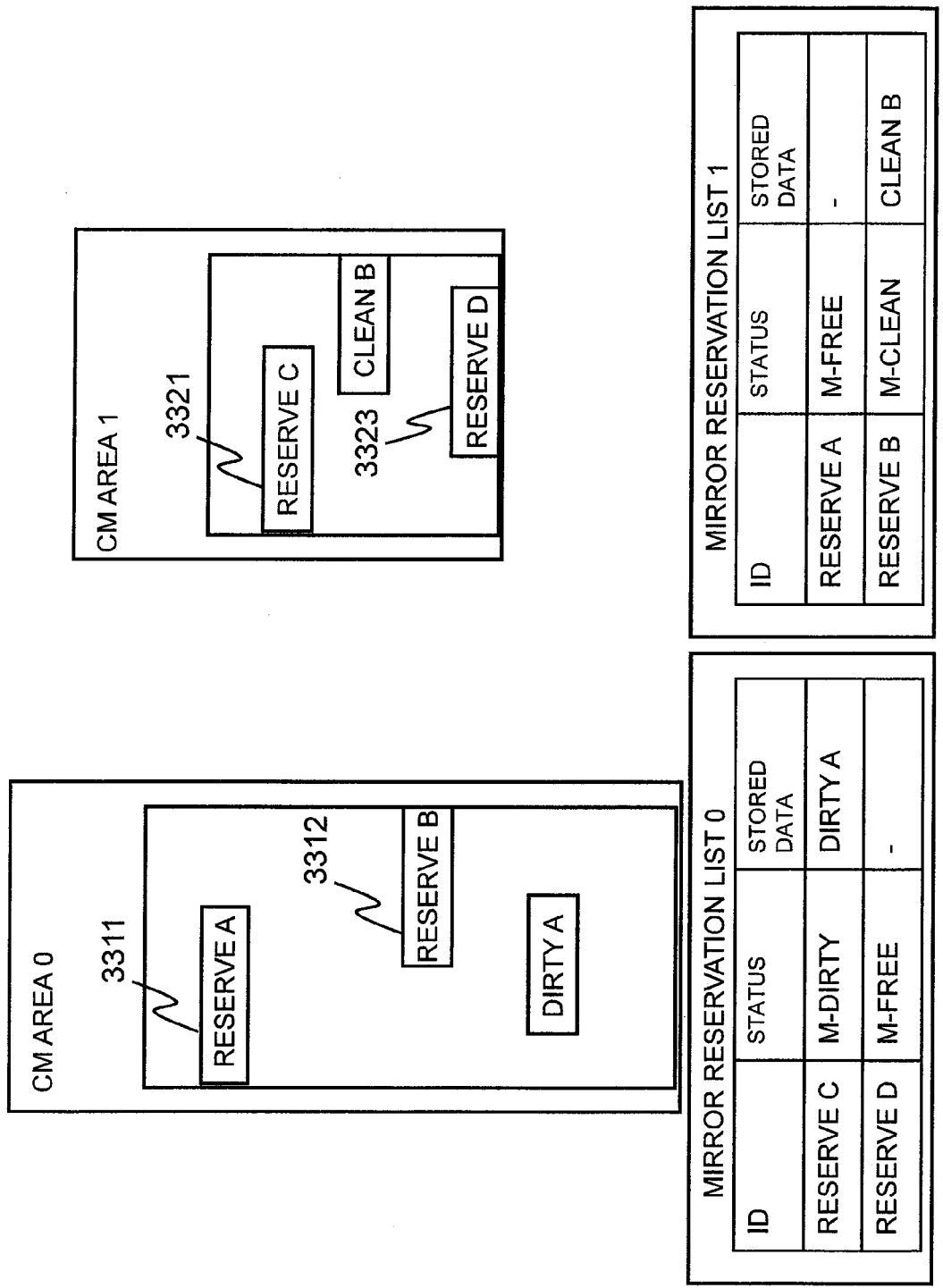
FIG. 33 shows an overview of cache management using a mirror reservation list.

FIG. 33 shows an overview of cache management that uses a mirror reservation list.

Segments 3311 and 3312 exist in the CM area 0, and these segments are reserved for storing mirror data transferred from the CTL 1. Hereinafter, a segment that has been reserved for storing mirror data will be called a "reserve segment". Similarly, reserve segments 3321 and 3323 exist in the CM area 1.

The memory 0 stores the mirror reservation list 0. The mirror reservation list 0, for example, is one part of the mirror table 0. The mirror reservation list 0 comprises information related to the reserve segments 3321 and 3323 in the CM area 1. For example, the mirror reservation list 0 comprises information denoting the segment identifier (for example, the address), the status (the mirror status), and the stored data for each reserve segment in the CM area 1.

The memory 1 stores the mirror reservation list 1. The mirror reservation list 1, for example, is one part of the mirror table 1. The mirror reservation list 1 comprises information related to the reserve segments 3311 and 3312 in the CM area 0. For example, the mirror reservation list 1 comprises information denoting the segment identifier (for example, the address), the status (the mirror status), and the stored data for each reserve segment in the CM area 0.

In other words, the mirror reservation list of the one CTL is a list comprising information related to the reserve segments of the other CTL.

The mirror reservation list 0 holds information for the reserve segments "reserve C" and "reserve D" of the CTL 1. The reserve segment "reserve C" stores the mirror data of dirty data A in the CM area, and therefore, the status of this mirror data is "m-dirty". Since the reserve segment "reserve D" is not being used, the status is "m-free".

The mirror reservation list 1 holds information for the reserve segments "reserve A" and "reserve B" of the CTL 0. The reserve segment "reserve B" stores the mirror data of the data inside the "clean B" segment in the CM area 1, and therefore, the status of this mirror data is "m-clean".

Figure 34:
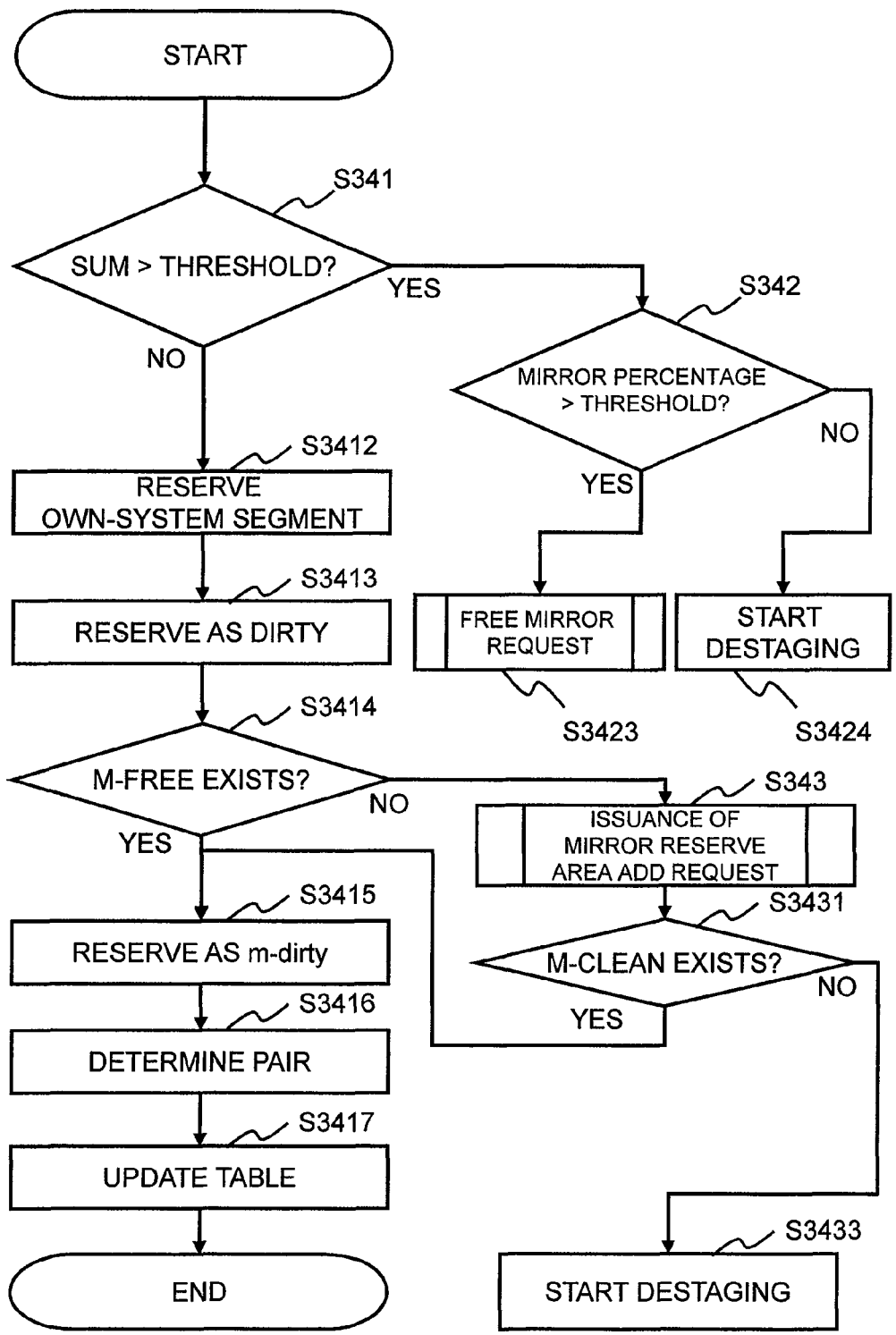
FIG. 34 shows the flow of processing in the third example up to the reservation of a cache segment.

FIG. 34 shows the flow of processing in the third example up to the reservation of a cache segment.

Steps 341, 342, 3423, 3424, 3412, and 3413 are the same as Steps 171, 172, 1723, 1724, 1711 and 1712 of FIG. 17.

In Step 3414, the own-system control program checks the own-system mirror reservation list. In a case where a "m-free" segment is registered in this list (Step 3414: YES), the own-system control program reserves this segment as "m-dirty" in Step 3415. In Step 3416, a pair comprising the segment that was reserved as "dirty" in Step 3413 and the segment that was reserved as "m-dirty" in Step 3415 is determined. In Step 3417, the own-system cache table and the own-system mirror reservation list are updated. For example, the status of the segment reserved as "m-dirty" in the own-system mirror reservation list is updated to "m-dirty".

In a case where a "m-free" segment is not registered in the own-system mirror reservation list (Step 3414: NO), the own-system control program issues an add request to the other-system CTL in Step 343 in an attempt to expand the mirror reserve area. The own-system control program does not stand by until the request result has been obtained, but rather checks for the presence of an "m-clean" other-system segment in Step 3431. In a case where an "m-clean" segment exists inside the own-system mirror reservation list (Step 3431: YES), this segment is reserved as "m-dirty" in Step 3415. In a case were an "m-clean" segment could not be found (Step 3431: NO), destaging is carried out in Step 3433. That is, the own-system control program, by destaging the dirty data from the "dirty" own-system segment that is associated with the "m-dirty" other-system segment registered in the own-system mirror reservation list, updates the status of the other-system reserve segment that stores the mirror data of the data inside this "dirty" own-system segment from "m-dirty" to "m-clean".

Figure 35:
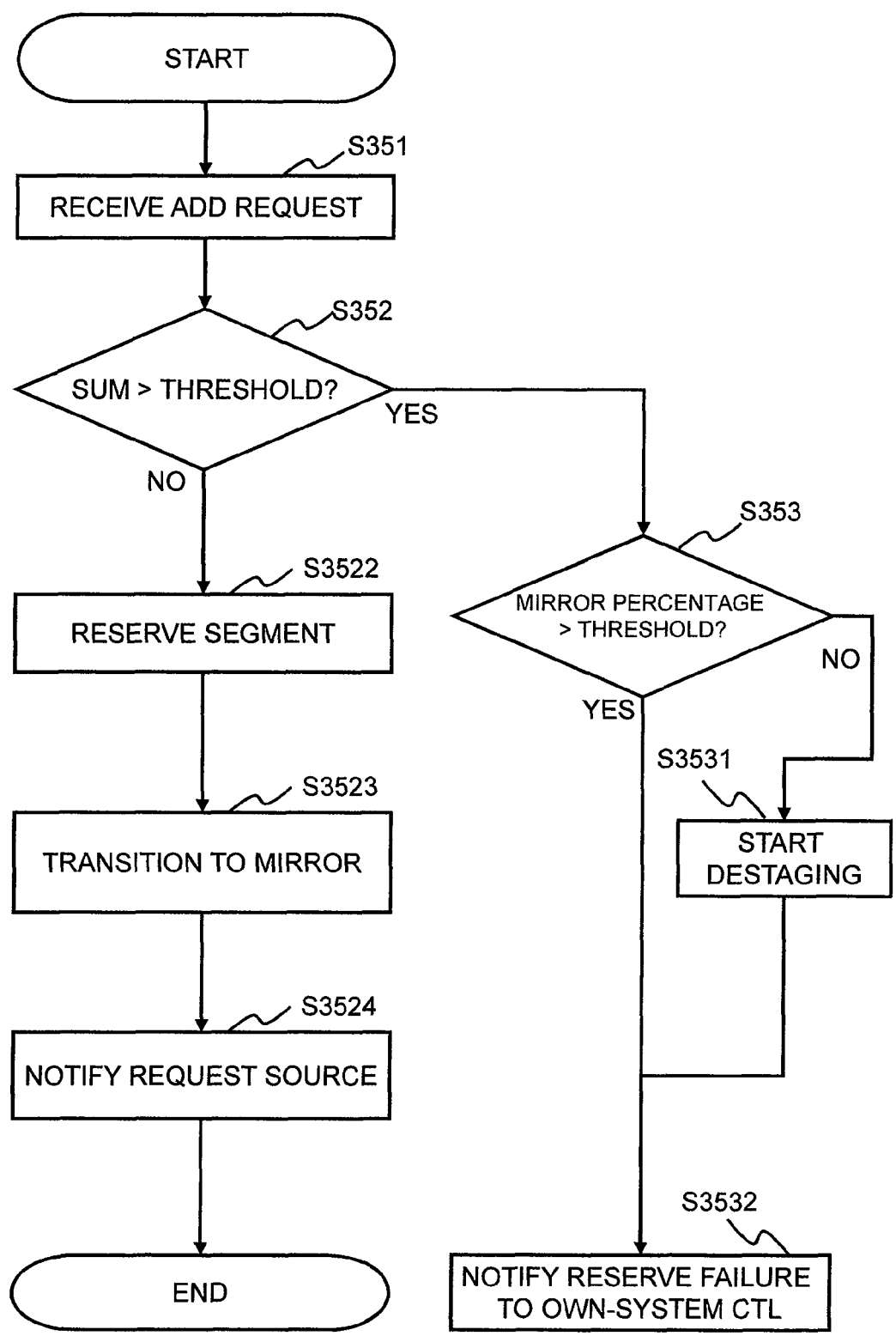
FIG. 35 shows a flowchart of processing carried out by the other-system CTL in Step 343 of FIG. 34.

FIG. 35 shows a flowchart of the processing carried out by the other-system CTL in Step 343 of FIG. 34. This processing is executed when the other-system CTL receives the add request from the own-system CTL.

First, in Step 351, the other-system control program receives the request to add a mirror reserve area from the own-system CTL.

Next, in Step 352, the other-system control program determines whether or not the sum of the dirty capacity and the mirror capacity of the other-system CM area exceeds the entry restriction threshold of the other-system CTL.

In a case where the determination is that the sum of the dirty capacity and the mirror capacity exceeds the entry restriction threshold (Step 352: YES), a reservation failure results. In this case, in Step 353, the other-system control program determines whether or not the percentage of the mirror capacity with respect to the dirty capacity in the other-system CM area exceeds the mirror capacity threshold. That is, the cause of the reservation failure is determined by the ratio of the mirror capacity to the dirty capacity. In a case where the determination is that the cause of the reservation failure was due to the dirty capacity (Step 353: NO), the other-system control program boots up destaging in Step 3531. That is, processing for increasing "clean" other-system segments is carried out. Lastly, in Step 3532, the other-system control program sends to the source of the request (the own-system CTL) a reservation failure notification comprising information denoting the cause of the reservation failure.

In a case where the sum of the dirty capacity and the mirror capacity is determined not to exceed the entry restriction threshold (Step 352: NO), in Step 3522, the other-system control program reserves from the other-system CM area a specified number of other-system segments (for example, a predetermined number of other-system segments, or the number of segments specified in the add request from the own-system CTL). For example, either "free" or "clean" other-system segments are reserved. Since these segments are placed under the management of the other-system CTL, in Step 3523, the status of the reserved segments transitions to "mirror" in the other-system CTL. Lastly, in Step 3534, the other-system control program notifies the address of the reserved other-system segment to the request source (the own-system CTL).

Figure 36:
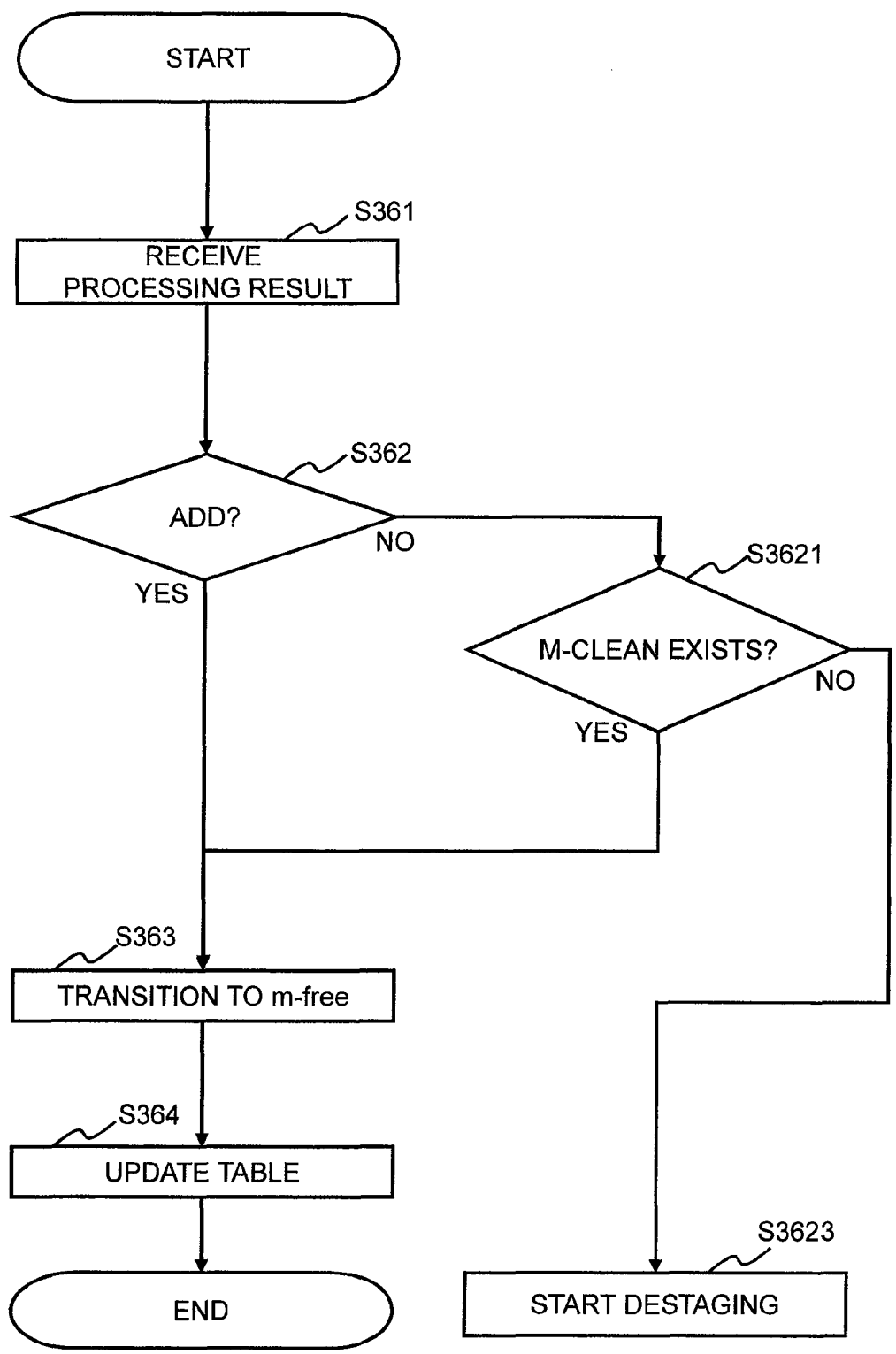
FIG. 36 shows a flowchart of processing carried out in a case where the result of add processing is received from the other-system CTL while processing is being carried out by the own-system CTL in Step 343 of FIG. 34.

FIG. 36 shows a flowchart of the processing carried out in a case where the result of add processing is received from the other-system CTL while processing is being carried out by the own-system CTL in Step 343 of FIG. 34.

In Step 361, the own-system control program receives the result of add processing from the other-system CTL.

Next, in Step 362, the own-system control program analyzes this processing result, and checks to make sure the add area was able to be acquired.

In a case where the add area was able to be acquired (Step 362: YES), the own-system control program adds the other-system segment inside the received processing result to the own-system mirror reservation list as "m-free" (Step 363).

Alternately, in a case where the add area was not able to be acquired (Step 362: NO), the own-system control program checks whether or not an "m-clean" other-system segment exists inside the own-system mirror reservation list (Step 3621). In a case where a "m-clean" segment exists (Step 3621: YES), the own-system control program updates the status of the "m-clean" segment in the own-system mirror reservation list from "m-clean" to "m-free" (Step 363 and 364). In a case where an "m-clean" segment does not exist (Step 3621: NO), the own-system control program boots up destaging in Step 3623.

In the third example, a mirror segment is reserved beforehand, the mirror data storage-destination segment is reserved from the reserve segments prepared in advance.

A number of examples of the present invention have been explained above, but the present invention is not limited to these examples, and as a matter of course, various changes are possible without departing from the scope of the present invention. For example, there may be more than two CTLs. In accordance with this, the mirror data of the original data stored in one CM area may be respectively stored in a plurality of CM areas. Further, for example, the CTLs 0 and 1 may share the LU. Also, for example, instead of the mirror percentage being the percentage of the mirror capacity relative to the dirty capacity, the percentage of the mirror capacity may be related to another capacity (for example, the CM capacity).

REFERENCE SIGNS LIST

11 Storage system

The invention claimed is:
1. A storage controller comprising:
a first controller, which has a first cache memory area, and which manages a first storage device; and
a second controller, which has a second cache memory area, and which manages either the first storage device or a second storage device, wherein
the first controller and the second controller are interconnected,
the first cache memory area has a plurality of first sub-areas,
the second cache memory area has a plurality of second sub-areas,
the first controller stores a first data in any first sub-area other than a dirty first sub-area and a mirror first sub-area of the plurality of first sub-areas, stores a first mirror data, which is a mirror of the first data, in any second sub-area other than a dirty second sub-area and a mirror second sub-area of the plurality of second sub-areas, and manages first association information, which denotes a pair of the storage-destination first sub-area of the first data and the storage-destination second sub-area of the first mirror data,
the first controller stores in the first storage device the first data inside the dirty first sub-area,
the second controller stores a second data in any second sub-area other than a dirty second sub-area and a mirror second sub-area of the plurality of second sub-areas, stores a second mirror data, which is a mirror of the second data, in any first sub-area other than a dirty first sub-area and a mirror first sub-area of the plurality of first sub-areas, and manages second association information, which denotes a pair of the storage-destination second sub-area of the second data and the storage-destination first sub-area of the second mirror data,
the second controller stores in either the first storage device or the second storage device the second data inside the dirty second sub-area,
the dirty first sub-area is the first sub-area that stores the first data that is not yet stored in the first storage device,
the mirror first sub-area is the first sub-area that stores the second mirror data,
the dirty second sub-area is the second sub-area that stores the second data that is not yet stored in either the first or second storage device,
the mirror second sub-area is the second sub-area that stores the first mirror data,
the first and second controllers are configured so as to operate in accordance with a mode that is selected from among a fixed mirror mode and a variable mirror mode,
in a case where the fixed mirror mode has been selected, the first controller divides the plurality of first sub-areas beforehand into a first original area and a first mirror area, and, in addition, the second controller divides the plurality of second sub-area beforehand into a second mirror area associated with the first original area, and a second original area associated with the first mirror area, and in a case where the variable mirror mode has been selected, the first controller dynamically reserves a second sub-area to be the storage destination of the first mirror data without pre-fixing the first original area and the first mirror area in the first cache memory area, and, in addition, the second controller dynamically reserves a first sub-area to be the storage destination of the second mirror data without pre-fixing the first original area and the first mirror area in the second cache memory area, a change from the fixed mirror mode to the variable mirror mode is carried out in a state in which the first and second controllers are capable of receiving an I/O command, the first controller, from among two or more first sub-areas that were the first mirror area, manages only the first sub-area, in which the second mirror data is stored, as the mirror first sub-area, and the second controller, from among two or more second sub-areas that were the second mirror area, manages only the second sub-area, in which the first mirror data is stored, as the mirror first sub-area.

2. The storage controller according to claim 1, wherein the first association information is managed by first cache management information, which is information related to a first sub-area, and by first mirror management information, which is information related to a second sub-area in which the first mirror data is stored, the second association information is managed by second cache management information, which is information related to a second sub-area, and by second mirror management information, which is information related to a second sub-area in which the second mirror data is stored, the first cache management information includes information denoting a cache status for each first sub-area, as a cache status of the first sub-area, there are dirty which signifies that the first data is not yet stored in the first storage device, clean which signifies that the first data has been stored in the first storage device, and mirror which signifies that the second mirror data has been stored, the first mirror management information includes information denoting a mirror status for each second sub-area that stores the first mirror data, as a mirror status of the second sub-area, there are mirror dirty which signifies that the first mirror data of the first data, which is not yet stored in the first storage device, is stored, and mirror clean which signifies that the first mirror data of the first data, which has been stored in the first storage device, is stored, the second cache management information includes information denoting the cache status for each second sub-area, as the cache status of the second sub-area, there are dirty which signifies that the second data is not yet stored in either the first or second storage device, clean which signifies that the second data has been stored in either the first or second storage device, free which signifies an unused state, and mirror which signifies that the first mirror data has been stored, the second mirror management information includes information denoting the mirror status for each first sub-area that stores the second mirror data, as a mirror status of the first sub-area, there are mirror-dirty which signifies that the second mirror data of the second data, which is not yet stored in either the first or second storage device, is stored, and mirror-clean which signifies that the second mirror data of the second data, which has been stored in either the first or second storage device, is stored, the first and second data are target data for an I/O command issued from a host device, the first controller restricts the number of I/O commands received per unit of time in a case where a first utilization capacity, which is a sum of a total capacity of the dirty first sub-area and a total capacity of the mirror first sub-area, exceeds a first entry restriction threshold, the second controller restricts the number of I/O commands received per unit of time in a case where a second utilization capacity, which is a sum of a total capacity of the dirty second sub-area and a total capacity of the mirror second sub-area, exceeds a second entry restriction threshold, the first controller, (A) determines whether or not the first utilization capacity exceeds the first entry restriction threshold, (B) in a case where the determination result in (A) is affirmative, and, in addition, a relative state of the total capacity of the dirty first sub-area and the total capacity of the mirror first sub-area conforms to a first condition, sends a free-mirror request to the second controller, and (C) in a case where the determination result in (A) is affirmative, and, in addition, the relative state of the total capacity of the dirty first sub-area and the total capacity of the mirror first sub-area does not conform to a first condition, stores in the first storage device the first data inside the dirty first sub-area, updates the cache status of this first sub-area from dirty to clean, and, in addition, updates a pair status of this first sub-area and the second sub-area paired therewith from mirror-dirty to mirror-clean, the second controller, in response to a free-mirror request, notifies the first controller of the first sub-area having the mirror status of mirror-clean, and the first controller removes the first sub-area, notified from the second controller, from the management target of the first mirror management information, and updates the cache status of this first sub-area to free.

3. The storage controller according to claim 1, wherein the first controller, in a case where the sum of the total capacity of the dirty first sub-area and the total capacity of the mirror first sub-area exceeds a first type threshold, executes the processing of either a dirty reduction process for reducing the dirty first sub-area by storing in the first storage device the first data inside the dirty first sub-area, or a mirror reduction process for reducing the mirror first sub-area in accordance with a state based on the total capacity of the data first sub-area and the total capacity of the mirror first sub-area.

4. The storage controller according to claim 3, wherein the state based on the total capacity of the dirty first sub-area and the total capacity of the mirror first sub-area is the state in which a mirror percentage, which is a percentage of the total capacity of the mirror first sub-area relative to a certain capacity, exceeds a second type threshold, the first controller executes the mirror reduction process.

5. The storage controller according to claim 4, wherein the certain capacity is the total capacity of the dirty first sub-area.

6. The storage controller according to claim 5, wherein
the first controller determines the second type threshold based on the first type threshold in the second controller and the capacity of the second cache memory area, the first type threshold in the second controller is the entry restriction threshold in the second controller, and the second controller, in a case where the sum of the total capacity of the dirty second sub-area and the total capacity of the mirror second sub-area exceeds the entry restriction threshold, restricts the number of I/O commands received per unit of time.

7. The storage controller according to claim 6, wherein
the second controller manages the mirror status of each first sub-area that stores the second mirror data,
as the mirror status of the first sub-area, there are mirror-dirty signifying that the second mirror data of the second data, which is not yet stored in either the first or second storage device, is stored, and mirror-clean signifying that the second mirror data of the second data, which has been stored in either the first or the second storage device, is stored,
the first controller, in the mirror reduction process,
(M1) sends a free-mirror request to the second controller, and
(M2) removes the first sub-area notified from the second controller from the management target in the first mirror management information, and
the second controller, in response to the free-mirror request, notifies the first controller of the address of the first sub-area having the mirror status of mirror-clean.

8. The storage controller according to claim 1, wherein
the second controller manages the mirror status of each first sub-area that stores the second mirror data,
as the mirror status of the first sub-area, there are mirror-dirty signifying that the second mirror data of the second data, which is not yet stored in either the first or second storage device, is stored, and mirror-clean signifying that the second mirror data of the second data, which has been stored in either the first or the second storage device, is stored,
the first controller, in the mirror reduction process,
(M1) sends a free-mirror request to the second controller, and
(M2) removes the first sub-area notified from the second controller from the management target in the first mirror management information, and
the second controller, in response to the free-mirror request, notifies the first controller of the address of the first sub-area having the mirror status of mirror-clean.

9. The storage controller according to claim 1, wherein
the plurality of second sub-areas include a reserve second sub-area, which is a second sub-area that has been reserved beforehand as the second sub-area for storing the first mirror data,
the first controller manages one or more reserve second sub-areas, selects any reserve second sub-area from the one or more reserve second sub-areas, transfers the first mirror data to the selected reserve second sub-area, and removes the selected reserve second sub-area from the management target,
the first controller, when the number of management-targeted reserve second sub-areas is insufficient, sends a request to the second controller to add a reserve second sub-area,
the second controller, in response to the add request, reserves one or more second sub-areas other than the dirty second sub-area and the mirror second sub-area, and notifies the first controller of the reserved one or more second sub-areas, and
the first controller respectively manages the one or more second sub-areas notified from the second controller as reserve second sub-areas.

10. A storage controller, comprising:
a first controller, which has a first cache memory area, and which manages a first storage device; and
a second controller, which has a second cache memory area, and which manages either the first storage device or a second storage device, wherein
the first controller and the second controller are interconnected,
the first cache memory area has a plurality of first sub-areas,
the second cache memory area has a plurality of second sub-areas,
the first controller stores a first data in any first sub-area other than a dirty first sub-area and a mirror first sub-area of the plurality of first sub-areas, stores a first mirror data, which is a mirror of the first data, in any second sub-area other than a dirty second sub-area and a mirror second sub-area of the plurality of second sub-areas, and manages first association information, which denotes a pair of the storage-destination first sub-area of the first data and the storage-destination second sub-area of the first mirror data,
the first controller stores in the first storage device the first data inside the dirty first sub-area,
the second controller stores a second data in any second sub-area other than a dirty second sub-area and a mirror second sub-area of the plurality of second sub-areas, stores a second mirror data, which is a mirror of the second data, in any first sub-area other than a dirty first sub-area and a mirror first sub-area of the plurality of first sub-areas, and manages second association information, which denotes a pair of the storage-destination second sub-area of the second data and the storage-destination first sub-area of the second mirror data,
the second controller stores in either the first storage device or the second storage device the second data inside the dirty second sub-area,
the dirty first sub-area is the first sub-area that stores the first data that is not yet stored in the first storage device,
the mirror first sub-area is the first sub-area that stores the second mirror data,
the dirty second sub-area is the second sub-area that stores the second data that is not yet stored in either the first or second storage device,
the mirror second sub-area is the second sub-area that stores the first mirror data, the first and second controllers are configured so as to operate in accordance with a mode that is selected from among a fixed mirror mode and a variable mirror mode,
in a case where the fixed mirror mode has been selected, the first controller divides the plurality of first sub-areas beforehand into a first original area and a first mirror area, and, in addition, the second controller divides the plurality of second sub-area beforehand into a second mirror area associated with the first original area, and a second original area associated with the first mirror area,
in a case where the variable mirror mode has been selected, the first controller dynamically reserves a second sub-area to be the storage destination of the first mirror data without pre-fixing the first original area and the first mirror area in the first cache memory area, and, in addition, the second controller dynamically reserves a first sub-area to be the storage destination of the second mirror data without pre-fixing the first original area and the first mirror area in the second cache memory area, wherein a change from the variable mirror mode to the fixed mirror mode is carried out in a state in which the first and second controllers are capable of receiving an I/O command, the first controller carries out a process for removing the mirror first sub-area from the first original area and a process for removing the dirty first sub-area from the first mirror area, and the second controller carries out a process for removing the mirror second sub-area from the second original area and a process for removing the dirty second sub-area from the second mirror area.

11. A storage controller, comprising:

a first controller, which has a first cache memory area, and which manages a first storage device; and a second controller, which has a second cache memory area, and which manages either the first storage device or a second storage device, wherein the first controller and the second controller are interconnected, the first cache memory area has a plurality of first sub-areas, the second cache memory area has a plurality of second sub-areas, the first controller stores a first data in any first sub-area other than a dirty first sub-area and a mirror first sub-area of the plurality of first sub-areas, stores a first mirror data, which is a mirror of the first data, in any second sub-area other than a dirty second sub-area and a mirror second sub-area of the plurality of second sub-areas, and manages first association information, which denotes a pair of the storage-destination first sub-area of the first data and the storage-destination second sub-area of the first mirror data, the first controller stores in the first storage device the first data inside the dirty first sub-area, the second controller stores a second data in any second sub-area other than a dirty second sub-area and a mirror second sub-area of the plurality of second sub-areas, stores a second mirror data, which is a mirror of the second data, in any first sub-area other than a dirty first sub-area and a mirror first sub-area of the plurality of first sub-areas, and manages second association information, which denotes a pair of the storage-destination second sub-area of the second data and the storage-destination first sub-area of the second mirror data, the second controller stores in either the first storage device or the second storage device the second data inside the dirty second sub-area, the dirty first sub-area is the first sub-area that stores the first data that is not yet stored in the first storage device, the mirror first sub-area is the first sub-area that stores the second mirror data, the dirty second sub-area is the second sub-area that stores the second data that is not yet stored in either the first or second storage device, the mirror second sub-area is the second sub-area that stores the first mirror data, the first controller has a first processor, and a first switching device having a data transfer circuit having an address conversion circuit, the address conversion circuit has a one-to-one association relationship between a cache address of the first sub-area and a cache address of the second sub-area, the first processor sends the first data and a target address, which is the cache address of the first sub-area that is to be the storage destination of the first data, to the address conversion circuit, the data transfer circuit receives the first data and the target address, transfers the received first data to the first sub-area denoted by the target address, and in addition, transfers the first mirror data of this first data to the second sub-area denoted by the cache address corresponding to the target address, the cache address corresponding to the target address is the address specified by the address conversion circuit, wherein the first switching device has a plurality of address conversion circuits respectively corresponding to a plurality of cache address spaces, a plurality of cache addresses belong to each cache address space, and the first processor, from among the plurality of address conversion circuits, sends the first data and the target address to the address conversion circuit corresponding to the cache address space to which the target address belongs.

12. The storage controller according to claim 1, wherein the first controller, in a case where a portion of a first sub-area of the plurality of first sub-areas becomes unusable, continues to operate using the remainder of the first sub-area.

* * * * *